(12) United States Patent
Lee

(10) Patent No.: US 7,622,533 B2
(45) Date of Patent: Nov. 24, 2009

(54) BIOMIMETIC COMPOUNDS AND SYNTHETIC METHODS THEREFOR

(75) Inventor: Bruce P. Lee, Madison, WI (US)

(73) Assignee: Nerites Corporation, Madison, WI (US)

( * ) Notice: Subject to any disclaimer, the term of this patent is extended or adjusted under 35 U.S.C. 154(b) by 0 days.

(21) Appl. No.: 11/834,651

(22) Filed: Aug. 6, 2007

(65) Prior Publication Data

US 2008/0171836 A1   Jul. 17, 2008

Related U.S. Application Data

(60) Provisional application No. 60/821,459, filed on Aug. 4, 2006.

(51) Int. Cl.
*C08F 16/14* (2006.01)

(52) U.S. Cl. .............. 525/328.9; 525/328.2; 525/330.3; 526/304; 526/332

(58) Field of Classification Search ................ 526/304, 526/332; 525/328.2, 328.9, 330.3
See application file for complete search history.

(56) References Cited

U.S. PATENT DOCUMENTS

| | | | |
|---|---|---|---|
| 4,339,561 A * | 7/1982 | Jacquet et al. .............. 526/304 |
| 4,496,397 A | 1/1985 | Waite |
| 4,585,585 A | 4/1986 | Waite |
| 4,615,697 A | 10/1986 | Robinson |
| 4,687,740 A | 8/1987 | Waite |
| 4,795,436 A | 1/1989 | Robinson |
| 4,808,702 A | 2/1989 | Waite |
| 4,908,404 A | 3/1990 | Benedict et al. |
| 4,978,336 A | 12/1990 | Capozzi et al. |
| 4,983,392 A | 1/1991 | Robinson |
| 5,015,677 A | 5/1991 | Benedict et al. |
| 5,024,933 A | 6/1991 | Yang et al. |
| 5,030,230 A | 7/1991 | White |
| 5,049,504 A | 9/1991 | Maugh et al. |
| 5,098,999 A | 3/1992 | Yamamoto et al. |
| 5,108,923 A | 4/1992 | Benedict et al. |
| 5,116,315 A | 5/1992 | Capozzi et al. |
| 5,156,956 A | 10/1992 | Motoki et al. |
| 5,192,316 A | 3/1993 | Ting |
| 5,197,973 A | 3/1993 | Pang et al. |
| 5,202,236 A | 4/1993 | Maugh et al. |
| 5,202,256 A | 4/1993 | Maugh et al. |
| 5,225,196 A | 7/1993 | Robinson |
| 5,242,808 A | 9/1993 | Maugh et al. |
| 5,260,194 A | 11/1993 | Olson |
| 5,374,431 A | 12/1994 | Pang et al. |
| 5,410,023 A | 4/1995 | Burzio |
| 5,428,014 A | 6/1995 | Labroo et al. |
| 5,487,739 A | 1/1996 | Aebischer et al. |
| 5,490,980 A | 2/1996 | Richardson et al. |
| 5,520,727 A | 5/1996 | Vreeland et al. |
| 5,525,336 A | 6/1996 | Green et al. |
| 5,549,904 A | 8/1996 | Juergensen et al. |
| 5,563,047 A | 10/1996 | Petersen |
| 5,574,134 A | 11/1996 | Waite |
| 5,580,697 A | 12/1996 | Keana et al. |
| 5,582,955 A | 12/1996 | Keana et al. |
| 5,605,938 A | 2/1997 | Roufa et al. |
| 5,618,551 A | 4/1997 | Tardy et al. |
| 5,628,793 A | 5/1997 | Zirm |
| 5,705,177 A | 1/1998 | Roufa et al. |
| 5,705,178 A | 1/1998 | Roufa et al. |
| 5,736,132 A | 4/1998 | Juergensen et al. |
| 5,776,747 A | 7/1998 | Schinstine et al. |
| 5,800,828 A | 9/1998 | Dionne et al. |
| 5,817,470 A | 10/1998 | Burzio et al. |
| 5,830,539 A | 11/1998 | Yan et al. |
| 5,834,232 A | 11/1998 | Bishop et al. |
| 5,858,747 A | 1/1999 | Schinstine et al. |
| 5,935,849 A | 8/1999 | Schinstine et al. |
| 5,939,385 A | 8/1999 | Labroo et al. |
| 5,955,096 A | 9/1999 | Santos et al. |
| 5,968,568 A | 10/1999 | Kuraishi et al. |
| 5,985,312 A | 11/1999 | Jacob et al. |
| 5,994,325 A | 11/1999 | Roufa et al. |
| 6,010,871 A | 1/2000 | Takahara et al. |
| 6,020,326 A | 2/2000 | Roufa et al. |
| 6,022,597 A | 2/2000 | Yan et al. |
| 6,083,930 A | 7/2000 | Roufa et al. |

(Continued)

FOREIGN PATENT DOCUMENTS

DE    196 43 007 A 1    4/1998

(Continued)

OTHER PUBLICATIONS

Lee et al. J. Biomaterials Science, Polymer Edition (2204), 15(4), 449-464.*

(Continued)

*Primary Examiner*—Helen L. Pezzuto
(74) *Attorney, Agent, or Firm*—Casimir Jones S.C.

(57) ABSTRACT

Synthesis methods for creating polymeric compounds comprising dihydroxyphenyl derivatives (DHPD), or DHPp i.e. polymers modified with DHPD, with desired surface active effects are described. The polymer backbone of DHPp has structural or performance features that can be tailored to control physical properties of DHPp, allowing it to be useful for different applications i.e. tissue adhesives or sealants, adhesion promoting coatings, and antifouling coatings.

17 Claims, 19 Drawing Sheets

U.S. PATENT DOCUMENTS

| | | | |
|---|---|---|---|
| 6,093,686 A | 7/2000 | Nakada et al. | |
| 6,129,761 A | 10/2000 | Hubbell | |
| 6,150,461 A | 11/2000 | Takei et al. | |
| 6,156,348 A | 12/2000 | Santos et al. | |
| 6,162,903 A | 12/2000 | Trowern et al. | |
| 6,235,313 B1 | 5/2001 | Mathiowitz et al. | |
| 6,267,957 B1 | 7/2001 | Green et al. | |
| 6,284,267 B1 | 9/2001 | Aneja | |
| 6,294,187 B1 | 9/2001 | Boyce et al. | |
| 6,306,993 B1 | 10/2001 | Rothbard et al. | |
| 6,309,669 B1 | 10/2001 | Setterstrom et al. | |
| 6,322,996 B1 | 11/2001 | Sato et al. | |
| 6,325,951 B1 | 12/2001 | Soper et al. | |
| 6,331,422 B1 | 12/2001 | Hubbell et al. | |
| 6,335,430 B1 | 1/2002 | Qvist | |
| 6,365,187 B2 | 4/2002 | Mathiowitz et al. | |
| 6,368,586 B1 | 4/2002 | Jacob et al. | |
| 6,417,173 B1 | 7/2002 | Roufa et al. | |
| 6,486,213 B1 | 11/2002 | Chen et al. | |
| 6,491,903 B1 | 12/2002 | Forster et al. | |
| 6,497,729 B1 | 12/2002 | Moussy et al. | |
| 6,506,577 B1 | 1/2003 | Deming et al. | |
| 6,555,103 B2 | 4/2003 | Leukel et al. | |
| 6,565,960 B2 | 5/2003 | Koob et al. | |
| 6,566,074 B1 | 5/2003 | Goetinck | |
| 6,566,406 B1 | 5/2003 | Pathak et al. | |
| 6,635,274 B1 | 10/2003 | Masiz et al. | |
| 6,663,883 B1 | 12/2003 | Akiyama et al. | |
| 6,821,530 B2 | 11/2004 | Koob et al. | |
| 6,887,845 B2 | 5/2005 | Barron et al. | |
| 7,009,034 B2 | 3/2006 | Pathak et al. | |
| 7,208,171 B2 | 4/2007 | Messersmith et al. | |
| 7,300,991 B2 * | 11/2007 | Nishimura et al. | 526/303.1 |
| 2001/0043940 A1 | 11/2001 | Boyce et al. | |
| 2001/0049400 A1 | 12/2001 | Alli et al. | |
| 2002/0022013 A1 | 2/2002 | Leukel et al. | |
| 2002/0049290 A1 | 4/2002 | Vanderbilt | |
| 2002/0182633 A1 | 12/2002 | Chen et al. | |
| 2003/0009235 A1 | 1/2003 | Manrique et al. | |
| 2003/0012734 A1 | 1/2003 | Pathak et al. | |
| 2003/0039676 A1 | 2/2003 | Boyce et al. | |
| 2003/0065060 A1 | 4/2003 | Qvist et al. | |
| 2003/0069205 A1 | 4/2003 | Roufa et al. | |
| 2003/0087338 A1 | 5/2003 | Messersmith et al. | |
| 2003/0099682 A1 | 5/2003 | Moussy et al. | |
| 2003/0109587 A1 | 6/2003 | Mori | |
| 2003/0208888 A1 | 11/2003 | Fearing et al. | |
| 2004/0005421 A1 | 1/2004 | Gervase et al. | |
| 2004/0028646 A1 | 2/2004 | Gross et al. | |
| 2005/0032929 A1 | 2/2005 | Greener | |
| 2005/0288398 A1 | 12/2005 | Messersmith et al. | |
| 2006/0009550 A1 | 1/2006 | Messersmith et al. | |

FOREIGN PATENT DOCUMENTS

| | | |
|---|---|---|
| WO | WO 88/03953 | 6/1988 |
| WO | WO 92/10567 | 6/1992 |
| WO | WO 94/28937 | 12/1994 |
| WO | WO 97/34016 | 9/1997 |
| WO | WO 98/07076 | 2/1998 |
| WO | WO 01/44401 A1 | 6/2001 |
| WO | WO 02/34764 A1 | 5/2002 |
| WO | WO 03/008376 A2 | 1/2003 |
| WO | WO 03/080137 A1 | 10/2003 |
| WO | WO 2004/042068 A2 | 5/2004 |
| WO | WO 2005/070866 A2 * | 8/2005 |

OTHER PUBLICATIONS

Lee et al. Macromolecules (2006), 39(5), 1740-1748.*

Barbakadze, V. et al, "Poly[3-(3,4-Dihydroxyphenyl)glyceric Acid]: A New Biologically Active Polymer from Symphytum Asperum Lepech. And S. caucasicum Bieb.(Boraginaceae)", Molecules, 10, pp. 1135-1144. Sep. 30, 2005.

Advincula, "Surface Initiated Polymerization from Nanoparticle Surfaces," *J. Dispersion Sci. Technol.*, vol. 24, Nos. 3 & 4 (2003), pp. 343-361.

Ahmed, et al., "Synthesis and Application of Fluorescein-Labeled Pluronic Block Copolymers to the Study of Polymer-Surface Interactions," *Langmuir*, vol. 17, No. 2 (2001), pp. 537-546.

Alexandridis, P.; Nivaggioli, T.; Hatton, T. A., "Temperature Effects on Structural Properties of Pluronic P104 and F108 PEO-PPO-PEO Block Copolymer Solutions," *Langmuir*, vol. 11, No. 5 (1995), pp. 1468-1476.

Alexandridis, P., "Poly(ethylene oxide)-Poly(propylene oxide) Block Copolymer Surfactants," *Curr. Opin. Colloid Interface Sci.*, vol. 2, No. 5 (1997), pp. 478-489.

Alivisatos, P., "The use of nanocrystals in biological detection," *Nature Biotechnology*, vol. 22, No. 1 (2004), pp. 47-52.

Alleyne, Jr., et al., "Efficacy and biocompatibility of a photopolymerized, synthetic, absorbable hydrogel as a dural sealant in a canine craniotomy model," *J. Neurosurg.*, vol. 88 (1998), pp. 308-313.

Andreopoulos, et al., "Light-induced tailoring of PEG-hydrogel properties," *Biomaterials*, vol. 19 (1998), pp. 1343-1352.

Andrzejewska, et al., "The role of oxygen in camphorquinone-initiated photopolymerization," *Macromol. Chem. Phys.*, vol. 199 (1998), pp. 441-449.

Araujo, et al., "Interaction of Catechol and Gallic Acid with Titanium Dioxide in Aqueous Suspensions. 1. Equilibrium Studies," *Langmuir*, vol. 21 (2005), pp. 3470-3474.

Armstrong et al., "Scanning Microcalorimetric Investigations of Phase Transitions in Dilute Aqueous Solutions of Poly(oxypropylene)," *J. Phys. Chem.*, vol. 99 (1995), pp. 4590-4598.

Arnow, "Colorimetric Determination of the Component of 3, 4-Dihydroxyphemylalanine-Tyrosine Mixtures," *J. Biol. Chem.*, vol. 118 (1937), pp. 531-538.

Arzt et al., "From micro to nano contacts in biological attachment devices," *Proc. Nat. Acad. Sci. USA*, vol. 100 (2003), pp. 10603-10606.

Arzt, "Biological and artificial attachment devices: Lessons for materials scientists from flies and geckos," *Mater. Sci. Eng. C*, vol. 26 (2006), pp. 1245-1250.

Autumn et al., "Adhesive force of a single gecko foot-hair," *Nature*, vol. 405 (2000), pp. 681-685.

Autumn et al., "Evidence for van der Waals adhesion in gecko setae," *Proc. Nat. Acad. Sci. USA*, vol. 99 (2002), pp. 12252-12256.

Baird, et al. (2007), "Reduction of Incisional Cerebrospinal Fluid Leak Following Posterior Foss Surgery with the use of Duraseal," American Association of Neurosurgeons. Abstract retrieved Jul. 23, 2008, from AANS Abstract Center database. Available from: http://www.aans.org/library/article.aspx?ArticleId=42392.

Balsa-Canto, et al., "Reduced-Order Models for Nonlinear Distributed Process Systems and Their Application in Dynamic Optimization," *Ind. Eng. Chem. Res.*, vol. 43 (2004), pp. 3353-3363.

Banerjee, et al., "Derivatives of 3, 4-Dihydroxyphenylalanine for Peptide Synthesis," *J. Org. Chem.*, vol. 41, No. 18 (1976), pp. 3056-3058.

Barichello et al., "Absorption of insulin from Pluronic F-127 gels following subcutaneous administration in rats," *Int. J. Pharm.*, vol. 184 (1999), pp. 189-198.

Benedek, "End Uses of Pressure-Sensitive Products" in *Developments in Pressure-Sensitive Products*, Benedek (ed.), CRC Press: Boca Raton, FL (2006). pp. 539-596.

Bharathi, et al., "Direct synthesis of gold nanodispersions in sol-gel derived silicate sols, gels and films," *Chem. Commun.* (1997), pp. 2303-2304.

Bontempo, et al., "Atom Transfer Radical Polymerization as a Tool for Surface Functionalization," *Adv. Mater.*, vol. 14, No. 17 (2002), pp. 1239-1241.

Boogaarts, et al., "Use of a novel absorbable hydrogel for augmentation of dural repair: results of a preliminary clinical study," *Neurosurg.*, vol. 57 (2005), pp. 146-151.

Bromberg, "Novel Family of Thermogelling Materials via C—C Bonding between Poly(acrylic acid) and Poly(ethylene oxide)-*b*-poly(propylene oxide)-*b*-poly(ethylene oxide)," *J. Phys. Chem. B*, vol. 102 (1998), pp. 1956-1963.

Bromberg, "Self-Assembly in Aqueous Solutions of Polyether-Modified Poly(acrylic acid)," *Langmuir*, vol. 14 (1998), pp. 5806-5812.

Bromberg, "Temperature-responsive gels and thermogelling polymer matrices for protein and peptide delivery," *Advanced Drug Reviews*, vol. 31 (1998), pp. 197-221.

Brown, et al., "Micelle and Gel Formation in a Poly(ethylene oxide)/Poly(propylene oxide)/Poly(ethylene oxide) Triblock Copolymer in Water Solution. Dynamic and Static Light Scattering and Oscillatory Shear Measurements," *J. Phys. Chem.*, vol. 95 (1991), pp. 1850-1858.

Bruinsma, et al., "Bacterial adhesion to surface hydrophilic and hydrophobic contact lenses," *Biomaterials*, vol. 22 (2001), pp. 3217-3224.

Bryant, et al., "Cytocompatibility of UV and visible light photoinitiating systems on cultured NIH/3T3 fobroblasts in vitro," *J. Biomater. Sci. Polymer Edn*, vol. 11, No. 5 (2000), pp. 439-457.

Burdick, et al., "Synthesis and Characterization of Tetrafunctional Lactic Acid Oligomers: a potential In Situ Forming Degradable Orthopaedic Biomaterial," *J. Polym. Sci., Part A: Polym. Chem.*, vol. 39 (2001), pp. 683-692.

Burzio, et al., "Cross-Linking in Adhesive Quinoproteins: Studies with Model Decapeptides," *Biochemistry*, vol. 39 (2000), pp. 11147-11153.

Cabana, et al., "Study of the Gelation Process of Polyethylene Oxide$_a$—Polypropylene Oxide$_b$—Polyethylene Oxide$_a$ Copolymer (Poloxamer 407) Aqueous Solutions," *J. Colloid Interface Sci.*, vol. 190 (1997), pp. 307-312.

Campbell, et al., "Evaluation of Absorbable Surgical Sealants: In vitro Testing," Confluent Surgical, Inc. (2005) White Paper. Available from: http://www.confluentsurgical.com/pdf/ds/6070_DuraSeal_Invitro_WP13-25.pdf.

Carmichael, et al., "Selective Electroless Metal Deposition Using Microcontact Printing of Phosphine—Phosophonic Acid Inks," *Langmuir*, vol. 20 (2004), pp. 5593-5598.

Chalykh, et al., "Pressure-Sensitive Adhestion in the Blends of Poly(N-vinyl pyrrolidone) and Poly(ethylene glycol) of Disparate Chain Lengths," *J. of Adhes.*, vol. 78 (2002), pp. 667-694.

Chehimi, et al., "XPS investigations of acid-base interactions in adhesion. Part 3. Evidence for orientation of carbonyl groups from poly(methylmethacrylate) (PMMA) at the PMMA—glass and PMMA—$SiO_2$ interfaces," *J. Electron. Spectrosc. Relat. Phenom.*, vol. 63 (1993), pp. 393-407.

Chen, et al., "Temperature-Induced Gelation Pluronic-g-Poly(acrylic acid) Graft Copolymers for Prolonged Drug Delivery to the Eye," in Harris, et al. (eds.) *Poly(ethylene glycol): Chemistry and Biological Applications*. New York, NY: Oxford University Press USA, 1997. pp. 441-451.

Chen, et al., "Enzymatic Methods for in Situ Cell Entrapment and Cell Release," *Biomacromolecules*, vol. 4 (2003), pp. 1558-1563.

Collier, et al., "Enzymatic Modification of Self-Assembled Peptide Structures with Tissue Transglutaminase," *Bioconjugate Chem.*, vol. 14 (2003), pp. 748-755.

Collier, et al., "Self-Assembling Polymer-Peptide Conjugates: Nanostructural Tailoring," *Adv. Mater.*, vol. 16, No. 11 (2004), pp. 907-910.

Collins, et al., "Use of collagen film as a dural substitute: Preliminary animal studies," *J. Biomed. Mater. Res.*, vol. 25 (1991), pp. 267-276.

Connor, et al., "New Sol—Gel Attenuated Total Reflection Infrared Spectroscopic Method for Analysis of Adsorption at Metal Oxide Surfaces in Aqueous Solutions. Chelation of $TiO_2$, $ZrO_2$, and $Al_2O_3$ Surfaces by Catechol, 8-Quinolinol, and Acetylacetone," *Langmuir*, vol. 11 (1995), pp. 4193-4195.

Cosgrove, et al., "Safety and efficacy of a novel polyethylene glycol hydrogel sealant for watertight dural repair," *J. Neurosurg.*, vol. 106 (2007), pp. 52-58.

Cosgrove, "Safety and Efficacy of a Novel PEG Hydrogel Sealant (DuraSeal®) for Watertight Closure after Dural Repair," Presented at the Congress of Neurological Surgeons 55th Annual Meeting, Boston, MA, Oct. 2005. Available from: http://www.confluentsurgical.com/pdf/ds/CosgroveAbstractCNS2005.pdf.

Crescenzi, et al., "New Gelatin-Based Hydrogels via Enzymatic Networking," *Biomacromolecules*, vol. 3 (2002), pp. 1384-1391.

Creton, "Pressure-Sensitive Adhesives: An Introductory Course," *MRS Bulletin*, vol. 26, No. 6 (2003), pp. 434-439.

Crosby, et al., "Rheological properties and adhesive failure of thin viscoelastic layers," *J. Rheol.*, vol. 46, No. 1 (2002), pp. 273-294.

Crosby, et al., "Controlling Polymer Adhesion with "Pancakes"," *Langmuir*, vol. 21 (2005), pp. 11738-11743.

Cruise, et al., "A Sensitivity Study of the Key Parameters in the Interfacial Photopolymerization of Poly(etheylene glycol) Dlacrylate upon Porcine Islets," *Biotechnol. Bioeng.*, vol. 57, Issue 6 (1998), pp. 655-665.

Dai, et al., "Novel pH-Responsive Amphiphilic Diblock Copolymers with Reversible Micellization Properties," *Langmuir* 19 (2003). pp. 5175-5177.

Dalsin, et al., "Surface Modification for Protein Resistance Using a Biomimetic Approach," *Mat. Res. Soc. Symp. Proc.*, vol. 774 (2002), pp. 75-80.

Dalsin, et al., "Mussel Adhesive Protein Mimetic Polymers for the Preparation of Nonfouling Surfaces," *J. Am. Chem. Soc.* 125 (2003). pp. 4253-4258.

Dalsin, et al., "Antifouling Performance of Poly(ethylene glycol) Anchored onto Surfaces by Mussel Adhesive Protein Mimetic Peptides," *Polymeric Materials Science and Engineering* 90 (2004). pp. 247-248.

Dalsin, et al., "Protein Resistance of Titanium Oxide Surfaces Modified by Biologically Inspired mPEG—DOPA," *Langmuir* 21 (2005). pp. 640-646.

Davis, et al., "Polymeric microspheres as drug carriers," *Biomaterials* 9 (1), 1988. pp. 111-115.

Deible, et al., "Creating molecular barriers to acute platelet deposition on damaged arteries with reactive polyethylene glycol," *J. Biomed. Maters. Res.* 41 (1998). pp. 251-256.

Deming, "Mussel byssus and biomolecular materials," *Current Opinion in Chemical Biology*, 3(1), 1999. pp. 100-105.

Deming, et al., "Mechanistic Studies of Adhesion and Crosslinking in Marine Adhesive Protein Analogs," *Polym. Mater. Sci. Eng.*, 80 (1999). pp. 471-472.

Deruelle, et al., "Adhesion at the Solid—Elastomer Interface: Influence of the Interfacial Chains," *Macromolecules*, vol. 28 (1995), pp. 7419-7428.

Desai, et al., "In Vitro Evaluation of Pluronic F127-Based Controlled-Release Ocular Delivery Systems for Polocarpine," *J. Phar. Sci.*, 87 (2), 1998. pp. 226-230.

Dillow, et al., "Adhesion of $\alpha_5\beta_1$ receptors to biomimetic substrates constructed from peptide amphiphiles," *Biomaterials*, vol. 22 (2001), pp. 1493-1505.

Donkerwolcke, et al., "Tissue and bone adhesives—historical aspects," *Biomaterials* 19 (1998). pp. 1461-1466.

Dossot, et al., "Role of Phenolic Derivatives in Photopolymerization of an Acrylate Coating," *J. Appl. Polymer. Sci.*, 78 (2000). pp. 2061-2074.

Drumheller, et al., "Polymer Networks with Grafted Cell Adhesion Peptides for Highly Biospecific Cell Adhesive Substrates," *Anal. Biochem.*, vol. 222 (1994), pp. 380-388.

Elbert, et al., "Reduction of fibrous adhesion formation by a copolymer possessing an affinity for anionic surfaces," *J. Biomed. Mater. Res.*, vol. 42, Issue 1(1998), pp. 55-65.

Elisseeff, et al., "Photoencapsulation of chondrocytes in poly(ethylene oxide)-based semi-interpenetrating networks," *J. Biomed. Mater. Res.*, vol. 51, Issue 2 (2000), pp. 164-171.

Erli, et al., "Surface pretreatments for medical application of adhesion," *BioMed. Eng. Online*, 2 (15), 2003. Available from: http://www.biomedical-engineering-online.com/content/2/2/15.

Fan et al., "Surface-Initiated Polymerization from $TiO_2$ Nanoparticle Surfaces through a Biomimetic Initiator: A New Route toward Polymer-Matrix Composites," *Comp. Sci. Tech.*, 66 (9), 2006. pp. 1195-1201.

Fang, et al., "Effect of Molecular Structure on the Adsorption of Protein on Surfaces with Grafted Polymers," *Langmuir*, vol. 18 (2002), pp. 5497-5510.

Faulkner, et al., "A New Stable Pluronic F68 Gel Carrier for Antibiotics in Contaminated Wound Treatment," *Am. J. Emerg. Med.*, 15 (1), 1997. pp. 20-24.

Feldstein, et al., "Molecular Design of Hydrophilic Pressure-Sensitive Adhesives for Medical Applications," in *Developments in Pressure-Sensitive Products*, I. Benedek (ed.). 2006, CRC Press: Boca Raton, FL. pp. 473-503.

Filpula, et al., "Structural and Functional Repetition in a Marine Mussel Adhesive Protein," *Biotechnol. Prog.* 6 (1990). pp. 171-177.

Fischer, et al., "In vitro cytotoxicity testing of polycations: influence of polymer structure on cell viability and hemolysis," *Biomaterials* 24 (2003). pp. 1121-1131.

Flanigan, et al., "Adhesive and Elastic Properties of Thin Gel Layers," *Langmuir*, vol. 15 (1999), pp. 4966-4974.

Flanigan, et al., "Structural Development and Adhesion of Acrylic ABA Triblock Copolymer Gels," *Macromolecules*, vol. 32 (1999), pp. 7251-7262.

Flood, et al., "Efficient Asymmetric Epoxidation of α,β-Unstarudated Ketones Using a Soluble Triblock Polyethylene Glycol-Polyamino Acid Catalyst," *Org. Lett.*, vol. 3, No. 5 (2001), pp. 683-686.

Floudas, et al., "Hierarchical Self-Assembly of Poly(γ-benzyl-L-glutamate)—Poly(ethylene glycol)—Poly(γ-benzyl-L-glutamate) Rod—Coil—Rod Triblock Copolymers," *Macromolecules*, vol. 36 (2003), pp. 3673-3683.

Flory, et al., "Effect of Volume Exclusion on the Dimensions of Polymer Chains," *J. Chem. Phys.*, vol. 44, No. 6 (1966), pp. 2243-2248.

Floyd-Smith, et al., "Interferon Action: RNA Cleavage Pattern of a (2'-5')Oligoadenylate-Dependent Endonuclease," *Science*, vol. 212, No. 4498 (May 29, 1981), pp. 1030-1032.

Frank, et al., "Adhesion of *Mytilus edulis* Foot Protein 1 on Silica: Ionic Effects on Biofouling," *Biotechnol. Prog.* 18 (2002). pp. 580-586.

Fuchsbauer, et al., "Influence of gelatin matrices cross-linked with transglutaminase on the properties of an enclosed bioactive material using β-galactosidase as model system," *Biomaterials* 17 (1996). pp. 1481-1488.

Fujisawa, et al., "Kinetic Evaluations of the Reactivity of Flavonoids as Radical Scavengers," *SAR QSAR Environ. Res.*, Vo. 13, No. 6(2002), pp. 617-627.

Fuller, et al., "A Procedure for the Facile Synthesis of Amino-Acid N-Carboxyanhydrides," *Biopolymers* 15 (1976). pp. 1869-1871.

Fuller, et al., "DOPA-Containing Polypeptides. I. Improved Synthesis of High-Molecular—Weight Poly (L-DOPA) and Water-Soluble Copolypeptides," *Biopolymers* 17 (1978). pp. 2939-2943.

Geim, et al., "Microfabricated adhesive mimicking gecko foot-hair," *Nat. Materials* 2 (2003). pp. 461-463.

Ghosh, et al., "N,N'-Disuccinimidyl Carbonate: A Useful Reagent for Alkoxycarbonylation of Amines," *Tetra. Lett.* 33 (20), 1992. pp. 2781-2784.

Gidanian, et al., "Redox behavior of melanins: direct electrochemistry of dihydroxyindole-melanin and its Cu and Zn adducts," *J. Inorg. Biochem.* 89 (2002). pp. 54-60.

Green, et al., "A surface plasmon resonance study of albumin adssoption to PEO-PPO-PEO triblock copolymers," *J. Biomed. Res.* 42 (1998). pp. 165-171.

Gross, et al., "Amine Bindindg Sites in Acyl Intermediates of Transglutaminases," *J. Biol. Chem.* 242 (11) (1977). pp. 3752-3759.

Grotenhuis, et al,. "Synthetic Dural Sealant for Prevention of Postoperative CSF Leakage," Presented at the American Association of Neurological Surgeons; Apr. 2003, San Diego, CA. Available from: http://www.confluentsurgical.com/pdf/ds/AbstractGrotenhuisAbstract.pdf.

Grotenhuis, et al., "A Novel Absorbable Hydrogel for Dural Repair: Results of a Pilot Clinical Study," Confluent Surgical, Inc. (2005) White Paper. Available from: http://www.confluentsurgical.com/pdf/ds/DuraSeal_Pilot_Study_WP4-7-05.pdf.

Grotenhuis, "Costs of postoperative cerebrospinal fluid leakage: 1-year, retrospective analysis of 412 consecutive nontrauma cases," *Surg. Neurol.*, vol. 64, No. 6 (2005), pp. 493-494.

Gu, et al., "Synthesis of Aluminum Oxide/Gradient Copolymer Composites by Atom Transfer Radical Polymerization," *Macromolecules* 35 (2002). pp. 8913-8916.

Gu, et al., "The role of microbial biofilms in deterioration of space station candidate materials," *Int. Biodeterioration Biodegradation* 41 (1998). pp. 25-33.

Guvendiren, et al., "Adhesion in Self-Assembled Hydrogels with High DOPA Content," *Proceedings of the 30th Annual Meeting of the Adhesion Society* (2007).

Guvendiren, et al., "Synthesis and Adhesion Properties of DOPA Incorporated Acrylic Triblock Hydrogels," *Proceedings of the 29th Annual Meeting of the Adhesion Society* (2006). pp. 277-279.

Haemers, et al., "Effect of Oxidation Rate on Cross-Linking of Mussel Adhesive Proteins," *Biomacromolecules*, vol. 4 (2003), pp. 632-640.

Hajjaji, et al., "Effect of N-Alkybetaines on the Corrosion of Iron in 1 M HCI Soluction," *Corrosion*, vol. 49, No. 4 (1993), pp. 326-334.

Hanawa, et al., "XPS Characterization of the Surface Oxide Film of 316L Stainless Steel Samples that were Located in Quasi-Biological Environments," *Mater. Trans., JIM*, vol. 43, No. 12 (2002), pp. 3088-3092.

Hansen, et al., "Enzymatic Tempering of a Mussel Adhesive Protein Film," *Langmuir* 14 (1998). pp. 1139-1147.

Harris, "Laboratory Synthesis of Polyethylene Glycol Derivatives," *JMS—Rev. Macromol. Chem. Phys.*, vol. C25, No. 3 (1985), pp. 325-373.

Harris (ed.), "Introduction to Biotechnical and Biomedical Applications of Poly(Ethylene Glycol)" in *Poly(Ethylene Glycol) Chemistry: Biotechnical and Biomedical Applications*, Plenum Press: New York, 1992. pp. 1-14.

Hennink, et al., "Novel crosslinking methods to design hydrogels," *Adv. Drug Deliver. Rev.*, vol. 54 (2002), pp. 13-36.

Hern, et al., "Incorporation of adhesion peptides into nonadhesive hydrogels useful for tissue resurfacing," *J. Biomed. Mater. Res.*, vol. 39, Issue 2 (1998), pp. 266-276.

Hillery, et al., "The effect of adsorbed poloxamer 188 and 407 surfactants on the intestinal uptake of 60-nm polystyrene particles after oral administratin in the rat," *Int. J. Pharm.* 132 (1996). pp. 123-130.

Ho, et al., "Nanoseparated Polymeric Networks with Multiple Antimicrobial Properties," *Adv. Mater.* 16 (12), 2004. pp. 957-961.

Hoffman, "Hydrogels for biomedical applications," *Adv. Drug Deliver. Rev.*, vol. 43 (2002), pp. 3-12.

Hohenadl, et al., "Two Adjacent N-terminal Glutamines of BM-40 (Osteonectin, SPARC) Act as Amine Acceptor Sites in Transglutaminase$_c$-catalyzed Modification," *J. Biol. Chem.* 270 (40), 1995. pp. 23415-23420.

Hrkach, et al., "Synthesis of Poly(L-lactic acid-*co*-L-lysine) Graft Copolymers," *Macromolecules*, vol. 28 (1995), pp. 4736-4739.

Hu, et al., "Protection of 3,4-dihydroxyphenylalanine (DOPA) for Fmoc solid-phase peptide synthesis," *Tetra. Lett.* 41 (2000). pp. 5795-5798.

Hu, et al., "Rational Design of Transglutaminase Substrate Peptides for Rapid Enzymatic Formation of Hydrogels," *J. Am. Chem. Soc.*, vol. 125, (2003), pp. 14298-14299.

Huang, et al., "Synthesis and Characterization of Self-Assembling Block Copolymers Containing Adhesive Moieties," *Polym. Prepr.* 42 (2), 2001. pp. 147-148.

Huang, et al., "Synthesis and Characterization of Self-Assembling Block Copolymers Containing Bioadhesive End Groups," *Biomacromolecules* 3 (2002). pp. 397-406.

Huang, et al., "Covalent Attachment of Novel Poly(ethylene glycol)—Poly(DL-lactic acid) Copolymeric Micelles to TiO$_2$ Surfaces," *Langmuir* 18 (2002). pp. 252-258.

Huang, et al., "Functionalization of Surfaces by Water-Accelerated Atom-Transfer Radical Polymerization of Hydroxyethyl Methacrylate and Subsequent Derivatization," *Macromolecules* 35 (2002). pp. 1175-1179.

Huang, et al., "Poly(L-lysine)-g-poly(ethylene glycol) Layers on Metal Oxide Surfaces: Surface-Analytical Characterization and Resistance to Serum and Fibrinogen Adsorption," *Langmuir*, vol. 17 (2001), pp. 489-498.

Huang, "Molecular aspects of muco- and bioadhesion: Tethered structures and site-specific surfaces," *J. Controlled Release*, vol. 65 (2000), pp. 63-71.

Huber, et al., "Resolving the nanoscale adhesion of individual gecko spatulae by atomic force microscopy," *Biol. Lett.* 1 (2005). pp. 2-4.

Huber, et al., "Evidence for capillarity contributions to gecko adhesion from single spatula nanomechanical measurements," *Proc. Nat. Acad. Sci. USA*, 102 (45), 2005. pp. 16293-16296.

Huin-Amargier, et al., "New physically and chemically crosslinked hyaluronate (HA)-based hydrogels for artilage repair," *J. Biomed. Mater. Res.* 76A (2), 2006. pp. 416-424.

Hunter, "Molecular hurdles in polyfectin design and mechanistic background to polycation inducted cytotoxicity," *Adv. Drug Deliver. Rev.*, vol. 58 (2006). pp. 1523-1531.

Hutter, et al., "Calibration of atomic-force microscope tips," *Rev. Sci. Instrum.* 64 (7), Jul. 1993. pp. 1868-1873.

Hvidt, et al., "Micellization and Gelation of Aqueous Solutions of a Triblock Copolymer Studied by Rheological Techniques and Scanning Calorimetry," *J. Phys. Chem.* 98 (1994). pp. 12320-12328.

Hwang, et al., "Expression of Functional Recombinant Mussel Adhesive Protein Mgfp-5 in *Escherichia coli*," *Appl. Environ. Microbiol.* 70 (6), 2004. pp. 3352-3359.

Ikada, "Tissue Adhesives, in *Wound Closure Biomaterials and Devices*," Chu, et al. (eds.), CRC Press, Inc.: Boca Raton, FL, 1997. pp. 317-346.

International Search Report for PCT/US2003/034633; WO 2004/042068 A3 (May 21, 2005); Northwestern University (Applicant); Messersnnith, et al. (inventors).

International Search Report for PCT/US2005/006418; WO 2005/118831 A3 (Dec. 15, 2005); Northwestern University (Applicant); Messersmith, et al. (inventors).

International Search Report for PCT/US2005/024642; WO 2006/091226 A3 (Aug. 31, 2006); Northwestern University (Applicant); Messersmith, et al. (inventors).

International Search Report for PCT/US/2005/041280; WO 2006/055531 A3 (May 26, 2006); Northwestern University (Applicant); Messersmith, et al. (Inventors).

International Search Report for PCT/US2007/075299; WO 2008/019352 A3 (Feb. 14, 2008); Nerites Corporation (Applicant); Lee (Inventor).

International Search Report for PCT/US2002/23005; WO 03/008376 A3 (Jan. 30, 2003);

Ishihara, et al., "Photocrosslinkable chitosan as a dressing wound occlusion and accelerator in healing process," *Biomaterials*, vol. 23, No. 3 (2002), pp. 833-840.

Jackson, "Tissue sealants: Current status, future potential," *Nat. Med.*, vol. 2, No. 5, (May 1996), pp. 637-638.

Jackson, "Fibrin sealants in surgical practice: An overview," *Am. J. Surg.*, vol. 182 (2001), pp. 1S-7S.

Jänchen, et al., "Adhesion Energy of Thin Collagen Coatings and Titanium," *Surf. Interface Anal.*, vol. 27 (1999), pp. 444-449.

Jensen, et al., "Lipopeptides Incorporated into Supported Phospholipid Monolayers Have High Specific Activity at Low Incorporation Levels," *J. Am. Chem. Soc.*, vol. 126, No. 46 (2004), pp. 15223-15230.

Jeon, et al., "Protein-Surface Interactions in the Presence of Polyethylene Oxide," *J. Colloid. Interface Sci.*, vol. 142, No. 1 (1991), pp. 159-166.

Jewell, et al., "Pharmacokinetics of RheothRx Injection in Healthy Male Volunteers," *J. Phar. Sci.* vol. 86, No. 7 (1997), pp. 808-812.

Jo, et al., "Surface modification using silanated poly(ethylene glycol)s," *Biomaterials*, vol. 21 (2000), pp. 605-616.

Johnson, et al., "Surface Energy and Contact of Elastic Solids," *Proc. R. Soc. Lond., A*, vol. 324, No. 1558 (1971), pp. 301-313.

Jones, et al., "Controlled Surface-Initiated Polymerization in Aqueous Media," *Adv. Mater.*, vol. 13, No. 16 (2001), pp. 1256-121259.

Jones, et al., "In Situ forming biomaterials," *Oral Maxillofacial Surg. Clin. N. Am.*, vol. 14 (2002), pp. 29-38.

Kacher, et al., "DuraSeal MR and CT Imaging: Evaluation in a Canine Craniotomy Model,".

Kahlem, et al., "Peptides containing glutamine repeats as substrates for transglutaminase-catalyzed cross-linking: Relevance to diseases of the nervous system," *Proc. Natl. Acad. Sci. USA*, vol. 93 (Dec. 1996), pp. 14580-14585.

Kellaway, et al., "Oral Mucosal Drug Delivery," in *Oral Mucosal Drug Delivery*, Rathbone (ed.). 1996, Marcel Dekkers, Inc.: New York, NY. pp. 221-239.

Kenausis, et al., "Poly(L-lysine)-g-Poly(ethylene glycol) Layers on Metal Oxide Surfaces: Attachment Mechanism and Effects on Polymer Architecture on Resistance to Protein Adsoprtion," *J. Phys. Chem. B*, vol. 104 (2000), pp. 3298-3309.

Khudyakov, et al., "Kinetics of Photopolymerization of Acrylates with Functionality of 1-6," *Ind. Eng. Chem. Res.* 38 (1999). pp. 3353-3359.

Kingshott, et al., "Effects of cloud-point grafting, chain length, and density of PEG layers on competitive adsorption of ocular proteins," *Biomaterials* 23 (2002). pp. 2043-2056.

Kirschenbaum, et al., "Sequence-specific polypeptoids: A diverse family of heteropolymers with stable secondary structure," *Proc. Natl. Acad. Sci. USA* 95 (1998). pp. 4303-4308.

Kitano, et al., "Resistance of zwitterionic telomers accumulated on metal surfaces against nonspecific adsorption of proteins," *J. Colloid Interface Sci.* 282 (2005). pp. 340-348.

Klug, et al, "In Situ Analysis of Peptidyl DOPA in Mussel Byssus Using Rotational-Echo Double-Resonance NMR," *Arch. Biochem. Biophys.*, vol. 333, No. 1 (Sep. 1, 1996), pp. 221-224.

Kolb, et al., "Click Chemistry: Diverse Chemical Function from a Few Good Reactions," *Agnew. Chem. Int. Ed.*, vol. 40 (2001), pp. 2005-2021.

Koob, et al., "Mechanical and thermal properties of novel polymerized NDGA-gelatin hydrogels," *Biomaterials*, vol. 24 (2003), pp. 1285-1292.

Korobkova, et al., "From molecular noise to behavioural variability in a single bacterium," *Nature* 428 (2004). pp. 574-578.

Kummert, et al., "The Surface Complexation of Organic Acids of Hydrous $\gamma$-$Al_2O_3$," *J Colloid Interface Sci.*, vol. 75, No. 2 (Jun. 1980), pp. 373-385.

Laucournet, et al., "Catechol derivatives and anion adsorption onto alumina surfaces in aqueous media: influence on the electrokinetic properties," *J. Eur. Ceram. Soc.* 21 (2001). pp. 869-878.

LaVoie, et al., "Dopamine covalently modifies and functionally inactivates parkin," *Nature Med.* 11 (11), 2005. pp. 1214-1221.

Lee, et al., "Enzymatic and Non-Enzymatic Pathways to Formation of DOPA-Modified PEG Hydrogels," *Polymer Preprints* 42 (2), 2001. pp. 151-152.

Lee, et al., "Synthesis and Gelation of DOPA-Modified Poly(ethylene glycol) Hydrogels," *Biomacromolecules* 3 (2002). pp. 1038-1047.

Lee, et al., "Synthesis of 3,4-dihydroxyphenylalanine (DOPA) containing monomers and their co-polymerizations with PEG-diacrylate to form hydrogels," *J. Biomater. Sci. Polymer Edn*, 15 (4), 2004, pp. 449-464.

Lee, et al., "Rapid Gel Formation and Adhesion in Photocurable and Biodegradable Block Copolymers with High DOPA Content," *Macromolecules* 39 (2006). pp. 1740-1748.

Lee, et al., "Biomimetic Adhesive Polymers Based on Mussel Adhesive Proteins," in *Biological Adhesives*, Smith, et al. (eds.), Springer-Verlag: Berlin Heidelberg, 2006. pp. 257-278.

Lee, et al., "Single-Molecule Mechanics of Mussel Adhesion," *Proc. Natl. Acad. Sci. USA*, vol. 103, No. 35 (2006), pp. 12999-13003.

Lee, et al., "Bioadhesive-Based Dosage Forms: The Next Generation," *J. Pharm. Sci.* 89 (7) (2000). pp. 850-866.

Lee, et al., "Hydrogels for Tissue Engineering," *Chem. Rev.*, vol. 101, No. 7 (Jul. 2001), pp. 1869-1879.

Lemieux, et al., "Block and Graft Copolymers and Nanogel™ Copolymer Networks for DNA Delivery into Cell," *J. of Drug Targeting* 8 (2), 2000. pp. 91-105.

Li, et al., "Protein Adsortion on Oligo(ethylene glycol)-Terminated Alkanethiolate Self-Assembled Monolayers: The Molecular Basis for Nonfouling Behavior," *J. Phys. Chem. B* 109 (2005). pp. 2934-2941.

Li, et al., "Copper-Based Metallization for ULSI Applications," *MRS Bulletin* 18 (6), Jun. 1993. pp. 18-21.

Li, et al., "Chemical Modifications of Surface Active Poly(ethylene oxide)—Poly(propylene oxide) Triblock Copolymers," *Bioconj. Chem.* 7 (1996). pp. 592-599.

Li, et al., "Two-Level Antibacterial Coating with Both Release-Killing and Contact-Killing Capabilities," *Langmuir* 22 (24), 2006. pp. 9820-9823.

Long, et al., "A peptide that inhibits hydroxyapatite growth is in an extended conformation on the crystal surface," *Proc. Natl. Acad. Sci. USA* 95 (1998). pp. 12083-12087.

Lorand, et al., "Transglutaminases," *Mol. Cell. Biochem.*, vol. 58 (1984), pp. 9-35.

Love, et al., "Self-Assembled Monolayers of Thiolates on Metals as a Form of Nanotechnology," *Chem. Rev.* 105 (2005). pp. 1103-1169.

Lovich, et al., "Arterial heparin deposition: role of diffusion, convection, and extravascular space," *Am. J. Phsyiol.—Heart C.*, vol. 275 (1998), pp. 2236-2242.

Lu, et al., "Studies on the synthesis and antibacterial activities of polymeric quaternary ammonium salts from dimethylaminoethyl methacrylate," *Reactive & Functional Polymers* 67 (2007). pp. 355-366.

Lucast, "Adhesive considerations for developing stick-to-skin products," *Adhesives Age* 43 (2000). pp. 36, 38-39.

Luo, et al., "Surface-Initiated Photopolymerization of Poly(ethylene glycol) Methyl Ether Methacrylate on a Diethyldithiocarbamate-Mediated Polymer Substrate," *Macromolecules*, vol. 35 (2002), pp. 2487-2493.

Lyman, et al., "Characterization of the formation of interfacially photopolymerized thin hydrogels in contact with arterial tissue," *Biomaterials* 17 (1996). pp. 359-364.

Martin, et al., "Surface Structures of a 4-Chlorocatechol Adsorbed on Titanium Dioxide," *Environ. Sci. Technol.*, vol. 30 (1996), pp. 2535-2542.

Maugh, et al., "Recombinant bioadhesive proteins of marine animals anad their use in adhesive compositions," in Genex Corp. 1988: USA. pp. 196 (1987).

Matyjaszewski, et al., "Atom Transfer Radical Polymerization," *Chem. Rev.* 101 (2001). pp. 2921-2990.

McBride, "Adsorption and Oxidation of Phenolic Compounds by Iron and Manganese Oxides," *Soil Sci. Soc. Am. J.*, vol. 51 (1987), pp. 1466-1472.

McWhitrter, et al., "Siderophore-Mediated Covalent Bonding to Metal (Oxide) Surfaces during Biofilm Initiation by *Pseudomonas aeruginosa* Bacteria," *Langmuir*, vol. 19 (2003), pp. 3575-3577.

Meisel, et al., "Estimation of calcium-binding constants of casein phosphopeptides by capillary zone electrophoresis," *Anal. Chim. Acta* 372 (1998). pp. 291-297.

Mellott, et al., "Release of protein from highly cross-linked hydrogels of poly(ethylene glycol) diacrylate fabricated by UV polymerization," *Biomaterials*, vol. 22 (2001), pp. 929-941.

Merrifield, "Solid Phase Peptide Synthesis. I. The Synthesis of a Tetrapeptide," *J. Am. Chem. Soc.*, vol. 85 (Jul. 20, 1963), pp. 2149-2154.

Merrill, "Distinctions and Correspondences among Surfaces Contacting Blood," *Annals of the NY Acad. Sci.* 516 (1987). pp. 196-203.

Miron, et al., "A Simplified Method for the Preparation of Succinimidyl Carbonate Polyethylene Glycol for Coupling to Proteins," *Bioconj. Chem.* 4 (1993). pp. 568-569.

Morgan, et al., "Biochemical characterisation of polycation-induced cytotoxicity to human vascular endothelial cells," *Journal of Cell Science* 94 (3), 1989,. pp. 553-559.

Morikawa, "Tissue sealing," *Am. J. Surg.*, vol. 182 (2001), pp. 29S-35S.

Mougin, et al., "Construction of Cell-Resistant Surfaces by Immobilization of Poly(ethylene glycol) on Gold," *Langmuir*, vol. 20 (2004), pp. 4302-4305.

Mowery, et al., "Adhesion of Thermally Reversible Gels to Solid Surfaces," *Langmuir*, vol. 13 (1997), pp. 6101-6107.

Mrksich, et al., "Using Self-Assembled Monolayers that Present Oligo(ethylene glycol) Groups to Control the Interactions of Proteins with Surfaces," *American Chemical Society Symposium Series on Chemistry and Biological Applications of Polyethylene Glycol*, vol. 680 (1997), pp. 361-373.

Mukkamala, et al., "Hydrogel Polymers from Alkylthio Acrylates for Biomedical Applications," *Polymer Gels: Fundamentals and Applciations* 833 (2003). pp. 163-174.

Müller, et al., "Interaction of differentiated HL60 cells with poloxamer and poloxamine surface modified model drug carriers," *Eur. J. Phar. Sci.* 5 (1997). pp. 147-153.

Nakagawa, et al., "ENH, Containing PDZ and LIM Domains, Heart/Skeletal Muscle-Specific Protein, Associates with Cytoskeletal Proteins through the PDZ Domain," *Biocehm. Biophys. Res. Commun.* 272 (2000). pp. 505-512.

Nakayama, et al., "Newly Designed Hemostatic Technology Based on Photocurable Gelatin," *ASAIO J.*, vol. 41, No. 3 (1995), pp. M374-M378.

Nakayama, et al., "Photocurable Surgical Tissue Adhesive Glues Composed of Photoreactive Gelatin and Poly(ethylene glycol) Diacrylate," *J. Biomed. Mater. Res.*, vol. 48, Issue 4 (1999), pp. 511-521.

Nakayama, et al., "Development of high-performance stent: gelatinous photogel-coated stent that permits drug delivery and gene transfer," *J. Biomed. Mater. Res.*, vol. 57, Issue 4 (2001), pp. 559-566.

Nakonieczna, et al., "A New Convenient Route for the Synthesis of DOPA Peptides," *Liebigs Annalen der Chemie*, Issue 10 (1994). pp. 1055-1058.

Neff, et al., "A novel method for surface modification to promote cell attachment to hydrophobic substrates," *J. Biomed. Mater. Res.* 40 (1998). pp. 511-519.

Ninan, et al., "Adhesive strength of marine mussel extracts on porcine skin," *Biomaterials* 24 (2003). pp. 4091-4099.

Nishiyama, et al., "Effects of a strucutural change in collagen upon binding to conditioned dentin studied by $^{13}$C NMR," *J. Biomed. Mater. Res.*, vol. 29 (1995), pp. 107-111.

Nishiyama, et al., "Adhesion mechanisms of resin to etched dentin primed with N-methacryloyl glycine studied by $^{13}$C-NMR," *J. Biomed. Mater. Res.*, vol. 40 (1998). pp. 458-463.

Nishiyama, et al., "Adhesion of N-Methacryloyl-ω-Amino Acid Primers to Collagen Analyzed by $^{13}$C NMR," *J. Dent. Res.*, vol. 80, No. 3 (2001), pp. 855-859.

Northen, et al., "A batch fabricated biomimetic dry adhesive," *Nanotechnology* 16 (8), 2005. pp. 1159-1166.

Northen, et al., "Meso-scale adhesion testing of integrated micro- and nano-scale structures," *Sensors and Actuators A* 130-131 (2006). pp. 583-587.

Nyström, et al., "Dynamic Light Scattering and Rheological Studies of Thermoreversible Gelation of a Poly(ethylene oxide)-Poly(propylene oxide)-Poly(ethylene oxide) Triblock Copolymer in Aqueous Solution," *Faraday Discuss*. 101 (1995). pp. 335-344.

Nyström, et al., "Dynamic Viscoelasticity of an Aqueous System of a Poly(ethylene oxide)—Poly(propylene oxide)—Poly(ethylene oxide) Triblock Copolymer during Gelation," *J. Phys. Chem.* 100 (1996). pp. 5433-5439.

O'Keefe, et al., "Poloxamer-188 as an Adjunct to Primary Percutaneous Transluminal Coronary Angioplasty for Acute Myocardial Infarction," *Am. J. Cardiol.* 78 (1996). pp. 747-750.

Okino, et al., "In situ hydrogelation of photocurable gelatin and drug release," *J. Biomed. Mater. Res.*, vol. 59, Issue 2 (2001), pp. 233-245.

Online Medical Dictionary. "Amino acid." Available from: http://cancerweb.ncl.ac.uk/cgi-bin/omd?query=amino+acid.

Ono, et al., "Photocrosslinkable chitosan as a biological adhesive," *J. Biomed. Mater. Res.*, vol. 49, Issue 2 (1999), pp. 289-295.

Ooka, et al., "Surface-Enhanced Raman Spectroscopy of DOPA-Containing Peptides Related to Adhesive Protein of Marine Mussel, *Mytilus edulis*," *Biopolymers (Biospectroscopy)*, vol. 57, Issue 2 (2000), pp. 92-102.

Orban, et al., "Cytomimetic Biomaterials. 4. In-Situ Photopolymerization of Phospholipids on an Alkylated Surface," *Macromolecules* 33 (2000). pp. 4205-4212.

Ostuni, et al., "A Survey of Structure—Property Relationships of Surfaces that Resist the Adsorption of Protein," *Langmuir* 17 (2001). pp. 5605-5620.

Palmer, et al., "Surfactant Administration Reduces Testicular Ischemia-Reperfusion Injury,"*J. Urol.* 159 (1998). pp. 2136-2139.

Papov, et al., "Hydroxyarginine-containing Polyphenolic Proteins in the Adhesive Plaques of the Marine Mussel *Mytilus edulis*," *J. Biol. Chem.* 270 (34) (1995). pp. 20183-20192.

Pardo, et al., "Purification of Adhesive Proteins from Mussels," *Protein Expression and Purif.* 1 (2), 1990. pp. 147-150.

Parsons, "Characteristics of the amino acids as components of a peptide hormone sequence," in *Peptide Hormones*, University Park Press: 1976. pp. 1-7.

Pasche, et al., "Effects of Ionic Strength and Surface Charge on Protein Adsorption at PEGylated Surfaces," *J. Phys. Chem. B* 109 (2005). pp. 17545-17552.

Patel, et al., "Synthesis of Benzyl Esters of α-Amino Acids," *J. Org. Chem.* 30 (1965). pp. 3575-3576.

Peressadko, et al, "When Less is More: Experimental Evidence for Tenacity Enhancement by Division of Contact Area," *J. Adhes.* 80 (2004). pp. 247-261.

Perruchot, et al., "Synthesis of Well-Defined, Polymer-Grafted Silica Particles by Aqueous ATRP," *Langmuir*, vol. 17 (2001), pp. 4479-4481.

Pierpont, et al., "Transition Metal Complexes of *o*-Benzoquinone, *o*-Semiquinone, and Catecholate Ligands," *Coord. Chem. Rev.*, vol. 38 (1981), pp. 45-87.

Preul, et al., "A Unique Dual-Function Device: A Dural Sealant with Adhesion Prevention Properties,".

Preul, et al., "Use of a Novel Hydrogel Sealant in a Canine Dural Repair Model," Presented at the American Association of Neurological Surgeons; Apr. 2002, Chicago, IL. Available from http://www.confluentsurgical.com/pdf/ds/AbstractOBNI_PreulAbstract.pdf.

Preul, et al., "Obtaining Watertight Closures of Duraplasty Onlay Grafts in a Craniotomy Preclinical Model," Confluent Surgical, Inc. (2005), 'White Paper.' Available from: http://www.confluentsurgical.com/pdf/LT-6000-034RevA-DuraSeal_duraplasy_study_white_paper.pdf.

Prime, et al., "Adsorption of Proteins onto Surfaces Containing End-Attached Oligo(ethylene oxide): A Model System Using Self-Assembled Monolayers," *J. Am. Chem. Soc.* 115 (1993). pp. 10714-10721.

Prucker, et al., "Polymer Layers through Self-Assembled Monolayers of Initiators," *Langmuir*, vol. 14 (1998), pp. 6893-6898.

Pyun, et al., "Synthesis of Polymer Brushes Using Atom Transfer Radical Polymerization," *Macromol. Rapid. Commun.* 24 (2003). pp. 1043-1059.

Rajh, et al., "Surface Restructuring of Nanoparticles: An Efficient Route for Ligand-Metal Oxide Crosstalk," *J. Phys. Chem. B*, vol. 106 (2002), pp. 10543-10552.

Ramakrishna, et al., "Effect of Particle Size on the Reactivity of Quantum Size ZnO Nanoparticles and Charge-Transfer Dynamics with Adsorbed Catechols," *Langmuir*, vol. 19 (2003), pp. 3006-3012.

Ranger, et al., "Pneumostasis of Experimental Air Leaks with a New Photopolymerized Synthetic Tissue Sealant," *Am. Surg.*, vol. 63, Issue 9 (1997), pp. 788-795.

Reed, et al., "A One-Step Synthesis of Monoprotected Polyethylene Glycol Ethers," *J. Org Chem.*, vol. 65 (2000), pp. 5843-5845.

Rodriguez, et al., "Surface Complexation at the $TiO_2$ (anatase)/Aqueous Solution Interface: Chemisorption of Catechol," *J. Colloid Interface Sci.*, vol. 177 (1996), pp. 122-131.

Rodriguez-Hernández, et al., "High Branched Poly(L-lysine)," *Biomacromolecules*, vol. 4 (2003), pp. 249-258.

Ross-Murphy, "Rheological Characterization of Polymer Gels and Networks," *Polym. Gels Networks*, vol. 2 (1994), pp. 229-237.

Rozier, et al., Gelrite® : A novel, ion-activated, in situ gelling polymer for ophthalmic vehicles. Effect on bioavailability of timolol, *Int. J. Pharm.* 57 (2), 1989. pp. 163-168.

Ruel-Gariépy, et al., "In situ-forming hydrogels—review of temperature-sensitive systems," *Eur. J. Pharm. Biopharm.* 58 (2004). pp. 409-426.

Ruibal, et al., "The Structure of the Digital Setae of Lizards," *J. Morph.* 117 (1965). pp. 271-294.

Ryu, et al., "A Generalized Approach to the Modification of Solid Surfaces," *Science* 308 (2005). pp. 236-239.

Rzepecki, et al., "α,β-Dehydro-3,4-dihydroxyphenylalanine Derivatives: Potential Schlerozation Intermediates in Natural Composite Materials," *Arch. Biochem. Biophys.* 285 (1) (1991). pp. 17-26.

Rzepecki, et al., "Wresting the muscle from mussel beards: research and applications," *Mol. Mar. Biol. Biotech.* 4 (4) (1995). pp. 313-322.

Rzepecki, et al., "Bioadhesives: DOPA and Phenolic proteins as components of organic composite materials" , *Principles of Cell Adhesion*, P.D. Richardson and M. Steiner (eds.), CRC Press, Boca Raton, FL. (1995). pp. 107-142142.

Saby, et al., "*Mytilus edulis* Adhesive Protein (MAP) as an Enzyme Immobilization Matrix in the Fabrication of Enzyme-Based Electrodes," *Electroanalysis* 10 (17) (1998). pp. 1193-1199.

Sanborn, et al., "In situ crosslinking of a biomimetic peptide-PEG hydrogel via thermally triggered activation of factor XIII," *Biomaterials*, vol. 23 (2002), pp. 2703-2710.

Sawada, et al., "Micropatterning of Copper on a Poly(ethylene terephthalate) Substrate Modified with a Self-Assembled Monolayer," *Langmuir* 22 (2006). pp. 332-337.

Sawhney, et al., "Interfacial photopolymerization of poly(ethylene glycol)-based hydrogels upon alginate-poly(*l*-lysine) microcapsules for enhanced biocompatibility," *Biomaterials*, vol. 14, No. 13 (1993), pp. 1008-1016.

Sawhney, et al., "Bioerodible Hydrogels Based on Photopolymerized Poly(ethylene glycol)-*co*-poly(α-hydroxy acid) Diacrylate Macromers," *Macromolecules*, vol. 26 (1993), pp. 581-587.

Schmolka, "Articifial Skin. I. Preparation and Properties of Pluronic F-127 Gels for Treatment of Burns," *J. Biomed. Mater. Res.* 6 (6) (1972). pp. 571-582.

Schnurrer, et al., "Mucoadhesive properties of the mussel adhesive protein," *Int. J. Pharm.* 141 (1996). pp. 251-256.

Sever, et al., "Synthesis of peptides containing DOPA (3.4-dihydroxyphenylalanine)," *Tetrahedron* 57 (2001). pp. 6139-6146.

Sever, et al., "Metal-Mediated Cross-Linking in the Generation of a Marine-Mussel Adhesive," *Angew. Chem. Int. Ed.*, vol. 43 (2004), pp. 448-450.

Shull, et al., "Fracture Mechanics Studies of Adhesion in Biological Systems," *Interface Sci.*, vol. 8 (2000), pp. 95-110.

Shull, "Contact mechanics and the adhesion of soft solids," *Mater. Sci. Eng., R* 36 (2002). pp. 1-45.

Sichel, et al., "Relationship Between Melanin Content and Superoxide Dismutase (SOD) Activity in the Liver of Various Species of Animals," *Cell Biochem. Funct.* 5 (1987). pp. 123-128.

Sierra, "Fibrin Sealant Adhesive Systems: A Review of Their Chemistry, Material Properties and Clinical Applications," *J. Biomed. Appl.*, vol. 7 (1993), pp. 309-352.

Sitti, et al., "Synthetic Gecko Foot-Hair Micro/Nano-Structures as Dry Adhesives," *J. Adhes. Sci. Technol.*, vol. 17, No. 8 (2003), pp. 1055-1073. Available from: http://nanolab.me.cmu.edu/publications/papers/Sitti-JAST2003.pdf.

Skelhorne, et al., "Hydrogel Adhesives for Wound-Care Applications," *Medical Device Technology* (Nov. 2002). pp. 19-23.

Soriaga, et al., "Determination of the Orientation of Adsorbed Molecules at Solid-Liquid Interfaces by Thin-Layer Electrochemistry: Aromatic Compounds at Platinum Electrodes," *J. Am. Chem. Soc.* 104 (1982). pp. 2735-2742.

Sousa, et al., "Human Serum Albumin Adsorption on $TiO_2$ from Single Protein Solutions and from Plasma," *Langmuir*, vol. 20 (2004), pp. 9745-9754.

Sperinde, et al., "Synthesis and Characterization of Enzymatically-Cross-Linked Poly(ethylene glycol) Hydrogels," *Macromolecules* 30 (18) (1997). pp. 5255-5264.

Sperinde, et al., "Control and Prediction of Gelation Kinetics in Enzymatically Cross-Linked Poly(ethylene glycol) Hydrogels," *Macromolecules* 33 (2000). pp. 5476-5480.

Spolenak, et al., "Adhesion design maps for bio-inspired attachment systems," *Acta Biomater.* 1 (2005). pp. 5-13.

Spotnitz, "History of Tissue Adhesives." In: Sierra, et al. (eds.), *Surgical Adhesives and Sealants: Current Technology and Applications*. Technomic Publishing Company, Inc.: Lancaster, PA (1997). pp. 3-11.

Spotnitz, "Commercial fibrin sealants in surgical care," *Am. J. Surg.* 182 (2001). pp. 8S-14S.

Statz, et al., "New Peptidomimetic Polymers for Antifouling Surfaces," *J. Am. Chem. Soc.*, vol. 127, No. 22 (2005), pp. 7972-7973.

Stevens, "Trace bio-organic constituents of gelatins—a review," *Food Australia*, vol. 44, No. 7 (1992), pp. 320-324.

Stile, et al., "Sequential robust design methodology and X-ray photoelectron spectroscopy to analyze the grafting of hyaluronic acid to glass substrates," *J. Biomed. Mater Res.*, vol. 61, Issue 3 (2002), pp. 391-398.

Stiles, et al., "Axisymmetric Adhesion Test to Examine the Interfacial Interactions between Biologically-Modified Networks and Models of the Extracellular Matrix," *Langmuir*, vol. 19 (2003), pp. 1853-1860.

Strausberg, et al., "Protein-based medical adhesives," *Trends in Biotechnology* 8 (2) (1990). pp. 53-57.

Strausberg, et al., "Development of a microbial system for production of mussel adhesive protein." in: *Adhesives from Renewable Resources*. Hemingway, et al. (eds.), ACS Symposium Series 385, American Chemical Society, Washington, D.C. (1989). pp. 453-464.

Sugumaran, et al., "Chemical- and Cuticular Phenoloxidase-Mediated Synthesis of Cysteinyl-Catechol Adducts," *Arch. Insect Biochem. Physiol.* 11 (2) (1989). pp. 127-137.

Sugumaran, "Unified Mechanism for Sclerotization of Insect Cuticle," *Adv. Insect. Physiol.*, vol. 27 (1998), pp. 229-334.

Sun, et al., "Improved antifouling property of zwitterionic ultrafiltration membrane composed of acrylonitrile and sulfobetaine copolymer," *J. Of Memr. Sci.* 285 (2006). pp. 299-305.

Sun, et al., "The Nature of the Gecko Lizard Adhesive Force," *Biophys. J.* 89 (2005). pp. L14-L16.

Swerdloff, et al., "Solid phase synthesis of bioadhesive analogue peptides with trifluoromethanesulfonic acid cleavage from PAM resin," *Int J. Peptide Protein Res.*, vol. 33 (1989), pp. 318-327.

Tae, et al., "Sustained release of human growth hormone from in situ forming hydrogels using self-assembly of fluoroalkyl-ended poly-(ethylene glycol)," *Biomaterials*, vol. 26. (2005), pp. 5259-5266.

Taira, et al., "Analysis of Photo-iniators in Visible-light-cured Dental Composite Resins," *J. Dent. Res.*, vol. 67, No. 1 (1988), pp. 24-28.

Tan, et al., "Surface modification of nanoparticles by PEO/PPO block copolymers to minimize interactions with blood components and prolong blood circulation in rats," *Biomaterials*, vol. 14, No. 11 (1993), pp. 823-833.

Tatehata, et al., "Model Polypeptide of Mussel Adhesive Protein. I. Synthesis and Adhesive Studies of Sequential Polypeptides (X-Tyr-Lys)$_n$ and (Y-Lys)$_n$," *J. Appl. Polym. Sci.*, vol. 76, No. 6 (2000), pp. 929-937.

Taylor, et al., "Polargraphic and Spectrophotometric Investigation of Iron(III) Complexation to 3,4-Dihydroxyphenylalanine-Containing Peptides and Proteins from *Mytilus edulis*," *Inorg. Chem.*, vol. 33 (1994), pp. 5819-5824.

Taylor, et al., "*trans*-2,3-*cis*-3,4-Dihydroxyproline, a New Naturally Occurring Amino Acid, Is the Sixth Residue in the Tandemly Repeated Consensus Decapeptides of an Adhesive Protein from *Mytilus edulis*," *J. Am. Chem. Soc.*, vol. 116 (1994), pp. 10803-10804.

Taylor, et al., "Ferric Ion Complexes of a DOPA-Containing Adhesive Protein from *Mytilus edulis*," *Inorg. Chem.*, vol. 35 (1996), pp. 7572-7577.

Uyama, et al., "Surface Modification of Polymers by Grafting," *Advances in Polymer Science*, vol. 137 (1998), pp. 1-39.

Venkatraman, et al., "Skin adhesives and skin adhesion. 1. Transdermal drug delivery systems," Biomaterials, vol. 19 (1998), pp. 1119-1136.

Vörös, et al., "Optical grating coupler biosensors," *Biomaterials*, vol. 23 (2002), pp. 3699-3710.

Waite, "Evidence for a Repeating 3,4-Dihydroxyphenylalanine- and Hydroxyproline-containing Decapeptide in the Adhesive Protein of the Mussel, *Mytilus edulis* L.," *J. Biol. Chem.*, vol. 258, No. 5 (1983), pp. 2911-2915.

Waite, et al., "Assay of Dihdroxyphenylalanine (Dopa) in Invertebrate Structural Proteins," *Methods Enzymol.*, vol. 107 (1984), pp. 397-413.

Waite, "Adhesion à la Moule," *Integr. Comp. Biol.*, vol. 42 (2002), pp. 1172-1180.

Waite, "Mussel Beards: a Coming of Age" *Chem. Ind.* (Sep. 2, 1991), pp. 607-611.

Waite, "Nature's underwater adhesive specialist," *Int. J. Adhes. Adhes.*, vol. 7, No. 1 (1987), pp. 9-14.

Waite, "Nature's underwater adhesive specialist," *Chemtech*, vol. 17 (1987), pp. 692-697.

Waite, et al., "3,4-Dihydroxyphenylalanine in an Insoluble Shell Protein of *Mytilus edulis*," *Biochem. Biophys. Acta*, vol. 541 (1978), pp. 107-114.

Waite, et al., "Polyphosphoprotein from the Adhesive Pads of *Mytilus edulis*," *Biochemistry*, vol. 40 (2001), pp. 2887-2893.

Waite, et al., "The Bioadhesive of *Mytilus byssus*: A Protein Containing L-DOPA," *Biochem. & Biophy. Res. Comm.*, vol. 96, No. 4 (1980), pp. 1554-1561.

Waite, et al., "Mussel Adhesion: Finding the Tricks Worth Mimicking," *J. Adhes.*, vol. 81 (2005), pp. 297-317.

Waite, et al., "Polyphenolic Substance of *Mytilus edulis*: Novel Adhesive Containing L-Dopa and Hydroxyproline," *Science*, vol. 212, No. 4498 (1981), pp. 1038-1040.

Waite, "Precursors of Quinone Tanning: Dopa-Containing Proteins," *Methods Enzymol.*, vol. 258 (1995), pp. 1-21.

Wang, et al., "Facile synthesis of well-defined water-soluble polymers via atom transfer radical polymerization in aqueous media at ambient temperature," *Chem. Commun.* (1999), pp. 1817-1818.

Wang, et al., "Facile Atom Transfer Radical Polymerization of Methoxy-Capped Oligo(ethylene glycol) Methacrylate in Aqueous Media at Ambient Temperature," *Macromolecules*, vol. 33 (2000), pp. 6640-6647.

Wanka, et al., "The aggregation behavior of poly-(oxyethylene)-poly-(oxypropylene)-poly-(oxyethylene)-block-copolymers in aqueous solution," *Cooloid. Polym. Sci.*, vol. 268 (1990), pp. 101-117.

Warner, et al., "Expression of multiple forms of an adhesive plaque protein in an individual mussel, *Mytilus edulis*," *Mar. Biol.*, vol. 134 (1999), pp. 729-734.

Watanabe, et al., "Bonding durability of photocured phenyl-P. in TEGDMA to smear layer-retained bovine dentin," *Quint. Int.*, vol. 24, No. 5 (1993), pp. 335-342.

Webber, et al., "Effects of geometric confinement on the adhesive debonding of soft elastic solids," *Phys. Rev. E*, vol. 68 (2003), pp. 021805-1-to-021805-11.

Whitesides, "The origins and the future of microfluidics," *Nature*, vol. 442 (2006), pp. 368-373.

Wisniewski, et al., "Methods for reducing biosensor membrane biofouling," *Colloids Surf, B*, vol. 18 (2000), pp. 197-219.

Yamada, "Chitosan Based Water-Resistant Adhesive. Analogy to Mussel Glue," *Biomacromolecules*, vol. 1 (2000), pp. 252-258.

Yamamoto, "Marine Adhesive Proteins and Some Biotechnological Applications," *Biotechnol. Genet. Eng. Rev.*, vol. 13 (1996), pp. 133-165.

Yamamoto, "Adhesive studies of synthetic polypeptides: A model for marine adhesive proteins," *J. Adhesion Sc!. Tech.*, vol. 1, No. 2 (1987), pp. 177-183.

Yamamoto, "Synthesis and Adhesive Studies of Marine Polypeptides," *J. Chem. Soc. Perkin Trans.*, vol. 1 (1987), pp. 613-618.

Yamamoto, "Insolubilizing and adhesive studies of water-soluble synthetic model proteins," *Int. J. Biol. Macromol.*, vol. 12 (1990), pp. 305-310.

Yamamoto, et al., "Synthesis and Adhesives of Marine Adhesive Proteins of the Chilean Mussel *Aula comya ater*," *Biomimetics*, vol. 1, No. 3 (1992), pp. 219-238.

Yamamoto, et al., "Work of Adhesion of Synthetic Polypeptides Containing *L*-Lysine," *J. Colloid Interface Sci.*, vol. 156 (1993), pp. 515-517.

Yamamoto, et al., "Wettability and Adhesion of Synthetic Marine Adhesive Proteins and Related Model Compounds," *J. Colloid Interface Sci.*, vol. 176 (1995), pp. 111-116.

Yang, et al., "Physicochemical aspects of drug delivery and release from polymer-based colloids," *Curr. Opin. Colloid Interface Sci.*, vol. 5 (2000), pp. 132-143.

Young, et al., "Marine Animals and Adhesion." In: Allen (ed.), *Adhesion 6*. Applied Science Publishers: London and New Jersey, 1982. pp. 19-39.

Yu, et al., "Micellisation and Gelation of Triblock Copoly(oxyethylene/oxypropylene/oxyethylene), F127," *J. Chem. Soc., Faraday Trans.*, vol. 88, No. 17 (1992), pp. 2537-2544.

Yu, et al., "Synthetic Polypeptide Mimics of Marine Adhesives," *Macromolecules*, vol. 31 (1998), pp. 4739-4745.

Yu, et al., "Role of L-3,4-Dihydroxyphenylalanine in Mussel Adhesive Proteins," *J. Am. Chem. Soc.*, vol. 121 (1999), pp. 5825-5826.

Yurdumakan, et al., "Synthetic gecko foot-hairs from multiwalled carbon nanotubes," *Chem. Commun.*, vol. 30 (2005), pp. 3799-3801.

Zekorn, et al., "Biocompatibility and immunology in the encapsulation of islets of Langerhans (bioartificial pancreas)," *Int. J. Artif. Organs*, vol. 19, No. 4 (1996), pp. 251-257.

Zeng, et al., "Synthesis and Characterization of DOPA-PEG Conjugates," *Polymer Preprints*, vol. 41, No. 1 (2000), pp. 989-990.

Zhan, et al., "Functionalization of Nano-Faujasite Zeolite with PEG-Grafted PMA Tethers Using Atom Transfer Radical Polymerization," *Macromolecules*, vol. 37 (2004), pp. 2748-2753.

Zhao, et al., "Polymer brushes: surface-immobilized macromolecules," *Prog. Polym. Sci.*, vol. 25 (2000), pp. 677-710.

Zuckermann, et al., "Efficient Method for the Preparation of Peptoids [Oligo(N-substituted glycines)] by Submonomer Solid-Phase Synthesis," *J. Am. Chem. Soc.*, vol. 114 (1992), pp. 10646-10647.

Dalsin et al., Bioinspired Antifouling Polymers. Materials Today 2005, 8, 9 (38-46).

Gristina, Biomaterial-Centered Infection—Microbial Adhesion Versus Tissue Integration. Science 1987, 237, (4822), 1588-1595.

Evans et al., Iron Chelator, Exopolysaccharide and Protease Production in Staphylococcus-Epidermidis—a Comparative-Study of the Effects of Specific Growth-Rate in Biofilm and Planktonic Culture. Microbiology-Uk 1994, 140, 153-157.

Yu et al., Adhesion of Coagulase-Negative Staphylococci and Adsorption of Plasma-Proteins to Heparinized Polymer Surfaces. Biomaterials 1994,15, (10), 805-814.

Jose et al., Vancomycin covalently bonded to titanium beads kills *Staphylococcus aureus*. Chemistry & Biology 2005, 12, (9), 1041-1048.

Desai et al., Surface-Immobilized Polyethylene Oxide for Bacterial Repellence. Bionnaterials 1992, 13, (7), 417-420.

Burdinski et al., Universal Ink for Microcontact Printing. Angwandte Chemie 2006, 45, 1-5.

Floriolli et al., Marine surfaces and the expression of specific byssal adhesive protein variants in Mytilus. Mar Biotechnol 2000, 2, 352-363.

Bain et al., Molecular-level Control over Surface Order in Self-Assembled Monolayer Films of Thiols on Gold. Science 1988, 240, (4848), 62-63.

Waite, Reverse engineering of bioadhesion in marine mussels. Bioartificial Organs ii: Technology, Medicine, and Materials 1999, 875, 301-309.

Pasche et al., Poly(1-lysine)-graft-poly(ethylene glycol) assembled monolayers on niobium oxide surfaces: A quantitative study of the influence of polymer interfacial architecture on resistance to protein adsorption by ToF-SIMS and in situ OWLS. Langmuir 2003,19,(22), 9216-9225.

Zhang et al., Reactive coupling of poly(ethylene glycol) on electroactive polyaniline films for reduction in protein adsorption and platelet adhesion. Biomaterials 2002, 23, (3), 787-795.

Holl et al., Solid-State NMR Analysis of Cross-Linking in Mussel Protein Glue. Archives of Biochemistry and Biophysics 1993, 302, (1),255-258.

International Search Report, PCT/US2008/050721.

\* cited by examiner

BIOMIMETIC COMPOUNDS AND SYNTHETIC METHODS THEREFOR

CROSS-REFERENCE TO RELATED APPLICATIONS

This application claims the benefit and priority of U.S. provisional application Ser. No. 60/821,459 filed on Aug. 4, 2006, the entirety of which is incorporated by reference herein. References incorporated by reference in the 60/821,459 application also are incorporated by reference herein.

REFERENCE TO GOVERNMENT FUNDING

$^1$H NMR was performed at National Magnetic Resonance Facility at Madison, which is supported by NIH (P41RR02301, P41GM66326, RR02781, RR08438), the NSF (DMB-8415048, OIA-9977486, BIR-9214394), the University of Wisconsin, and the USDA. This invention was made with government support under DE017827-01 and GM080774-01 awarded by NIH. The government has certain rights in the invention.

BACKGROUND OF THE INVENTION

Marine mussels are known for their ability to bind tenaciously to such varied surfaces as rocks, pilings, and ship hulls in a wet, turbulent, and saline environment.[1, 2] These marine organisms secrete adhesive proteins as liquids that rapidly harden to form adhesive plaques, all under water, allowing them to attach themselves to various surfaces. The water-resistant adhesive characteristics of mussel adhesive proteins (MAPs) are believed to be due to the presence of 3,4-dihydroxyphenylalanine (DOPA), which is also responsible for both interfacial adhesion and rapid hardening.[3-5]

There have been numerous attempts to engineer compounds that mimic the adhesive proteins secreted by marine mussels. These methods include the extraction of natural MAPs,[6-8] the use of recombinant DNA technologies to create adhesive proteins,[9-11] and synthesis of DOPA-containing peptides using both solid-phase and solution-phase methods.[12-15] Although these MAP-mimetic adhesives demonstrate strong adhesion to various surfaces,[12, 16-19] their adhesive formulations utilize peptide backbones, which can be costly to mass-produce and have limited physical properties. Messersmith and colleagues[20-23] have recently developed a series of DOPA-modified synthetic polymeric gels that demonstrate strong water-resistant adhesion. The same research group has also prepared coatings that can repel protein and cellular adsorption by chemically coupling a MAP-mimetic peptides to antifouling synthetic polymers.[24-28]

The approach of combining synthetic polymers with DOPA and its dihydroxyphenyl derivatives (DHPD) to form DHPD-modified adhesive polymers (DHPp) may have numerous applications in clinical, dental, and industrial arenas. The general structure of DHPp is shown in FIG. 1. DHPD can impart strong water-resistant adhesion as well as rapid and controllable intermolecular curing of the adhesive polymers. Different synthetic polymers can be used to control other physical properties such as but not limited to biocompatibility, solubility, biodegradability, self-assembling ability, chemical architecture, stimulus-response ability, branching, and molecular weight. Thus these molecules can be tailored to a particular use by varying the polymer portion of the compound. Specifically, the adhesive polymers described here not only can be designed to promote adhesion between two dissimilar surfaces, they can also be designed to prevent adhesion of undesirable particles (i.e. cells, proteins bacteria, etc). Additionally, inexpensive starting materials are used for the syntheses, which allow the subsequent adhesive polymers to be prepared inexpensively and in large quantities for commercialization. Furthermore, starting materials of known biocompatibility can be used to formulate these polymers, which makes them suitable for clinical applications.

New approaches to creating adhesive polymers modified with multiple DHPD are described herein. Different synthetic methods were used to combine the adhesive moiety, DHPD, with various biocompatible, synthetic compounds to create a library of adhesive polymers that can be designed for a desired application. These multi-DHPD polymers were tested for their potential as tissue adhesives, coatings for promoting adhesion, and coatings for adhesion prevention.

BRIEF SUMMARY OF THE INVENTION

Briefly, in one aspect, the present invention is a polymer or copolymer comprising a polymer backbone (pB) having attached, generally pendant, dihydroxyphenyl derivatives (DHPDs) to form a DHPD-modified polymer (DHPp) having: 1) a variable concentration, distribution, or number of DHPD moieties, which account for about 1 to about 100% by weight DHPp, preferably about 1-75% by weight in DHPp, 2) a total molecular weight between 1,000 and 5,000,000 Da, and 3) a pB with variable physical properties.

In a preferred embodiment of this aspect of the invention, DHPD preferably comprises from about 2 to about 65 weight percent of DHPp, more preferably about 3 to about 55 weight percent DHPp, and yet more preferably at least about 5 weight percent DHPp.

In a further preferred embodiment of this aspect of the invention, DHPp has a preferred total molecular weight in the range of about 3,000 to about 1,000,000 most preferably about 5,000 to about 500,000 Da.

More particularly, this present invention comprises a pB with pendant DHPD providing a DHPp generally of the structure (I):

(I).

wherein LG is an optional linking group and pB indicates the polymer backbone.

In DHPp, DHPD imparts: 1) the ability to bind to or adhere to a dissimilar substrate, surface, compound, or particle, both organic and inorganic, in an aqueous, humid, or non-aqueous environment, and 2) the ability to form irreversible (covalent bond) or reversible (hydrogen bond, electron π-π interaction) chemical crosslinks either with other DHPD, other functional groups (i.e. amine, thiol, hydroxyl, or carboxyl groups), or other reactive groups.

Additionally, the composition and chemical structure of the polymer backbone can be varied to control 1) the DHPD weight percent, 2) the molecular weight of the DHPp, and 3) the physical properties of DHPp (solubility, hydrophilicity-hydrophobicity, physical crosslinking ability, self-assembly ability, architecture, charge, degradability, among others) for a desired application.

In a further aspect the present invention is a polymer or copolymer comprising a pB having a controllable and variable number, concentration, or distribution of pendant DHPDs relative to the molecular weight of the DHPp. In a further variation, the pB is constructed from smaller molecular weight monomers, prepolymers, or oligomers having variable chemical compositions or containing pendant groups or moieties distributed along and between the DHPD pendant moieties (and in the pB) as is shown in structural formula (II):

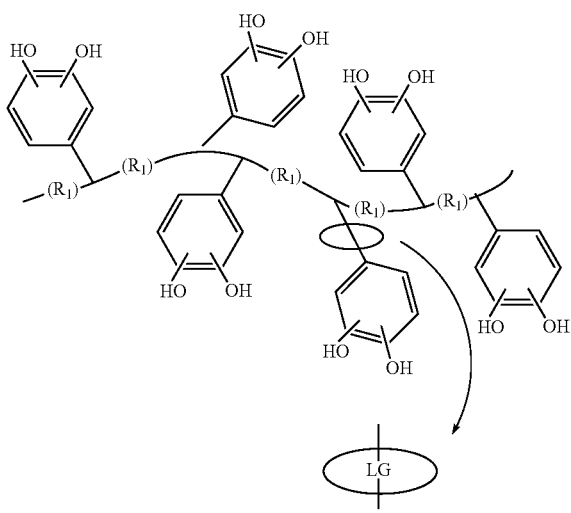

(II).

$R_1$ is a monomer, prepolymer, or oligomer linked or polymerized to form pB. The polymer backbone has structural or performance features or characteristics designed or introduced into it by means of the "in-line" or backbone linkages, $R_1$. In-line or backbone linkages or linking groups can be introduced to control or modify all of the polymer characteristics shown in the right box of Formula (I). Examples of such backbone linkages include but are not limited to amide, ester, urethane, urea, carbonate, or carbon-carbon linkages or the combination thereof.

Generally, DHPD can be illustrated as structural formula (III):

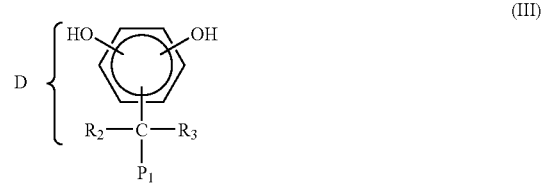

(III)

wherein $R_2$ and $R_3$ may be the same or different and are independently selected from the group consisting of hydrogen, saturated and unsaturated, branched and unbranched, substituted and unsubstituted $C_{1-4}$ hydrocarbon;

$P_1$ is separately and independently selected from the group consisting of —$NH_2$, —COOH, —OH, —SH,

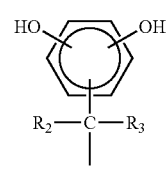

wherein $R_2$ and $R_3$ are defined above.
a single bond, halogen,

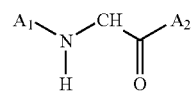

wherein $A_1$ and $A_2$ are separately and independently selected from the group consisting of H, a single bond;
a protecting group,
substantially poly(alkyleneoxide), $$A_3-(NH-\overset{D}{\underset{}{CH}}-\underset{\underset{O}{\|}}{C})_n OH$$

wherein n=1-3
and $A_3$ is $$H_2C=\underset{R_4}{C}-\overset{O}{\underset{}{\|}}{C}-$$

$R_4$ is H, $C_{1-6}$ lower alkyl, or

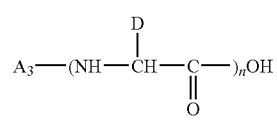

$R_5$ is defined the same as $R_2$ or $R_3$, above, and D is indicated in Formula (III).

In one aspect the poly(alkylene oxide) has the structure

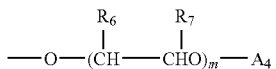

wherein $R_6$ and $R_7$ are separately and independently —H, or —$CH_3$ and m has a value in the range of 1-250, $A_4$ is —$NH_2$, —COOH, —OH, —SH, —H or a protecting group.

In a very preferred form, DHPD is

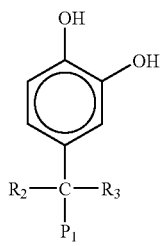

$R_2$, $R_3$, and $P_1$ being defined as above.

In a further preferred form DHPD is of the structure:

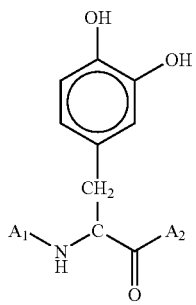

wherein $A_2$ is —OH and $A_1$ is substantially poly(alkylene oxide) of the structure

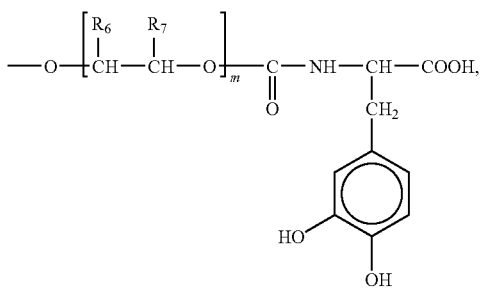

$R_6$, $R_7$ and m being defined as above. Generally speaking the poly(alklene oxide) is a block copolymer of ethylene oxide and propylene oxide.

A method of this invention involves adhering substrates to one another comprising the steps of providing DHPD of the structure:

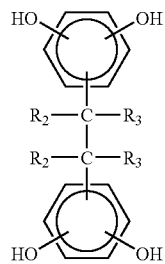

wherein $R_2$ and $R_3$ are defined as above; applying the DHPD of the above structure to one or the other or both of the substrates to be adhered; contacting the substrates to be adhered with the DHPD of the above structure therebetween to adhere the substrates to each other, and optionally repositioning the substrates relative to each other by separating the substrates and recontacting them to each other with the DHPD of the above structure therebetween.

In a preferred method, $R_2$ and $R_3$ are hydrogen.

In an yet preferred form, the DHPD is:

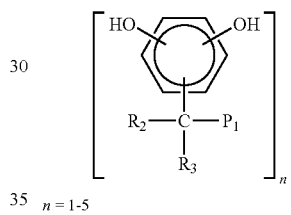

$n = 1\text{-}5$ wherein $P_1$, $R_2$ and $R_3$ are defined above, and n ranges between 1 and about 5. In one practice, $R_2$ and $R_3$ are hydrogen and $P_1$ is, itself, dihydroxy phenyl. A more preferred DHPD in a practice of the present invention is 3,4, dihydroxy phenyl alanine (DOPA), (generically),

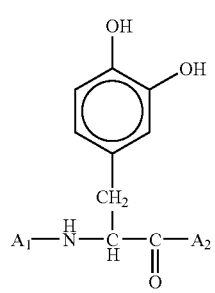

wherein $A_1$ and $A_2$ are defined above.

In yet another aspect of the present invention, DHPD has a general chemical structure formula (IV):

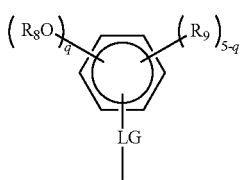

(IV).

wherein LG is a linking group that attaches DHPD to pB and is further defined below; $R_8$ is —H, protecting group, or metal ion, each $R_8$ structure being separately and independently selected from the indicated group; $R_9$ is other constituents chosen from —SH, —$NH_2$, COOH, alkyl, LG, halogen or a combination thereof, where each $R_9$ structure being separately and independently selected from the indicated group.

q is a value between 0 and 5 but is preferably 2.

LG is chosen from oligomers of substantially poly(alkylene oxide), acrylate, methacrylate, vinyl groups, and their derivatives, or having chemical structure formula (V):

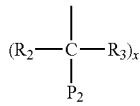

(V).

wherein $R_2$ and $R_3$ are defined above; x is a value between zero and four;

$P_2$ is selected from the group consisting of —$NH_2$, COOH, —OH, —SH, a single bond, halogen,

—NH—$A_5$—, wherein $A_5$ is selected from the group consisting of —H, —C, a single bond, a protecting group, substantially alkyl, poly(alkylene oxide), peptidal, acrylated, methacrylated, or the same as $A_1$ and $A_2$;

wherein $A_6$ is selected from the group of —OH, —NH—, in addition to the definition of $A_1$;

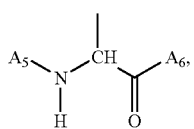

wherein $A_5$ and $A_6$ are defined above.

One preferred chemical structure of DHPD is:

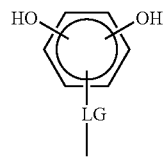

wherein LG is defined above.

An even more preferred form of DHPD is:

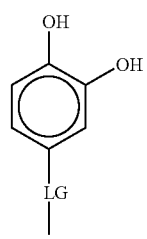

wherein LG is defined above.

It is even more preferable that DHPD be chosen from 3,4-dihydroxyphenylalanine (DOPA), dopamine, or 3,4-dihydroxyhydrocinnamic acid (DOHA), as well as precursors and further derivatized forms of said compounds. Examples of precursors include but are not limited to tyrosine, tyramine, hydrocinnamic acid, phenylalanine, benzenepropanoic acid, benzylethamine, 2,4,5-trihydroxyphenylalanine and other phenolic or benzyl compounds that can be hydroxylated or dehydroxylated to form DHPD. Examples of further derivatized forms of DHPD include DHPD with protecting group(s), DHPD bound to metal ion on the hydroxyl group(s), or DHPD modified with acrylate, methacrylate, substantially poly(alkylene oxide), peptide or oligomer containing DHPD and its precursors, and the combination thereof.

The composition and physical properties of pB are varied by the physical properties of, ratio of, composition, or combination of monomers or prepolymers used to construct said pB.

pB is constructed by polymerization, chain extension, linking, crosslinking or reaction of a single or more than one type of monomer or prepolymer.

pB is preferably a) linear or branched, b) mono-, bi-, tri-, or multi-functional to achieve a pB with linear, branched, hyperbranched, or brush architecture.

pB is preferably hydrophilic, hydrophobic or amphiphilic to achieve the desired solubility, stiffness, physical crosslinking ability, or self-assembly characteristics.

pB is preferably neutral, positively or negatively charged, or a combination thereof to achieve a neutral, charged, or zwitterionic pB.

pB is preferably polyether, polyester, polyamide, polyurethane, polycarbonate, or polyacrylate among many others and the combination thereof.

pB can be constructed of different linkages, but is preferably comprised of acrylate, carbon-carbon, ether, amide, urea, urethane, ester, or carbonate linkages or a combination thereof to achieve the desired rate of degradation or chemical stability.

pB of desired physical properties can be selected from prefabricated functionalized polymers or FP, a pB that contain functional groups (i.e. amine, hydroxyl, thiol, carboxyl, vinyl group, etc.) that can be modified with DHPD to from DHPp.

The actual method of linking the monomer or prepolymer to form a pB will result in the formation of amide, ester, urethane, urea, carbonate, or carbon-carbon linkages or the combination of these linkages, and the stability of the pB is dependent on the stability of these linkages.

The molecular weight of monomer or prepolymer can vary between about 50 and 20,000 Da but is preferably between about 60 and 10,000 Da.

The monomer or prepolymer is preferably a single compound or repeating monomer units of a single-, bi-, tri-, or multi-block structure.

The monomer or prepolymer is preferably comprised of single or multiple chemical compositions.

The monomer or prepolymer is preferably a) linear or branched, b) mono-, bi-, tri-, or multi-functional to achieve a pB with linear, branched, hyper-branched, or brush architecture.

The monomer or prepolymer is preferably monofunctional, bi-functional, or multifunctional with reactive or polymerizable functional groups such as amine, hydroxyl, thiol, carboxyl, and vinyl groups among others.

The monomer or prepolymer is preferably hydrophilic, hydrophobic or amphiphilic to achieve the desired pB solubility, physical crosslinking ability, or self-assembly ability.

The monomer or prepolymer is preferably neutral, positively or negatively charged, or combination thereof to achieve a neutral, charged, or zwitterionic pB.

The monomer or prepolymer is preferably polyether, polyester, polyamide, polyacrylate, polyalkyl, polysaccharide, and their derivatives or precursors, as well as the combination thereof.

"DHPD" as the term is used herein to mean dihydroxyphenyl derivative.

"DHPp" as the term is used herein to mean a pB modified with DHPD.

"Monomer" as the term is used herein to mean non-repeating compound or chemical that is capable of polymerization to form a pB.

"Prepolymer" as the term is used herein to mean an oligomeric compound that is capable of polymerization or polymer chain extension to form a pB. The molecular weight of a prepolymer will be much lower than, on the order of 10% or less of, the molecular weight of the pB.

Monomers and prepolymers can be and often are polymerized together to produce a pB.

"pB" as the term is used herein to mean a polymer backbone comprising a polymer, co-polymer, terpolymer, oligomer or multi-mer resulting from the polymerization of pB monomers, pB prepolymers, or a mixture of pB monomers and/or prepolymers. The polymer backbone is preferably a homopolymer but most preferably a copolymer. The polymer backbone is DHPp excluding DHPD.

"FP" as the term is used herein to mean a polymer backbone functionalized with amine, thiol, carboxy, hydroxyl, or vinyl groups, which can be used to react with DHPD to form DHPp.

"DHPD weight percent" as the term is used herein to mean the percentage by weight in DHPp that is DHPD.

"DHPp molecular weight" as the term is used herein to mean the sum of the molecular weights of the polymer backbone and the DHPD attached to said polymer backbone.

REFERENCE TO TABLES

Discussed in the following section is Tables 1A-1D, 2A-2F, 3A-3D, 4A-4C, 5-11. Those tables follow the References section as a group.

DETAILED DESCRIPTION OF THE INVENTION

Polymer Synthesis

Figure 1:
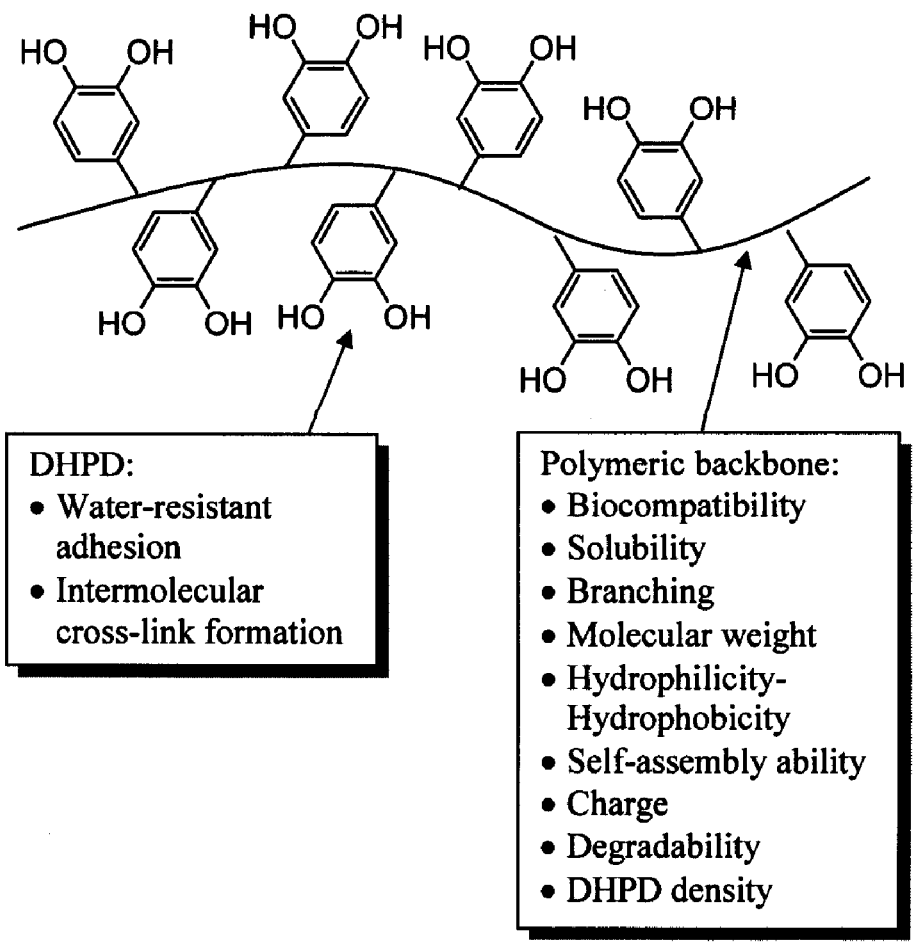
FIG. 1: General structure of DHPp.

The general structure of the multi-DHPD adhesive polymer is shown in FIG. 1. This polymer consists of multiple pendant DHPDs attached to a polymer backbone (pB). DHPD is incorporated to act as the water-resistant adhesive moiety as well as the intermolecular cross-linking precursor. The number of DHPDs in a DHPp can be used to control the adhesive nature of the polymer, as it has been demonstrated that higher DOPA content correlates to stronger adhesive strengths.[12, 22] Higher DHPD content can also increase the cure rate of these adhesive polymers.

The polymer backbone can be used to control different physical properties in these multi-DHPD polymers. A hydrophilic and water-soluble polymer backbone such as poly(ethylene glycol) (PEG) can be used to create a water soluble DHPp. Additionally, PEG has a very good biocompatibility profile and has been used in many products approved for clinical applications. Hydrophobic segments can be incorporated to increase the stiffness of the polymer backbone, which can result in aggregation of these hydrophobic regions in an aqueous media as well as increasing the mechanical strength of the chemically cured DHPp. Different types of chemical linkages can be used to control the stability and the rate of degradation of the polymer backbone. These linkages can vary from stable carbon-carbon, ether, urea, and amide linkages to urethane, ester and carbonate linkages that are easily hydrolysable. Finally, branched polymer backbones can be used to increase the curing rate of DHPp.

Figure 2:
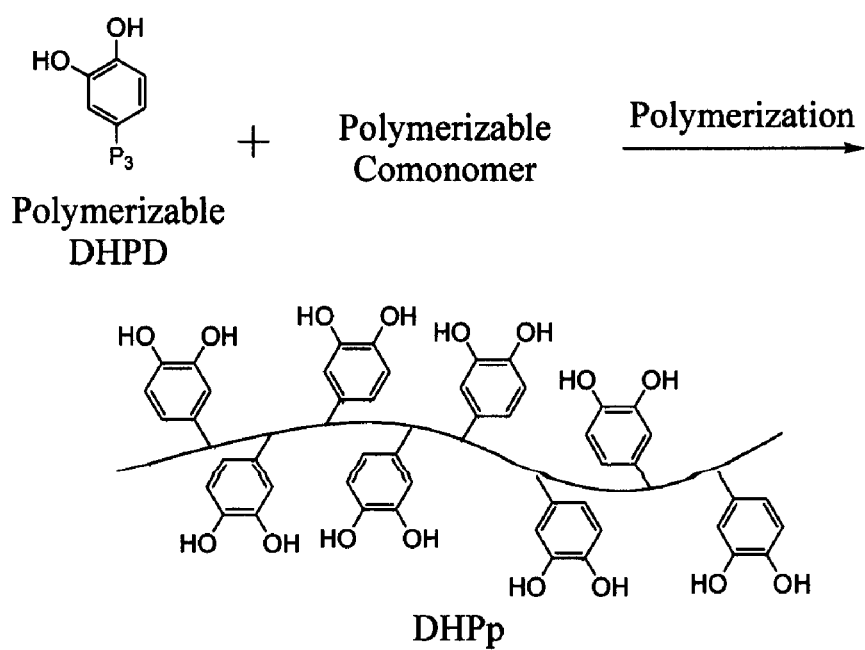
FIG. 2: General synthesis scheme 1—Polymerizable DHPD is copolymerized with polymerizable comonomer to form DHPp. $P_3$ is a polymerizable group such as vinyl, acrylate, or methacrylate group.

Three general types of synthetic methods were used to create multi-DHPD adhesive polymers. In the first method (FIG. 2), DHPD containing a polymerizable group (i.e. vinyl, acrylate, methacrylate) is copolymerized with one or multiple comonomer(s) to form a DHPp. In the second method (FIG. 3), a bifunctional prepolymer and a multifunctional chain extender undergo a polymer chain extension reaction to form a functionalized polymer (FP) that carries pendant functional groups (i.e. amine, thiol, hydroxyl, carboxyl, etc.) that can be further modified with DHPD to form DHPp. Finally, a pre-made FP is reacted with DHPD to form DHPp (FIG. 4). In all three synthesis methods, selection of starting materials (comonomer, prepolymer, FP) can be used to control the physical properties of the polymer backbone and ultimately the DHPp.

Synthetic Method 1: DHPD Polymerization

Figure 5:
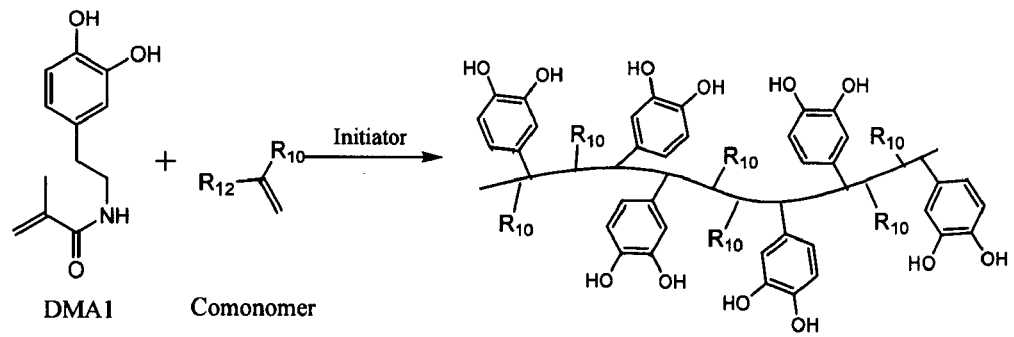
FIG. 5: Polymerization of DMA1 with a comonomer to form DHPp. $R_{10}$=comonomer side chain and $R_{12}$=H or —$CH_3$.

In this section, a series of DHpp were created by copolymerizing DHPD-modified acrylate or methacrylate (DMA) with one or multiple comonomer(s) using an intiator such as 2,2'-azobis(2-methylpropionitrile) (AIBN) as shown in FIG. 5. Polymerization was carried out without protection of the reactive DHPD side chain, which reduces the number of synthetic steps and allows the polymers to be prepared with a higher yield. Although phenolic compounds are known to be inhibitors and radical scavengers,[29-31] the removal of atmospheric oxygen allowed us to synthesize high molecular weight DHPp. Although AIBN-initiated free-radical polymerization is reported here, other polymerization techniques such as atom transfer radical polymerization (ATRP) and reversible addition-fragmentation chain transfer (RAFT) polymerization can potentially be used. However, DHPD side chain may be required to be protected during polymerization as the metallic catalyst used in ATRP could oxidize DHPD.

Figure 6:
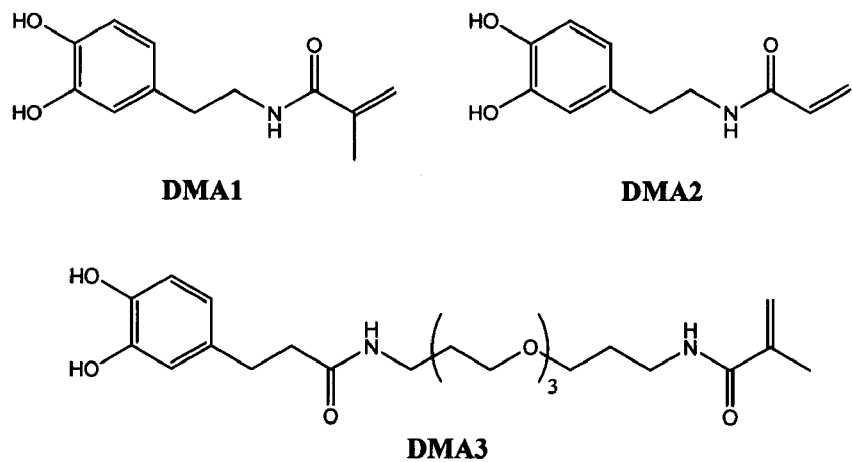
FIG. 6: Examples of DHP-modified with polymerizable vinyl group.

Possible chemical structures of polymerizable DHPD are illustrated in FIG. 6. These compounds consist of a catechol coupled to a polymerizable vinyl group. DMA1 was prepared by coupling dopamine to a methacrylate group while DMA2 was coupled to an acrylate group. The difference between these two DMA's lies in the presence of a methyl ($-CH_3$) group in the methacrylate group as opposed to a hydrogen ($-H$) in the acrylate group. The presence of the methyl group increases the hydrophobicity and the stiffness of the polymer backbone and reduces the solubility of the DHPp. DMA3 is created by linking a 3,4-dihydroxyhydrocinnamic acid (DOHA) to a methacrylate group with a short, hydrophilic oligomeric linker, 4,7,10-trioxa-1,13-tridecanediamine. This short linker in DMA3 allows the terminal DOHA to have better access for interfacial binding.

A list of monomers copolymerized with DMA is shown in Tables 1A-1E. These monomers range from PEG-based monomers of different molecular weights (Table 1A), to other neutral, hydrophilic (Table 1B), basic (Table 1C) acidic (Table 1D), and hydrophobic (Table 1E) monomers. Depending on the type of monomers used to copolymerize with DMA, adhesive polymers with a wide range of physical properties can be prepared (Tables 2A-2F). PEG-based polymers such as PDMA-1 to PDMA-5 are soluble in both water and a number of different organic solvents such as chloroform, N,N-dimethylformamide, and most alcohols (Table 2A). While polymers PDMA-6 to PDMA-10 are all water soluble, these compounds do not contain PEG (Table 2B). Table 2C lists two hydrophilic polymers that are not readily soluble in water. PDMA-11 is only water swellable while PDMA-12 is water insoluble. Additionally, copolymerization with a temperature-responsive monomer such as NIPAM resulted in PDMA-22, which is water soluble at a temperature lower than 32° C. and becomes insoluble at a higher temperature (Table 2F). Finally, a hydrophobic, fluorinated polymer such as PDMA-13 was also created (Table 2D). Most of the monomers described here are commercially available and inexpensive, or can be synthesized in large quantities, which makes scale-up of the adhesive polymer possible.

In addition to the above-mentioned two-component polymers, three-component polymers were created by copolymerizing DMA with two other types of monomers (Table 2E). In basic polymers such as polymers PDMA-14 through PDMA-17, a basic monomer such as APTA, AA, or DABMA (Table 1C) was used to introduce a positive charge into the DHPp while the third hydrophilic monomer (EG9ME or NAM) was used to render these adhesive polymers soluble in water as well as various organic solvents. On the other hand, acidic polymers with negative charges were also prepared (PDMA-18 through PDMA-21) using acidic monomers such as AMPS and EGMP (Table 1D). These charges on the polymer backbone may enhance the interfacial binding ability to surfaces of the opposite charge. Specifically, PDMA-21 contains phosphonic acid side chains that resemble the phosphorylated serines found in MAPs,[32] which have been shown to bind well to calcium or calcareous mineral surfaces.[33, 34] Additionally, polymers functionalized with quaternary ammonium groups have been found to have a bactericidal effect on contact.[35, 36] PDMA-6 was copolymerized from DMA1 and a zwitterion, SBMA, which contains both a negative charge and a positive charge in one molecule. These zwitterionic compounds have been found to have antifouling properties[37, 38] and corrosion inhibition effects.[39]

By varying reaction conditions such as the DMA-to-comonomer feed ratio and the monomer-to-initiator molar ratio, it was possible to control the molecular weight as well as the composition of the resulting polymers. As shown in Tables 2A-2F, DMA:monomer feed molar ratio was varied between 1:1 to 1:25, which resulted in DHPp with a DMA content ranging from over 32 wt % down to 4 wt %. Depending on the application, different amounts of DMA may be desired. For example, a high DMA content may be required for a coating that promotes adhesion, as enough DMA is needed to coat the support substrate as well as to promote adhesion to a second substrate. On the other hand, a lower DMA content may be needed for an antifouling coating, where it is desirable to have only enough DMA to coat the surface and no excess, as too much DMA could promote unwanted adhesion. Additionally, varying the monomer-to-initiator feed ratio resulted in adhesive polymers of different molecular weights. The molar ratio between the total amount of monomer and AIBN was varied from 25:1 to 250:1, which resulted in DHPD-modified polymers with molecular weights from 5,000 to over 1 million g/mol.

Figure 7:
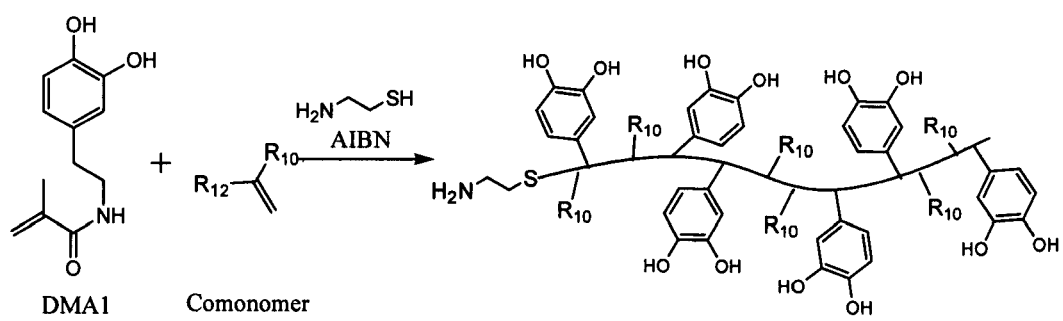
FIG. 7: Synthesis of amine terminated polymer using cysteamine as the chain transfer agent. $R_{10}$=comonomer side chain and $R_{12}$=—H or —$CH_3$.

The above-mentioned DHPp are linear, random copolymers of DMA and one or more other monomers. Changes can be made to the chemical architecture to further control the physical properties of these adhesive molecules. For example, branching in the polymer backbone can be used to decrease the rate of curing[21] and a branching point can be introduced by using a small amount (<1 mol %) of diacrylated monomers in the polymerization. A larger amount of these bifunctional monomers will result in the formation of a gel network. In addition to branching points, block copolymers can be created using living polymerization methods such as ATRP and RAFT. Finally, chain transfer agents (CTA) such as cysteamine (CA) can be used to introduce a terminal amine group as seen in FIG. 7, which can used for further modified with other active compounds (i.e. another polymer, ligand, fluorescent tag, etc.). Polymers (PDMA-22, PDMA-23, and PDMA-24) listed in Table 2F were prepared using CA as the CTA. Other CTA such as 3-mercaptopropionic acid (MPA) and 2-mercaptoethanol can be used to introduce a terminal carboxyl and a hydroxyl group, respectively.

Synthetic Method 2: Polymer Chain Extension

Figure 3:
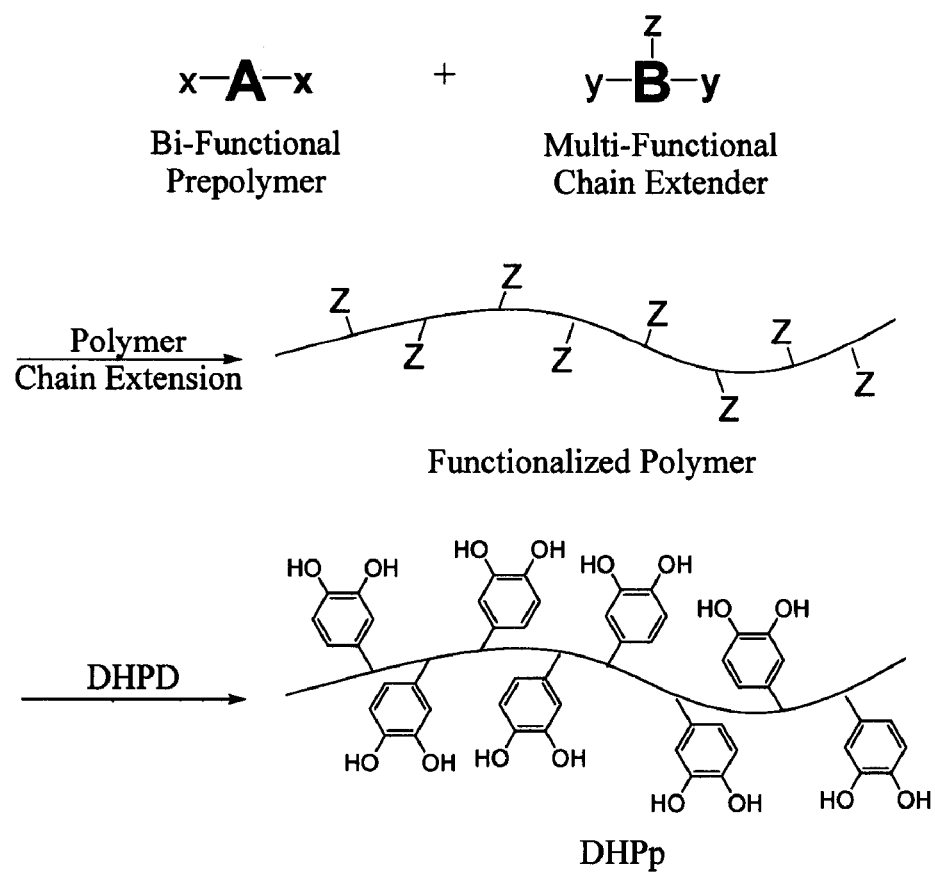
FIG. 3: General synthesis scheme 2—Polymer chain extension reaction between a bifunctional prepolymer and a multi-functional chain extender to form a functionalized polymer and the subsequent coupling with DHPD to form DHPp. x, y and Z are functional groups (—$NH_2$, —OH, —SH, —COOH, etc.), where x reacts only with y, and Z is remained to react with DHPD.
Figure 4:
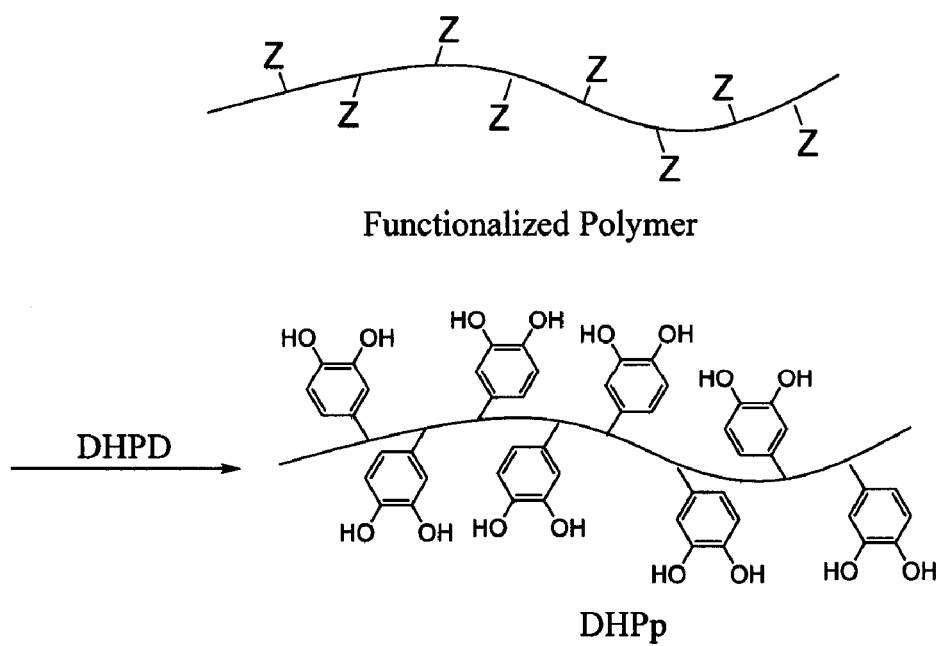
FIG. 4: General synthesis scheme 3-Reaction of DHPD with commercially available or prefabricated functionalized polymer to from DHPp. Z is a functional group such as —$NH_2$, —OH, —SH, —COOH, etc., which can react with DHPD.

As shown in FIG. 3, the functionalized polymers (FP) described here are prepared by chain extension of small molecular weight bi-functional prepolymers (x-A-x, MW=200-10,000) with a multifunctional chain extender (y-B(-z)-y). The functionalized polymer is further modified with DHPD to yield DHPp. Since the prepolymer accounts for the majority of the weight fraction (70-95 wt %) of DHPp, the composition of this prepolymer will have a significant effect on the physical properties of the DHPp. For example, if a hydrophilic prepolymer such as PEG is used, the resulting DHPp will be water soluble. Similar water-insoluble DHPp can be created using hydrophobic prepolymers such as poly (propylene glycol) or polyesters such as poly(caprolactone) (PCL). More than one type of prepolymer can be used during the chain extension reaction to further refine the physical properties of DHPp. Combining hydrophilic and hydrophobic prepolymers will result in a water-soluble DHPp that can undergo physical crosslinking in aqueous media, which may result in microscale aggregation of the polymer, increased viscosity, thermally-induced gel formation, or enhancement of mechanical properties of networks chemically cured from DHPp. Alternatively, an amphiphilic multi-block copolymer consisting of both hydrophilic and hydrophobic blocks can be used to achieve the same effect. Additionally, incorporation of polyester will render DHPp degradable through hydrolysis, and the number of ester linkages in DHPp can be used to control the rate of degradation. Finally, the length of the prepolymer can be used to control the density and content of DHPD, which will affect the adhesive properties as well as the rate of curing of DHPp. Lists of prepolymers used in the synthesis are shown in Tables 3A-3C.

The chain extender (Table 3D) consists of a small molecular weight (MW≦500 Da) compound that contains two functional groups y that can react with functional groups x on the prepolymer, and at least one functional group Z that can react with DHPD. The reaction between functional groups x and y results in the formation of ester, amide, urethane, urea, or carbonate linkages between the prepolymer and the chain extender, which leads to the formation of a functionalized polymer. During the chain extension reaction, either x or y needs to be activated for the coupling to occur, which can be done during or prior to the reaction.

Figure 8:
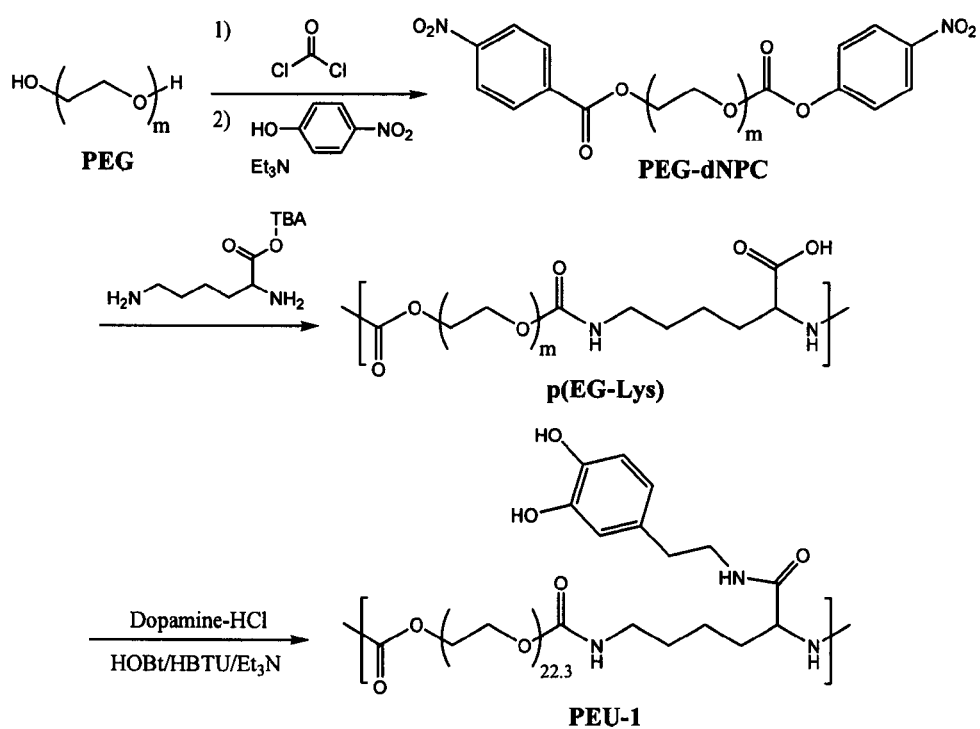
FIG. 8: Synthesis of PEU-1 by reacting PEG-dNPC with lysine and subsequent addition of dopamine through carbodiimide chemistry.

As shown in FIG. 8, the terminal —OH of PEG-diol was first activated to form nitrophenyl carbonate (NPC) followed by reaction with lysine-tetrabutylammonium salt (Lys-TBA) to create an poly(ether urethane) (PEU) with pendant —COOH groups, which was later reacted with dopamine to yield PEU-1 (Table 4A). Here, x is an activated carbonyl group that readily reacted with the amine group, y, on Lys-TBA to create a urethane linkage. In addition to NPC, other activation compounds such as N-hydroxysuccinmide (NHS) or pentachlorobenzene can be utilized. PEU-2 and PEU-3 were both synthesized using NHS as the activating group instead of NPC. Finally, the Z group on the chain extender is a carboxyl group with a TBA counter-ion instead of —H, which makes Lys-TBA more soluble in the organic reaction mixture. Other quaternary ammonium or positively charged groups can potentially be used as the counter-ion.

Figure 9:
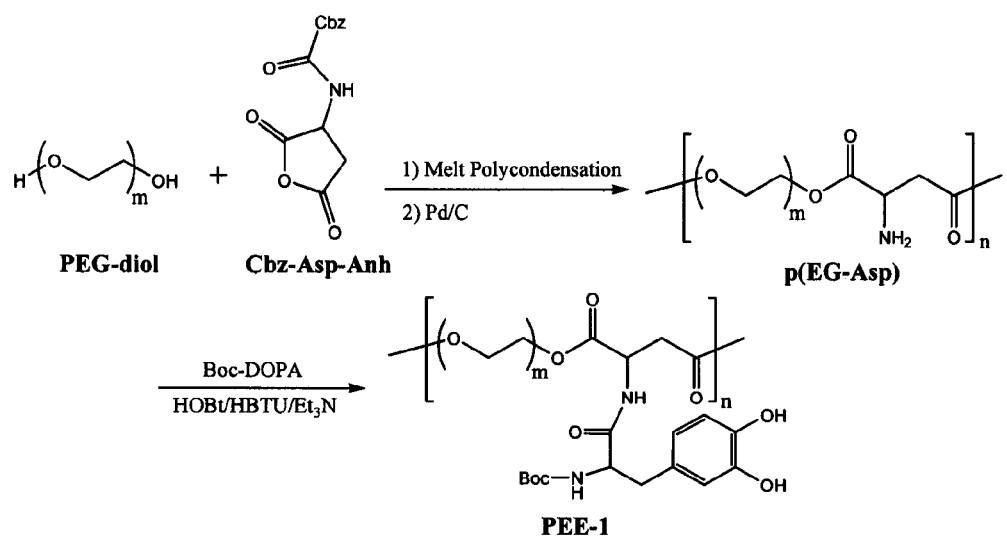
FIG. 9: Synthesis of PEE-1 by melt polycondensation of PEG-diol and Cbz-Asp Anh, deprotection of Cbz, and the subsequent addition of Boc-DOPA through carbodiimide chemistry.

In certain cases, the Z group needs to be protected since the functional group may react with either x or y during the polymer chain extension reaction. FIG. 9 depicts melt polycondensation between PEG-diol and N-(benzyloxycarbonyl)-L-aspartic anhydride (Cbz-Asp-Anh) to yield an amine-functionalized poly(ether ester) (PEE) after removal of the Cbz protecting groups. Cbz protects the Asp amine group, which could have reacted with carboxyl groups during polymer chain extension if left unprotected. The subsequent reaction between this amine-functionalized PEE with the carboxyl group of N-Boc-DOPA resulted in PEE-1 (Table 4B). DOHA was used in stead of N-Boc-DOPA in PEE-2 and PEE-3. Unlike PEU-1, these poly(ether ester)'s were created by ester linkages formation, which hydrolyze at a faster rate than urethane linkages.

Figure 10:
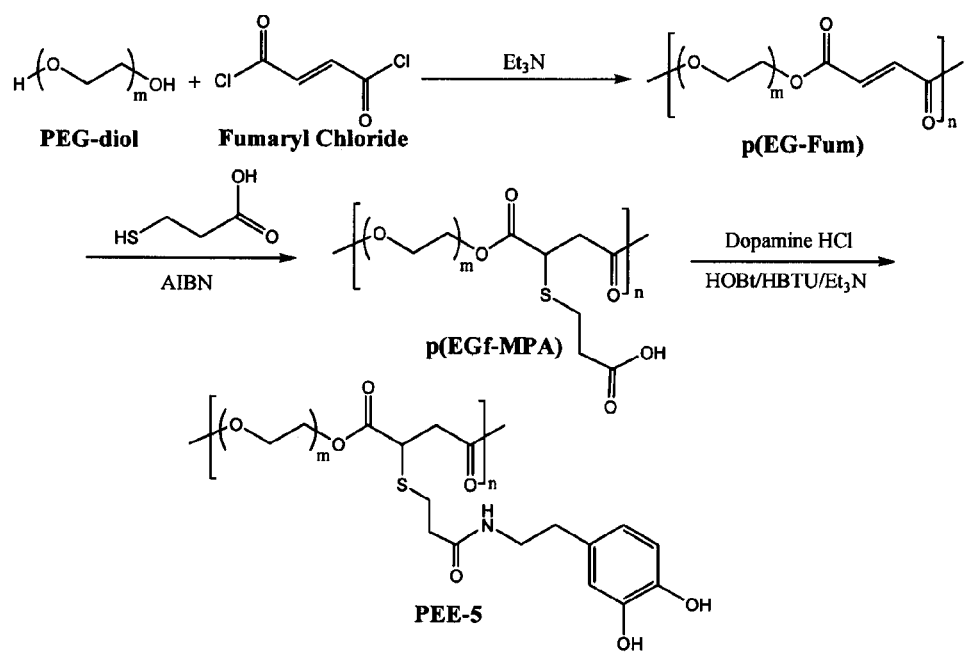
FIG. 10: Synthesis of PEE-5 by reacting PEG-diol with fumaryl chloride, functionalizing with —COOH, and the subsequent addition of dopamine through carbodiimide chemistry.

Alternatively, Z can be introduced after the chain extension reaction is complete, as shown in FIG. 10. PEG-diol was first reacted with fumaryl chloride to yield p(EG-Fum), which contains unsaturated double bonds along its polymer backbone. These double bonds were then reacted with thiolated 3-mercaptopropionic acid (MPA) to introduce —COOH groups, which can be further modified with dopamine. PEE-4 through PEE-6 were synthesized using this method (FIG. 4B). Instead of MPA, cysteamine (CA) and 2-mercaptoenthol can be used to incorporate an —NH$_2$ and an —OH group, respectively. PEE-7 was prepared using CA to introduce pendant amine groups, which were subsequently reacted with carboxyl groups on DOHA. PEG-diol can be substituted with amine-terminated PEG's and the subsequent reaction with fumaryl chloride would lead to the formation of a poly(ether amide) (PEA) which is more stable than PEE. PEA-1 (Table 4C) was created using a diamine-terminated prepolymer, making this polymer less susceptible to hydrolysis than PEE analogues.

Figure 11:
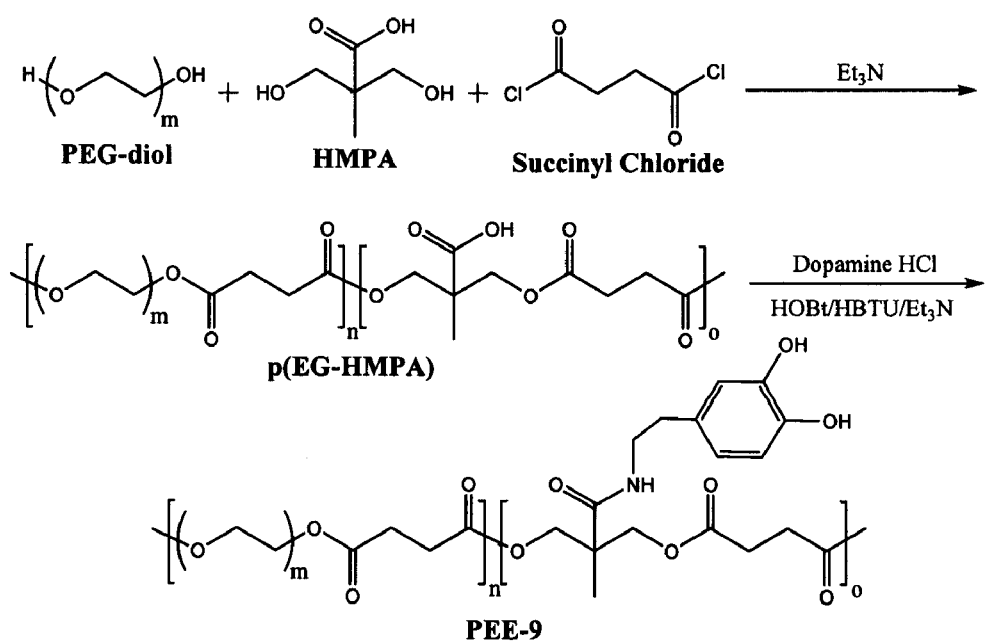
FIG. 11: Synthesis of PEE-9 by reacting PEG-diol and HMPA with succinyl chloride and the subsequent addition of dopamine through carbodiimide chemistry.

FIG. 11 shows a synthetic method where x on the prepolymer and y on the chain extender are of the same functional group (—OH) and chain extension is achieved with the addition of a third compound. PEG-diol and 2,2-bis(hydroxymethyl)propionic acid (HMPA) both have two terminal —OH groups, and polymer chain extension was achieved through the addition of succinyl chloride, which leads to ester bond formation. HMPA has a third functional group, —COOH, that was used to attach dopamine to yield PEE-8 (Table 4B). By changing the PEG-diol with diamine-terminated PEG and HMPA to a diamine chain extender such as Lys-TBA, reaction with succinyl chloride will result in a functionalized polymer with stable amide linkages instead of ester linkages. Similarly, if diisocyanate was used instead of succinyl chloride, functionalized polymers with urethane or urea linkages can be made using an —OH or —NH₂ terminated prepolymer and chain extender, respectively. Finally, functionalized polymers with carbonate linkages can be created by reacting dichloroformate (i.e. PEG-dCF) with PEG-diol and HMPA. These different linkages can be used to control the rate of degradation of the DHPp.

Figure 12:
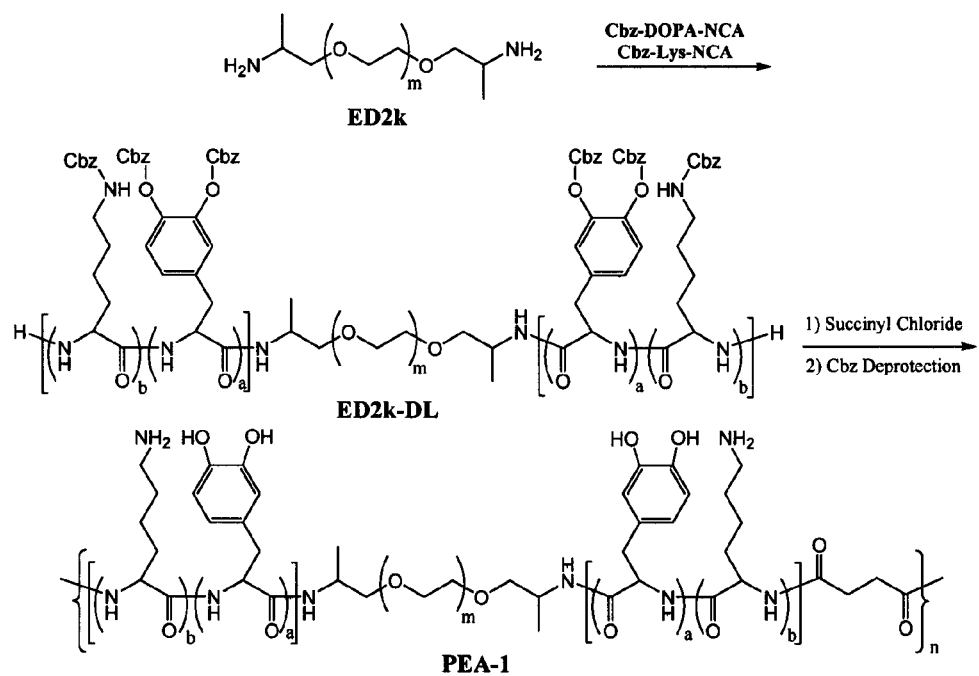
FIG. 12: Synthesis of PEA-1 by modification of PEG prepolymer with DHP prior to polymer chain extension.

As shown in FIG. 12, the prepolymer can be modified with DHPD prior to polymer chain extension. Diamine terminated ED2k was first reacted with N-carboxyanhydrides (NCAs) of DOPA and lysine (Cbz-DOPA-NCA and Cbz-Lys-NCA, respectively) to form PEG-DL. PEG-DL is further reacted with succinyl chloride to form PEA-2 after removal of the Cbz protecting group (Table 4C). The backbone of PEA-2 consists of ether and amide linkages, which are more stable than ester and urethane linkages in PEE or PEU, respectively.

Using a synthesis scheme similar to that in FIG. 8, poly (ether ester urethane)s (PEEUs) were synthesized by substituting some of the PEG prepolymers with hydrophobic polycaprolactone (PCL) (Table 4D). These PEEUs contain ester linkages that hydrolyze faster than urethane linkages. Additionally, hydrophobic segments can aggregate in the presence of water, which makes these PEAUs able to self-assemble into micro-scaled domains. This self-assembly ability increases the viscosity of the polymer solutions, and under the right conditions (elevated temperature and concentration) they can form a physically crosslinked gel network. Similarly, PEU-3 contains both hydrophilic and hydrophobic segments in its backbone, and aqueous solutions of PEU-3 also display similar self-assembly properties.

Utilization of different synthetic methods along with to the availability of a wide variety of prepolymers to choose from makes it possible to vary the physical properties of DHPps. Various synthetic methods were used to create different backbone linkages with varied stability (PEA>PEU>PEEU>PEE), where PEE is most easily hydrolyzed in the presence of water. In addition, the hydrophilicity of the polymer backbone will affect the rate of hydrolysis. The polymer backbones of PEE-1 through PEE-5 contain over 85% PEG by weight, which would makes these PEEs degrade much faster compared to PEE-7, which consists of F2k (50% PEG and 50% PPG). The hydrophilicity of the polymer backbone will dictate the likelihood of water uptake, which affects the rate of hydrolysis.

The length of the prepolymer can be used to control the amount of DHPD attached. As shown in Table 4B, PEE-2 was constructed using EG600 (600 MW PEG prepolymer) and it has the highest DHPD content (21 wt %) of various DHPps synthesized in this section. When higher MW prepopymers such as EG1k (8-13 wt % DHPD for PEU-1, PEU-2, PEE-1, PEE-3, and PEE-5) and F2k (3-5 wt % DHPD for PEU-3 and PEE-7) were used, polymers of lower DHPD content were made. 30 and 65 wt % of EG600 was replaced with higher molecular weight prepolymers in the backbone for PEEU-3 and PEU-4, respectively, which dramatically reduced the DHPD content in these polymers (12 and 6.4 wt % for PEEU-3 and PEU-4, respectively) compared to PEE-2. PEU-2, PEA-2, and PEEU-3 were synthesized with a lysine with a free —NH₂ group along the polymer backbone. The amine group can improve the interfacial binding ability of these polymers as well as provide an additional binding molecule for oxidized DHPD. Additionally, the presence of the —NH₂ made amphiphilic PEEU-3 more water soluble compared to PEEU-1 and PEEU-2.

Synthetic Method 3: DHPD Modification of FP

In this section, DHPD is grafted onto pre-made functionalized polymers (FP) that contain pendant functional groups such as —NH₂, —COOH, —OH, or —SH throughout the length of the polymer (FIG. 4). Many different FPs are commercially available and a careful selection should be made based on the desired application of DHPp. For example, synthetic FP such as polyvinyl alcohol, polyallylamine, polylysine, and polyacrylic acid exist and are commercially available, but these polymers exhibit poor biocompatibility [40, 41] and none are biodegradable, which make them poor candidates for use as biomaterials. Biopolymers such as proteins or polysaccharides have certain advantages over synthetic polymers (i.e. biocompatibility, biodegradability, bioresorbability, and the ability to interact with native tissue or cells). Protein-based sealants have been approved for clinical use by FDA, which include gelatin—(FloSeal™, Baxter, Inc.), fibrinogen—(Tisseel™, Baxter, Inc.), and bovine serum albumin-based (Bioglue®, Cryolife, Inc.) products. Polysaccharides such as chitosan, alginate, and hyaluronic acid have been studied for various biomedical applications such as cell encapsulation,[42] wound dressing,[43] and cartilage repair.[44] These biopolymers are linear polymers that contain various functional groups that can be modified with DHPD. Although only modification of gelatin is reported here, other biopolymers with suitable functional groups can be modified with DHPD using the synthetic path described here.

Figure 13:
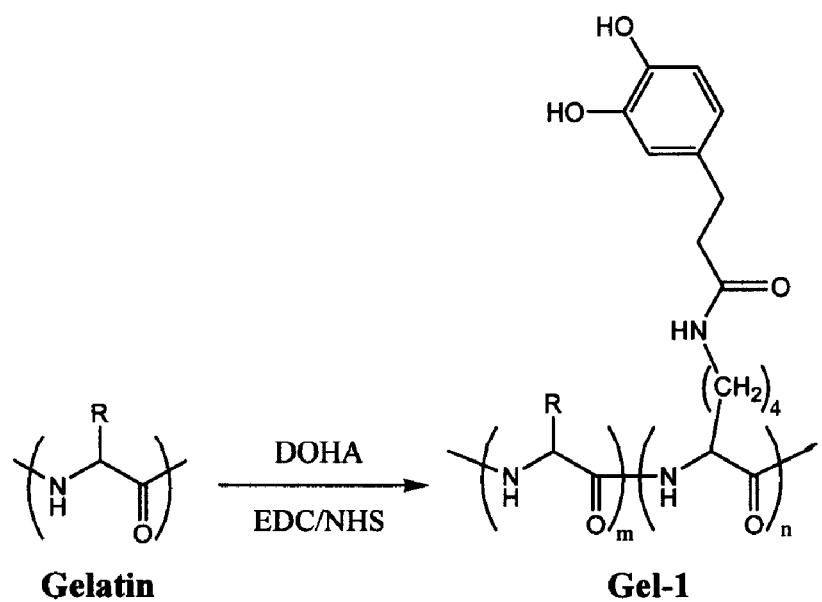
FIG. 13: Synthesis of GEL-1 by reacting gelatin with 3,4-dihydroxyhydrocinnamic acid using carbodiimide chemistry. R represents amino acid side chains of gelatin.

Gelatin is a protein produced by partial hydrolysis of collagen extracted from the connective tissues of animals such as cows, pigs, and fish. Gelatin contains 10% glutamic acid, 6% aspartic acid, and 4% lysine[45] that can react with DHPD through amide, ester, or urethane link formation. As shown in FIG. 13, water soluble carbodiimide was used to couple either DOHA, dopamine, or DOPA to gelatin (75 Bloom, MW ~22,000). GEL-1, GEL-2, and GEL-3, were prepared with a DHPD content of as much as 8 wt % (Table 5). These gelatin-based adhesive polymers are water soluble at concentrations as high as 30 wt % and can undergo physical gelation like unmodified gelatin.

Figure 14:
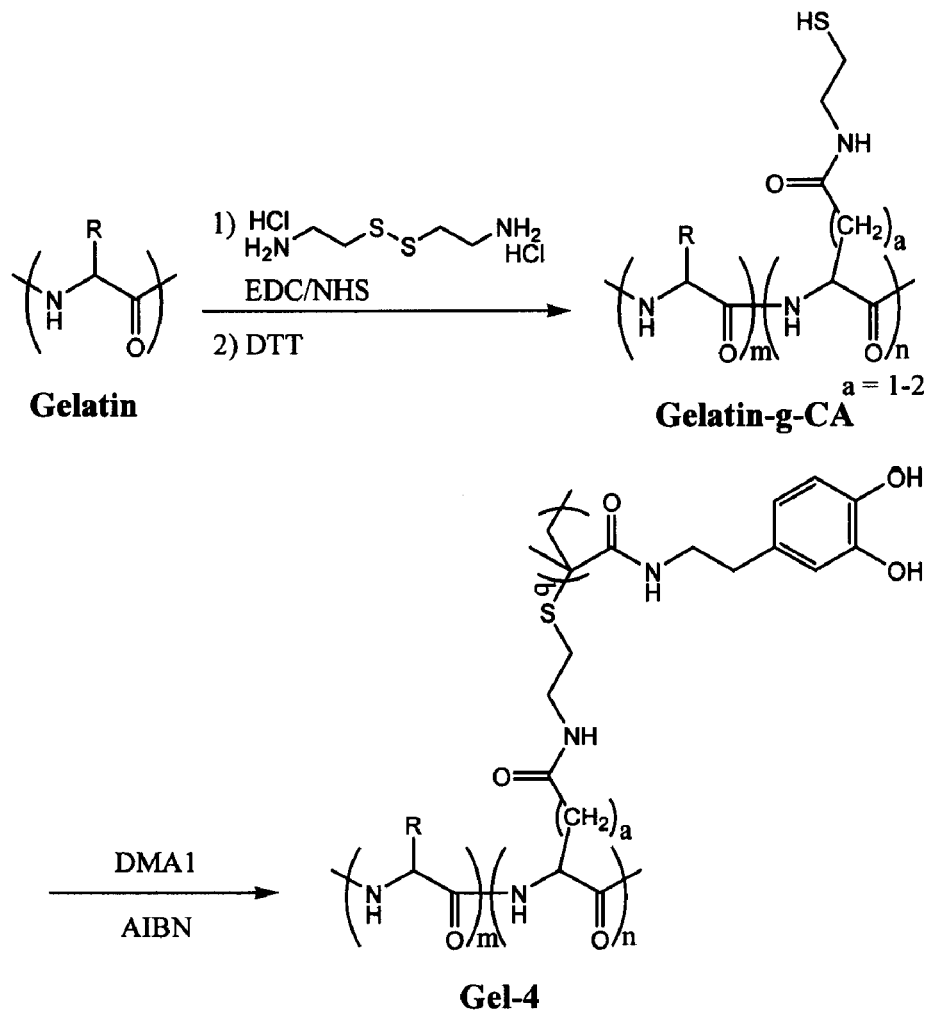
FIG. 14: Synthesis of GEL-4 by first grafting a chain transfer agent onto gelatin using carbodiimide chemistry followed by free-radical polymerization of DMA1. R represents amino acid side chains of gelatin.

In addition to attaching single DHPD onto the biopolymers, short polymers of DHPD can be grafted. As shown in FIG. 14, cysteamine dihydrochloride was reacted with gelatin through carbodiimide chemistry and after reduction of the dithiol bonds with 1,4-dithiothreitol (DTT), Gelatin-g-CA was prepared with —SH groups along the backbone of gelatin. These —SH groups can act as a chain transfer agent in free-radical polymerization. Using AIBN as the initiator, GEL-4 was prepared with polymer chains of DMA1 grafted onto gelatin with a DMA1 content of over 54 wt % (Table 5). Alternatively, GEL-5 was synthesized by using the side chain functional groups (—OH, —NH$_2$, —COOH) of gelatin as the chain transfer agent, and DMA1 accounts for over 17 wt % in GEL-5.

Applications

The synthesized DHPps were tested for their potential to function as 1) tissue adhesives and sealants, 2) adhesive coatings, and 3) antifouling coatings. As a tissue adhesive or sealant (FIG. 15), DHPD in DHPp can be used to achieve both cohesive crosslinking and curing of the adhesive as well as interfacial adhesive interaction with both biological and inorganic surface substrates. To function as an adhesive coating (FIG. 16A), DHPp with an elevated DHPD content was utilized so that after a portion of the DHPD was used to attach to the support substrate, there are still unbound DHPD for binding to a second substrate. For an antifouling adhesive (FIG. 16B), a relatively low quantity of DHPD is desired as the majority of an antifouling DHPp by weight needs to be constructed of polymers that prevent non-specific adhesion. Depending on the desired applications, DHPp were created with different DHPD contents, physical properties, and chemical compositions.

Tissue Adhesive and Sealant

To be used as a tissue adhesive or sealant, DHPp needs to satisfy a set of stringent criteria. First and most importantly, it should have an adequate safety profile, (i.e. low toxicity, non-immunogenic, non-mutagenic, non-irritating, and non-antigenic) and the bioadhesive should be able to retain its adhesiveness after rigorous sterilization.[46-48] In the liquid state, the adhesive should have sufficient flow characteristics so that it can be easily applied to the entire wound surface and should be able to displace water from the boundary layer to maximize interfacial interactions.[46, 49] The adhesive must be able to transform from the liquid state into the solid state under mild physiological conditions, and this transition should be rapid to minimize surgery time and to reduce the possibility of infection.[46] After curing, the bioadhesive needs to maintain strong adhesion to different types of tissue in a moist environment while possessing suitable bulk mechanical properties to withstand the different stresses present during functional use. [46, 48] Unlike sutures and other commonly used wound closure materials, adhesives can act as a barrier for tissue growth at the union of the wound edges. Thus, the adhesive must be able to degrade at a rate that approximates the rate of cell growth for satisfactory wound healing, and the degradation products must be nontoxic and capable of being easily reabsorbed or excreted from the body. [46, 48, 50]

Figure 15:
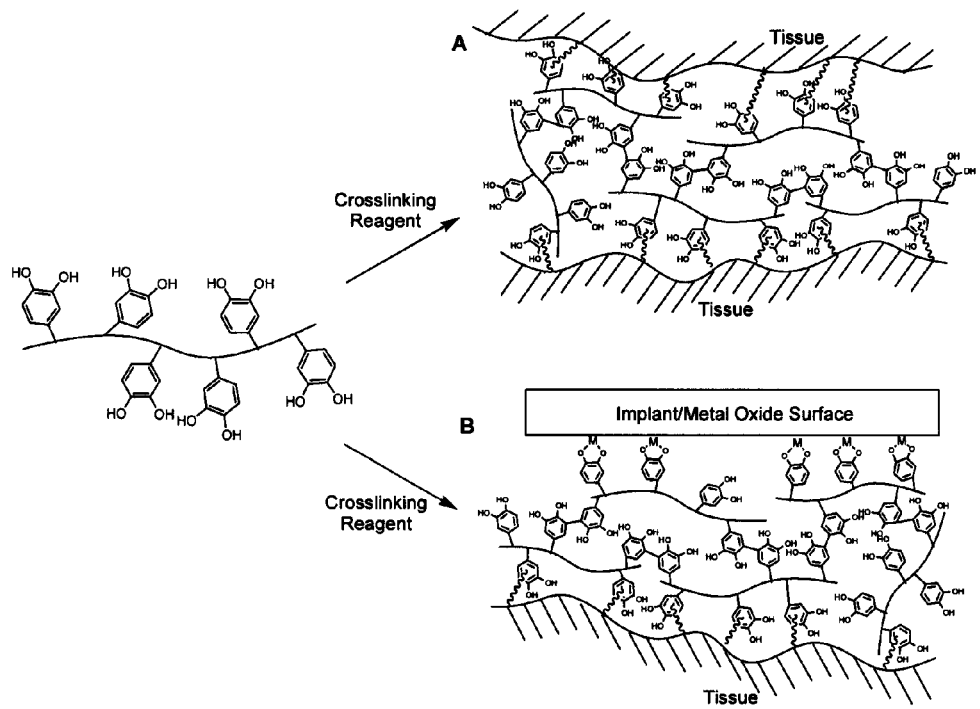
FIG. 15: In situ curing and adhesion of catechol-containing structural adhesive between A) two biological tissue surfaces and, B) tissue and implant surfaces.

Various DHPps were first tested to see if these adhesives can undergo a rapid transition from a free flowing liquid to a viscoelastic hydrogel. An aqueous solution of DHPp (pH 7.4) and a equal volume of NaIO$_4$ solution (0.5 molar equivalent to DHPD) were mixed using a dual syringe set-up. The amount of time a selected adhesive formulation takes to cure is listed in Table 6. The curing time for these DHPp adhesives ranged from under 30 sec up to 7 min. Curing time is dependent on such factors as DHPD content, DHPp chemical architecture, and molecular weight. As shown in FIG. 15, cohesive crosslinking of DHPDs results in the curing of DHPp, thus an elevated DHPD content is necessary for a fast curing time. When comparing PEU-1, PEU-2, and PEU-3, curing time lengthened with decreasing DHPD content in these adhesives (13, 8.2, 4.8 wt % dopamine and 30 sec, 70 sec, and 7 min for PEU-1, PEU-2, and PEU-3, respectively). Despite having a low concentration of DHPD, GEL-2 (5.9 wt % dopamine) was able to cure in around 20 sec. Unlike its PEU counterparts, which were constructed mainly of non-reactive polyether backbones, gelatin-based adhesives contain various amino acid side chain functional groups (i.e. amine, hydroxyl, etc.) that can react with DHPD. Additionally, the rate of curing is also strongly dependent on the chemical structure of the DHPp. PDMA-19 took over 4 hours to cure (data not shown) despite having 17 wt % DMA1. The brushlike chemical structure of PDMA-19 may have obstructed pB-bound DMA1 from making crosslinks efficiently. PDMA-5, constructed with DMA3 and EG9ME, was able to cure in 2 min (data not shown). DMA3 has a short oligomeric linker between DOHA and a methacrylate group, which allows the DOHA to be more exposed for crosslink formation rather than buried in a brush of PEG polymers.

Figure 17:
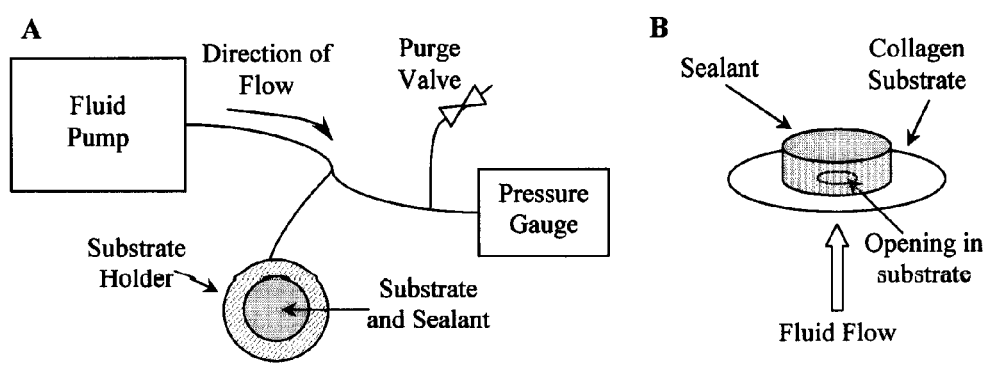
FIG. 17: Schematic of burst strength test apparatus (A) and a close up of the sealant and the substrate (B).
Figure 18:
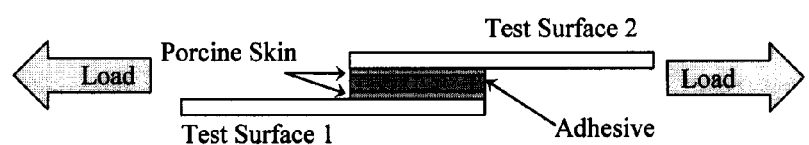
FIG. 18: Schematic of lap shear adhesion test set up.

To test the ability of these adhesive formulations to function as surgical sealants, they were used to seal an opening (3 mm diameter) on a wetted collagen substrate under pressure. ASTM standard F2392 was followed to determine the burst strength of DHPps using the setup shown in FIG. 17.[51] Since this experiment tests the ability of a given DHPp to bind to a biological substrate in an aqueous environment under stress, the cured adhesives require a good balance of water-resistant adhesive properties as well as bulk mechanical properties. As shown in Table 6, the burst strength of various DHPp formulations ranged from 5 to 230 mmHg/mm. Various factors such as adhesive wt %, the polymer backbone chemical structure, and the crosslinking pathway of the DHPD will have an affect on the burst strength of the adhesive. For example, the burst strength of PEU-2 nearly doubled when the concentration of the polymer was increased from 15 to 30 wt %. This increase is due to improved cohesive properties and crosslinking density in the cured adhesive. PEU-2 was also found to have a burst strength that is nearly twice that of PEU-1. This observation may be attributed to the presence of lysyl free amine groups in PEU-2, which may increase the interfacial binding ability of this polymer. Additionally, the presence of —NH$_2$ significantly changes the crosslinking pathways that DHPD may undertake,[21, 52] which will dramatically affect the cohesive properties of the cured adhesive. Since these formulations were found to fail cohesively, the difference in the burst strengths between PEU-1 and PEU-2 is most likely attributed to the difference in their bulk mechanical strengths. At 15 wt %, PEU-3 exhibited a similar burst strength to PEU-2 despite having only half as much DHPD. However, PEU-3 was constructed from F2k, an amphiphilic triblock copolymer of PEG and polypropylene glycol (PPG), as opposed to purely hydrophilic PEG. Hydrophobic PPG segments in PEU-3 can form physical crosslinks, which lead to increased cohesive strength. Despite having multiple functional groups on the gelatin polymer backbone, gelatin-based adhesives showed very low burst strength compared to PEU-based adhesives.

As shown in Table 6, varying the DHPD content in DHPp as well as the architecture and the chemical composition of the polymer backbone can have significant effects on the curing rate as well as the adhesive properties of these polymers. Although it is possible to tailor the physical properties of these DHPps by synthesizing a new polymer with the desired components, existing DHPps can be mixed together to form new adhesive formulations with improved physical properties. As shown in Table 7, 50-50 mixtures of PEU-3 with either PEU-1 or PEU-2 reduced the curing time to 5 min from 7 min (PEU-3 alone), which is likely due to increased dopamine content in these mixtures. These adhesive formulations also exhibited increased burst strengths. For example, a mixture of PEU-1 and PEU-3 (81 mmHg/mm) resulted in a 57% increase in burst strength over PEU-1 alone (55 mmHg/mm), and a mixture of PEU-2 and PEU-3 (157 mmHg/mm)

resulted in an increase of 22 and 30% over the individual test results of PEU-2 (129 mmHg/mm) and PEU-3 (121 mmHg/mm), respectively. A balance in irreversible covalent crosslinks and reversible physical crosslinks may have attributed to these improvements in the bulk mechanical properties. Other formulations and mixtures can potentially be tested to optimize the adhesive properties and curing rate of these compounds.

One important criterion for any wound closure material is the ability to biodegrade with time as the wound heals. This is especially important for tissue adhesives and sealants, as a non-degradable material may act as a barrier to the union of wound edges. In vitro degradation analysis of DHPp was performed by submerging the cured adhesives in PBS (pH 7.4) at 37° C. As shown in Table 6, PEE-5, which contains hydrolysable ester linkages along its polymer backbone, completely degraded within 2 weeks. Although PEU-1 did not completely degrade over the same period of time, it showed signs of degradation, since the incubation solution turned dark red as result of the release of oxidized DHPD from the adhesive. PEU-1 contains urethane linkages, which hydrolyze at a slower rate than the ester linkages in PEE-5. The rate of degradation was also dependent on the hydrophilicity of the polymer backbone (pB), since it dictates the rate and the amount of water uptake by the polymer backbone. Although PEU-1 and PEU-3 were both constructed by the formation of urethane linkages, PEU-3 did not show signs of degradation, since its incubation solution remained colorless over 2 weeks. PEU-3 consists of F2k (1900 MW pluronic with 50 wt % PEG and 50 wt % PPG), which makes its polymer backbone more hydrophobic compared to PEU-1, which is constructed with hydrophilic EG1k (1000 MW PEG). PEU-3, which was made with a prepolymer of 1900 Da, also has a much lower content of hydrolysable urethane linkages compared to PEU-1, which was synthesized with a 1000 Da prepolymer. Thus, various factors such as the synthesis method, the polymer backbone composition, and the prepolymer molecular weight can be used to tailor adhesives with different rates and potentially different modes of degradation.

Adhesive Coatings

Adhesive-coated tapes, labels, and protective films of all kinds are ubiquitous in everyday life.[53, 54] In the medical field, these adhesive products are used in first-aid bandages, wound dressings, bioelectrodes, transdermal drug delivery patches, and for adhering medical devices to the skin. Good water resistance is needed for these adhesive coatings, both to water applied from outside (i.e. shower), and to water from under the tape or dressing (i.e. perspiration, blood, or wound exudate).[53, 55] Apart from being able to adhere quickly to a biological substrate (i.e. skin), these adhesives also must remain attached to the backing material (i.e tape or wound dressing backing) so that the adhesive does not transfer onto the skin. Therefore the adhesive should not be water soluble. Although various hydrophobic medical-grade adhesives are available as coatings or films, these lose their ability to adhere to skin when its surface is moistened.[56, 57] Newer generations of adhesives are based on hydrophilic, amphiphilic, or hydrogel-based adhesives, and some of them have demonstrated some level of resistance to moisture.[57-59] However, the performance of these new adhesives is significantly weakened by high levels of water adsorption or in the presence of water (i.e. showering). Thus a true water-resistant adhesive that can remain adhered to skin during prolonged periods of strenuous exercise and under humid conditions is needed.[56]

PDMA-12 was chosen to be tested for its potential to function as an adhesive coating. PDMA-12 is a hydrophilic polymer, so it has the ability to wet or make good adhesive contact with the skin. Additionally, PDMA-12 is not water soluble, so it will not be dissolved when the patient sweats. Furthermore, PDMA-12 has a high DMA1 content (21 wt %), which allows the polymer to adhere both to the supporting material and to the skin substrate. Finally, the comonomer, MEA, in PDMA-12 has a relatively short side chain, allowing the DMA1 moiety to be exposed for interfacial contact.

Figure 19:
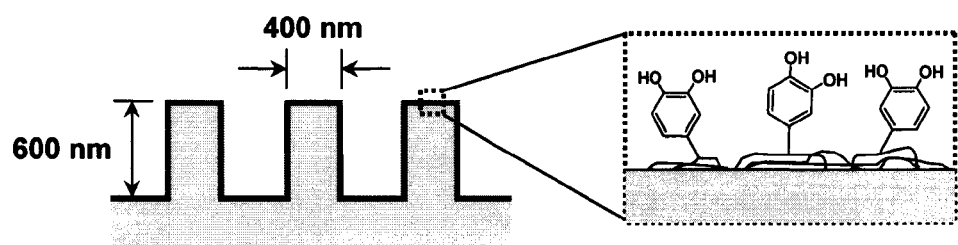
FIG. 19: Nanostructural adhesive coated with PDMA-12.
Figure 20:
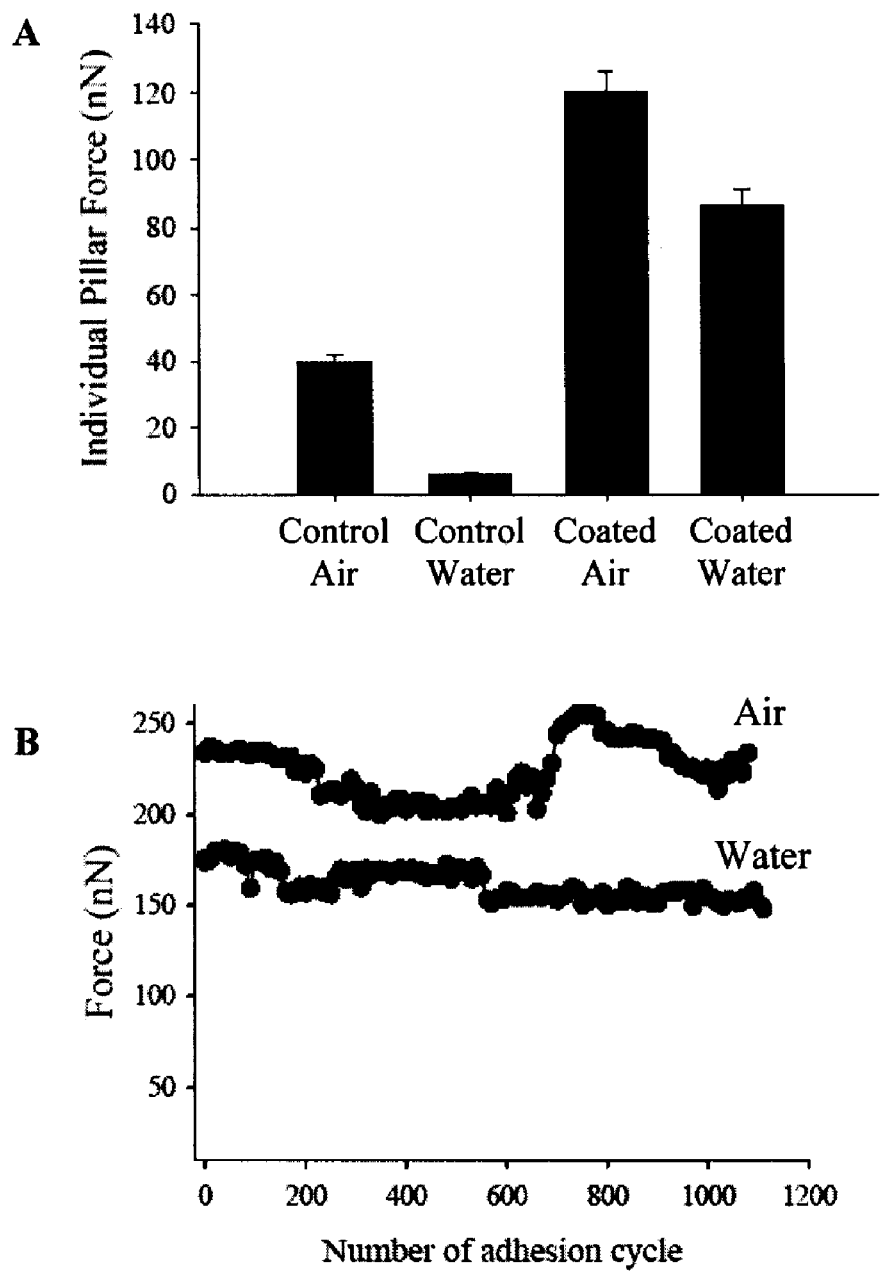
FIG. 20: AFM force measurements on nanoscale adhesive on $Si_3N_4$ cantilever. (A) Force needed to detach from a single control PDMS or PDMA-12 coated surfaces in air or in water. (B) Repeated adhesion contact of PDMA-12 coated surfaces in air and water.

PDMA-12 was coated on a PDMS support constructed with a nano-scaled pillar array as shown in FIG. 19. The nanostructure on the PDMS was designed to mimic the foot pads of a gecko, which is composed of keratinous, nano-sized foot-hairs.[60] Contact between the gecko foot and an opposing surface generates adhesive forces that are sufficient to allow the gecko to cling to vertical and even inverted surfaces. Although the gecko-mimetic PDMS control surface exhibited some adhesion using atomic force microscopy (AFM) measurements in air (FIG. 20A), the adhesive force was significantly reduced when the experiment was performed submerged in water. However, PDMA-12-coated surfaces showed significantly increased adhesion to the AFM cantilever compared to the control PDMS surfaces both in air and water. The PDMA-12-treated surfaces remained adhesive even after a thousand contact-and-release cycles in both air and water (FIG. 20B). This result is unique, considering that other synthetic mimics of gecko can only maintain adhesion over a few cycles[61, 67] and gecko adhesion is dramatically diminished upon full immersion in water.[68, 69] As demonstrated here, the adhesive coating of DHPp significantly enhanced the adhesive properties of the existing support materials both in an ambient, dry conditions as well as in a wet or aqueous environment.

Antifouling Coatings

Unlike the adhesive coatings in the previous section, where the adhesive is designed to adhere to two separate surfaces, polymers for antifouling coating applications are designed to adhere to one surface while preventing other materials from adhering to this surface. For medical devices and implants, preventing proteins, cells, bacteria and other unwanted materials from attaching to the surface of a material is essential in maintaining the desired functionality, longevity, and safety of these devices.[74] Proteins that non-specifically adsorb to material surfaces from extracellular fluids can trigger adverse biological responses,[75] and may interfere with medical device function, as is the case with contact and intraocular lenses,[75, 76] blood-contacting devices,[77] and medical implants and surgical tools.[70] Furthermore, the surfaces of implants, tissue engineering scaffolds, and biosensors functionalized with bioactive ligands (e.g. peptides, proteins and oligonucleotides) benefit from a bioinert background that will not interfere with the desired biological response. Thus, for many biomaterial systems there are tangible benefits to reducing, or eliminating entirely, non-specific interactions between the biomaterial and the fluid or extracellular matrix with which it is in contact.

Figure 16:
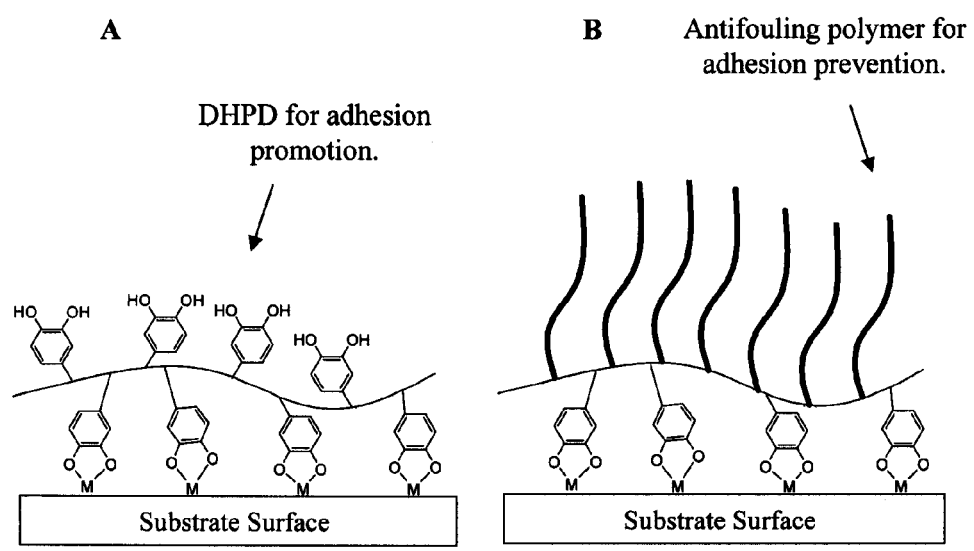
FIG. 16: Application of DHPp as an adhesive coating (A) and an antifouling coating (B).

The general design of an antifouling polymer is illustrated in FIG. 16B. The polymer requires a relatively small amount of adhesive DHPD compared to adhesive coatings, while having a large percentage by weight of the polymer with antifouling properties. Table 8 summarizes the ability of various DHPps to function as antifouling polymers when coated on polyvinylchloride (PVC). Advancing water contact angle analysis is a rapid and convenient means of determining if a coating was successfully applied. Advancing contact angles of various hydrophilic DHPp-coated surfaces significantly decreased from that of uncoated PVC (93±2.3), signifying that the antifouling coatings were successfully applied to the PVC.

The antifouling characteristics of each coating were determined by the 3t3 fibroblast adhesion assay. As shown in Table 8, all coating materials tested demonstrated greater than 95% reduction in cell adhesion. Apart from PDMA-7, these polymers have a brush-like architecture with PEG extending from the polymer backbone, which confers antifouling properties to these DHPps. Some of these surfaces were also tested to see if they could resist bacterial (*Pseudomonas aeruginosa*) adhesion. Although PDMA-2 performed equally well at repelling both fibroblast and *P. aeruginosa* binding, other PEG-based polymers did not. PDMA-15 and PDMA-18 were both constructed from a PEG-based and a charged (AA and AMPS, respectively) monomer, and these charged polymers did poorly against bacterial adhesion compared to neutral PDMA-2. It is not clear why negatively charged PDMA-21 showed over 98% reduction in bacterial adhesion over the control. Perhaps the difference in the performance of PDMA-21 and PDMA-15 lies in the binding ability of the acidic monomers (phosphonic (PDMA-21) vs. sulfonic (PDMA-15) acid) to the surface substrate. Phosphorylated compounds are known for surface adsorption, which make them more likely to be buried at the coating-substrate interface and away from the antifouling PEG brushes. However, neutrality alone is not enough for good resistance to bacterial adhesion. PDMA-6, constructed from neutral, zwitterionic SBMA, only reduced bacterial binding by 60%. Additionally, PDMA-4 has amide linkages linking its polymer backbone to the PEG brushes and it only reduced bacterial adhesion by 15% compared to 98% for PDMA-2, which contains ester linkages between PEG and its polymer backbone. Finally, PEU-2 was coated onto PVC in a gel form cured with $NaIO_4$, and this gel-based coating demonstrated superior microbial adhesion resistance.

In addition to PVC, various PDMAs were applied to different polymer surfaces (acetal, polypropylene, polyurethane) and brass. The polymer surfaces exhibited decreased contact angles of the coated surfaces, indicating the coating application was successful (Table 9). The contact angle change was not very significant for brass as the uncoated brass surfaces already has a fairly low contact angle. The coatings all demonstrated good resistance to fibroblast adhesion as shown in Table 10.

PDMA-2-coated surfaces were further challenged with both *S. aureus* and *P. aeruginosa* under flow or in static conditions (Table 11). All of the coated polymer surfaces showed a reduction in adhesion of both bacterial strains of >90%. Coated brass surfaces, however, showed some resistance to microbial adhesion but not to the extent of the polymer surfaces. The evaluation of these coatings on brass material may likely be complicated by the high copper content of brass (~63 wt %). Given that copper is a highly effective biocide, any copper ions leached from the material surface may impact the results of these types of experiments. Finally, when considering the results of these experiments, it is important to note the robust nature of this experimental design. The concentration of bacteria used in these assays (~$10^8$ CFU/ml) is several orders of magnitude higher than what would typically be encountered in vivo. These experiments demonstrated the exceptional antifouling properties of DNPps on different polymeric substrates as well as brass. As demonstrated here, various factors such as architecture, charge, and polymer backbone linkages play an important role the success of DHPps in preventing biofilm formation and bacterial adhesion.

EXAMPLES

Example 1

Synthesis of DMA1

20 g of sodium borate, 8 g of $NaHCO_3$ and 10 g of dopamine HCl (52.8 mmol) were dissolved in 200 mL of $H_2O$ and bubbled with Ar. 9.4 mL of methacrylate anhydride (58.1 mmol) in 50 mL of THF was added slowly. The reaction was carried out overnight and the reaction mixture was washed twice with ethyl acetate and the organic layers were discarded. The aqueous layer was reduced to a pH<2 and the crude product was extracted with ethyl acetate. After reduction of ethyl acetate and recrystallization in hexane, 9 g of DMA1 (41 mmol) was obtained with a 78% yield. Both $^1H$ and $^{13}C$ NMR was used to verify the purity of the final product.

Example 2

Synthesis of DMA2

20 g of sodium borate, 8 g of $NaHCO_3$ and 10 g of dopamine HCl (52.8 mmol) were dissolved in 200 mL of $H_2O$ and bubbled with Ar. 8.6 mL acryloyl chloride (105 mmol) in 50 mL THF was then added dropwise. The reaction was carried out overnight and the reaction mixture was washed twice with ethyl acetate and the organic layers were discarded. The aqueous layer was reduced to a pH<2 and the crude product was extracted with ethyl acetate. After reduction of ethyl acetate and recrystallization in hexane, 6.6 g of DMA2 (32 mmol) was obtained with a 60% yield. Both $^1H$ and $^{13}C$ NMR was used to verify the purity of the final product.

Example 3

Synthesis of DMA3

30 g of 4,7,10-trioxa-1,13-tridecanediamine (3EG-diamine, 136 mmol) was added to 50 mL of THF. 6.0 g of di-tert-butyl dicarbonate (27.2 mmol) in 30 mL of THF was added slowly and the mixture was stirred overnight at room temperature. 50 mL of deionized water was added and the solution was extracted with 50 mL of DCM four times. The combined organic layer was washed with saturated NaCl and dried over $MgSO_4$. After filtering $MgSO_4$ and removing DCM through reduced pressure, 8.0 g of Boc-3EG-$NH_2$ was obtained. Without further purification, 8.0 g of Boc-3EG-$NH_2$ (25 mmol) and 14 mL of triethyl amine ($Et_3N$, 100 mmol) were add to 50 mL of DCM and placed in an ice water bath. 16 mL of methacrylic anhydride (100 mmol) in 35 mL of DCM was added slowly and the mixture was stirred overnight at room temperature. After washing with 5% $NaHCO_3$, 1N HCl, and saturated NaCl and drying over $MgSO_4$, the DCM layer was reduced to around 50 mL. 20 mL of 4N HCl in dioxane was added and the mixture was stirred at room temperature for 30 min. After removing the solvent mixture and drying the crude product in a vacuum, the crude product was further purified by precipitation in an ethanol/hexane mixture to yield 9.0 g of MA-3EG-$NH_2$HCl. 9.0 g of MA-3EG-$NH_2$HCl was dissolved in 100 mL of DCM and 6.1 g of 3,4-dihydroxyhydrocinnamic acid (DOHA, 33.3 mmol)

in 50 mL of DMF, 4.46 g of 1-hydroxybenzotriazole hydrate (HOBt, 33.3 mmol), 12.5 g of 2-(1H-Benzotriazole-1-yl)-1,1,3,3-tetramethyluronium hexafluorophosphate (HBTU, 33.3 mmol), and 4.67 mL of $Et_3N$ (33.3 mmol) were added. The mixture was stirred for 3 hrs at room temperature. The reaction mixture was extensively washed with 1N HCl and saturated NaCl. The organic layer was dried to yield 860 mg of DMA3. Both $^1H$ and $^{13}C$ NMR was used to verify the purity of the final product.

Example 4

Synthesis of PDMA-1

20 mL of poly(ethylene glycol) methyl ether methacrylate (EG9ME, Mw=475) was passed through 30 g of $Al_2O_3$ to remove inhibitors. 2.0 g of DMA-1 (9.0 mmol), 4.7 g of EG9ME (9.8 mmol), and 62 mg of AIBN (0.38 mmol) were dissolved in 15 mL of DMF. Atmospheric oxygen was removed through freeze-pump-thaw treatment three times and replaced with Ar. While under vacuum, the reaction mixture was incubated at 60° C. for 5 hours and precipitated by adding to 50 mL of ethyl ether. After drying, 4 g of a clear sticky solid was obtained (Gel permeation chromatography in concert with light scattering (GPC): Mw=430,000, PD=1.8; $^1H$ NMR: 24 wt % DMA1).

Example 5

Synthesis of PDMA-22

987 mg of DMA1 (4.5 mmol), 10 g of N-isopropyl acrylamide (NIPAM, 88.4 mmol), 123 mg of AIBN (0.75 mmol), and 170 mg of cysteamine hydrochloride (1.5 mmol) were dissolved in 50 mL of DMF. Atmospheric oxygen was removed through freeze-pump-thaw treatment three times and replaced with Ar. While under vacuum, the reaction mixture was incubated at 60° C. overnight and precipitated by adding to 450 mL of ethyl ether. The polymer was filtered and further precipitated in chloroform/ethyl ether. After drying, 4.7 g of white solid was obtained (GPC: Mw=81,000, PD=1.1; UV-vis: 11±0.33 wt % DMA1).

Example 6

Synthesis of PEU-1

20 g (20 mmol) of PEG-diol (1000 MW) was azeotropically dried with toluene evaporation and dried in a vacuum dessicator overnight. 105 mL of 20% phosgene solution in toluene (200 mmol) was added to PEG dissolved in 100 mL of toluene in a round bottom flask equipped with a condensation flask, an argon inlet, and an outlet to a solution of 20 wt % NaOH in 50% MeOH to trap escaped phosgene. The mixture was stirred in a 55° C. oil bath for four hours with Ar purging, after which the solvent was removed with rotary evaporation. The resulting PEG-dCF was dried with a vacuum pump overnight and used without further purification.

PEG-dCF was dissolved in 50 mL of chloroform and the mixture was kept in an ice water bath. 7.0 g of 4-nitrophenol (50 mmol) and 6.2 mL of triethylamine (440 mmol) in 50 mL of DMF was added dropwise in an Ar atmosphere and the mixture was stirred at room temperature for three hrs. 8.6 g of lysine tetrabutylammonium salt (Lys-TBA, 20 mmol) in 50 mL of DMF was added dropwise over 15 min and the mixture was stirred at room temperature for 24 hrs. 5.7 g of dopamine-HCl (30 mmol), 4.2 mL of triethylamine (30 mmol), 3.2 g of HOBt (24 mmol), and 9.1 g of HBTU (24 mmol) were added and the mixture was further stirred at room temperature for two hours. Insoluble particles were filtered and the filtrate was added to 1.7 L of ethyl ether. After sitting at 4° C. overnight, the supernatant was decanted and the precipitate was dried with a vacuum pump. The crude product was further purified by dialyzing (3,500 MWCO) in deionized water acidified to pH 3.5 with HCl for two days. After freeze drying, 15 g of gooey white product was obtained. (GPC: Mw=200,000; UV-vis: 13±1.3 wt % dopamine)

Example 7

Synthesis of PEE-1

8 g of 1000 MW PEG-diol (8 mmol), 2 g of Cbz-Asp-Anh (8 mmol), and 3.1 mg of p-toluenesulfonic salt (0.016 mmol) were dissolved in 50 mL of toluene in a round bottom flask equipped with a Dean-Stark apparatus and a condensation column. While purging with Ar, the mixture was stirred in a 145° C. oil bath for 20 hrs. After cooling to room temperature, toluene was removed by rotoevaporation and the polymer was dried in a vacuum. 23.8 µL of titanium(IV) isopropoxide was added and the mixture was stirred under vacuum (0.5 torr) in a 130° C. oil bath for 18 hrs. 60 mL of chloroform was added and the solution was filtered into 450 mL of ethyl ether. The precipitated polymer was filtered and dried under vacuum to yield 6 g of p(EG1k-CbzAsp) (GPC: Mw=65,000, PD=4.0).

5 g of p(EG1k-CbzAsp) was dissolved in 30 mL of DMF and purged with Ar for 20 min. 10 g of 10 wt % palladium loaded on carbon (Pd/C) was added and 155 mL of formic acid was added dropwise. The mixture was stirred under Ar overnight and Pd/C was filtered and washed with 200 mL of 1N HCl. The filtrate was extracted with DCM and the organic layer was dried over $MgSO_4$. $MgSO_4$ was filtered and DCM was reduced to around 50 mL and added to 450 mL of ethyl ether. The resulting polymer was filtered and dried under vacuum to yield 2.1 g of p(EG 1k-Asp) (GPC: Mw=41,000, PD=4.4).

2.1 g of p(EG1k-Asp) (1.77 mmol —$NH_2$) was dissolved in 30 mL of DCM and 15 mL of DMF. 842 mg of N-Boc-DOPA (2.83 mmol), 382 mg of HOBt (2.83 mmol), HBTU (2.83 mmol), and 595 µL of $Et_3N$ (4.25 mmol) were added. The mixture was stirred for 1 hr at room temperature and added to 450 mL ethyl ether. The polymer was further precipitated in cold MeOH and dried in vacuum to yield 1.9 g of PEE-1 (GPC: Mw=33,800, PD=1.3; UV-vis: 7.7±1.3 wt % DOPA).

Example 8

Synthesis of PEE-5

50 g of PEG-diol (1,000 MW, 50 mmol) and 200 mL of toluene were stirred in a 3-necked flask equipped with a Dean-Stark apparatus and a condensation column. While purging under Ar, the PEG was dried by evaporating 150 mL of toluene in a 145° C. oil bath. After the temperature of the mixture cooled to room temperature, 100 mL of DCM was added and the polymer solution was submerged in an ice water bath. 17.5 mL of $Et_3N$ (125 mmol) in 60 mL of DCM and 5.7 mL of fumaryl chloride (50 mmol) in 70 mL of DCM were added dropwise and simultaneously over 30 min. The mixture was stirred for 8 hrs at room temperature. Organic salt was filtered out and the filtrate was added to 2.7 L of ethyl ether. After precipitating once more in DCM/ethyl ether, the polymer was dried to yield 45.5 g of p(EG1k-Fum) (GPC: Mw=21,500, PD=3.2).

45 g of p(EG1k-Fum) (41.7 mmol of fumarate vinyl group), 36.2 mL of 3-mercaptopropionic acid (MPA, 417 mmol), and 5.7 g of AIBN were dissolved in 300 mL of DMF. The solution was degassed three times with freeze-pump-thaw cycles. While sealed under vacuum (5 torr), the mixture was stirred in a 60° C. water bath overnight. The resulting polymer was precipitated twice with ethyl ether and dried to yield 41.7 g of p(EG1kf-MPA) (GPC: Mw=14,300, PD=2.3)

41 g of p(EG1kf-MPA) was dissolved in 135 mL of DMF and 270 mL of DCM. 10.5 g of dopamine HCl (55.4 mmol), 7.5 g of HOBt (55.4 mmol), 20.9 g of HBTU (55.4 mmol), and 11.6 mL of $Et_3N$ (83 mmol) were added. The mixture was stirred for 2 hrs at room temperature and then added to 2.5 L of ethyl ether. The polymer was further purified by dialysis using 3500 MWCO dialysis tubing in deionized water for 24 hrs. After lyophilization, 30 g of PEE-5 was obtained (GPC-LS: Mw=21,000, PD=2.0; UV-vis: 9.4±0.91 wt % dopamine).

Example 9

Synthesis of PEE-9

4 g of HMPA (30 mmol) and 6 g of PEG-diol (600 MW, 10 mmol) were dissolved in 20 mL of chloroform, 20 mL of THF, and 40 mL of DMF. While stirring in an ice water bath with Ar purging, 4.18 mL of succinyl chloride (38 mmol) in 30 mL of chloroform and 14 mL of $Et_3N$ (100 mmol) in 20 mL of chloroform were added simultaneously and dropwise over 3.5 hrs. The reaction mixture was stirred at room temperature overnight. The insoluble organic salt was filtered out and the filtrate was added to 800 mL of ethyl ether. The precipitate was dried under a vacuum to yield 8 g of p(EG600DMPA-SA) ($^1$H NMR: HMPA:PEG=3:1).

8 g of p(EG600DMPA-SA) (10 mmol —COOH) was dissolved in 20 mL of chloroform and 10 mL of DMF. 3.8 g of HBTU (26 mmol), 1.35 g of HOBt (10 mmol), 2.8 g of dopamine HCl (15 mmol), and 3.64 mL of $Et_3N$ (26 mmol) were added and the reaction mixture was stirred for an hour. The mixture was added to 400 mL of ethyl ether and the precipitated polymer was further purified by dialyzing using 3500 MWCO dialysis tubing in deionized water for 24 hrs. After lyophilization, 600 mg of PEE-9 was obtained (GPC-LS: Mw=15,000, PD=4.8; UV-vis: 1.0±0.053 μmol dopamine/mg polymer, 16±0.82 wt % dopamine).

Example 10

Synthesis of PEA-2

903 mg of Jeffamine ED-2001 (0.95 mmol —$NH_2$) in 10 mL of THF was reacted with 700 mg of Cbz-DOPA-NCA (1.4 mmol) and 439 mg of Cbz-Lys-NCA (1.41 mmol) for three days. 293 μL of triethylamine (2.1 mmol) was added to the mixture and 105 μL of succinyl chloride (0.95) was added dropwise and stirred overnight. After precipitating the polymer in ethyl ether and drying under a vacuum, 800 mg of solid was obtained. ($^1$H NMR: 0.6 Cbz-DOPA and 2.2 Cbz-Lys per ED2k)

The dried compound was dissolved in 4 mL of MeOH and Pd (10 wt % in carbon support) was added with Ar purging. 12 mL of 1 N formic acid was added dropwise and the mixture was stirred overnight under Ar atmosphere. 20 mL 1 N HCl was added and Pd/C was removed by filtration. The filtrate was dialyzed in deionized water (3,500 MWCO) for 24 hours. After lyophilization, 80 mg of PEA-2 was obtained. (GPC: Mw=16,000; PD=1.4; UV-vis: 3.6 wt % DOPA)

Example 11

Synthesis of GEL-1

3.3 g of DOHA (18.3 mmol) was dissolved in 25 mL of DMSO and 35 mL of 100 mM MES buffer (pH 6.0, 300 mM NaCl) and 3.5 g of EDC (18.3 mmol) and 702 mg of NHS (6.1 mmol) were added. The mixture was stirred at room temperature for 10 min and 10 g of gelatin (75 bloom, Type B, Bovine) was dissolved in 100 mL of 100 mM MES buffer (pH 6.0, 300 mM NaCl) was added. The pH was adjusted to 6.0 with concentrated HCl and the mixture was stirred at room temperature overnight. The mixture was added to dialysis tubing (15,000 MWCO) and dialyzed in deionized water acidified to pH 3.5 for 24 hrs. After lyophilization, 5.1 g of GEL-1 was obtained (UV-vis: 8.4±0.71 DOHA per gelatin chain, 5.9±0.47 wt % DOHA).

Example 12

Synthesis of GEL-4

10 g of gelatin (75 bloom, Type B, Bovine) was dissolved in 200 mL of 100 mM MES buffer (pH 6.0, 300 mM NaCl). 2.3 g of cysteamine dihydrochloride (10.2 mmol) was added and stirred until it dissolved. 1.63 g of EDC (8.5 mmol) and 245 mg of NHS (2.1 mmol) were added and the mixture was stirred overnight at room temperature. The pH was raised to 7.5 by adding 1 N NaOH, and 9.44 g of DTT (61.2 mmol) was added. The pH of the solution was increased to 8.5 and the mixture was stirred at room temperature for 24 hrs. The pH was reduced to 3.5 by adding 6 N HCl, and the reaction mixture was dialyzed using 15,000 MWCO dialysis tubing with deionized water acidified to pH 3.5 for 24 hrs. The solution was lyophilized to yield 7.5 g of Gelatin-g-CA (UV-vis: 0.46±0.077 μmol CA/mg polymer or 11±1.8 CA per gelatin chain).

7.5 g of Gelatin-g-CA (3.4 mmol —SH) was dissolved in 100 mL of 12.5 mM acetic acid. 279 mg of AIBN (1.7 mmol) in 20 mL of MeOH and 3.73 g of DMA1 (17 mmol) were added and the mixture was degassed with two cycles of freeze-pump-thaw cycles. While sealed under Ar, the mixture was stirred in an 85° C. oil bath overnight. The mixture was dialyzed using 15,000 MWCO dialysis tubing with deionized water acidified to pH 3.5 for 24 hrs. The solution was lyophilized to yield 4.5 g of GEL-4 (UV-vis: 54 wt % DMA1, 128±56 DMA1 per gelatin chain).

Example 13

Synthesis of GEL-5

9 g of gelatin (75 bloom, Type B, Bovine) was dissolved in 100 mL of deionized water. 150 mg of AIBN (0.91 mmol) in 1 mL of DMF was added and the mixture was degassed with Ar bubbling for 20 min. The mixture was stirred in a 50° C. water bath for 10 min. 1.0 g of DMA1 (4.6 mmol) in 10 mL of MeOH was added dropwise and the mixture was stirred at 60° C. overnight. The reaction mixture was added to 750 mL of acetone and the precipitate was further purified by dialyzing in deionized water (using 3,500 MWCO dialysis tubing) for 24 hrs. The solution was precipitated in acetone and the polymer was dried in a vacuum desiccator to yield 5.0 g of GEL-5 (UV-vis: 17 wt % DMA1, 21±2.3 DMA1 per gelatin chain).

Example 14

Curing Time of Adhesive Polymer

The amount of time it takes a polymeric solution of DHPp to cure was determined by the vial inversion method. DHPp was dissolved in phosphate buffered saline (PBS, pH 7.4) and an aqueous solution of $NaIO_4$ at a periodate-to-DHPD molar ratio of 0.5 was mixed together in a dual syringe. Curing is deemed complete when the polymeric solution ceases to flow in an inverted vial containing the solution.

Example 15

In Vitro Degradation

Adhesives were prepared as described in Example 14. In vitro degradation of cured adhesive was performed by placing the adhesive in PBS (pH 7.4) in a 37° C. incubator. The time it takes for the adhesive to completely dissolve was recorded.

Example 16

Preparation of Nanostructural Adhesive Coated with DHPp

E-beam resist (950PMMA A3, MicroChem) was spin-coated (4000 rpm, 40 sec) on a silicon wafer several times until the resist thickness, as measured by ellipsometry (Woolam Co. Lincoln, Nebr.), reached 600~700 nm. The resist was patterned at 30 kV with an area dose between 650-800 μC/cm$^2$ using a Quanta 600F (FEI Co. Hillsboro, Oreg.). Resist development was performed for 1 min with a solution of methyl isobutyl ketone/isopropanol (1/3, v/v), followed by rinsing with water. The patterned substrates were treated with oxygen plasma (Harrick, Pleasantville, N.Y.) for 30 sec and repeated 2-3 times to completely remove residual resist from the exposed Si regions. The patterned substrates were then exposed to a triethoxyoctylsilane vapor for 30 min. PDMS was prepared as follows: 4 μL of Pt-catalyst (platinum-divinyl tetramethyl-disiloxane in xylene) and 4 μL of modulator (2,4,6,8-tetramethyl-2,4,6,8-tetravinylcyclotetrasioxane) were added to a 7-8% vinylmethylsiloxane solution (3.5 g). The solution was subsequently mixed with a 25-30% methylhydrosiloxane (1 g) solution. Finally the solution was cured (80° C.) after spin-coating (1000 rpm for 1 min) onto the PMMA/Si master. The spin-coated substrate was covered either by a thin cover glass for force measurements or sylgard-184 PDMS for other experiments such as optical imaging or x-ray photoelectron spectroscopy (XPS). Gecko adhesive was obtained by PDMS pattern lift-off and brief exposure to oxygen plasma (100 W, 30 sec) and used within 2-3 hrs after plasma treatment. DHPp-coated nanostructural adhesive was prepared by dip-coating PDMS in a 1 mg/mL solution of PDMA-12 in ethanol at 70° C.

Example 17

AFM Test

All force data were collected on an Asylum Mfp-1D AFM instrument (Asylum Research, Santa Barbara, Calif.) installed on a Nikon TE2000 microscope. Spring constants of individual cantilevers (Veecoprobes, NP-20 tipless $Si_3N_4$ tips, Santa Barbara, Calif.) were calibrated by applying the equipartition theorem to the thermal noise spectrum. Due to the large forces exhibited by the adhesive, only tips exhibiting high spring constants (280-370 pN/nm) were used. Metal and metal oxide coated cantilevers were formed by sputter coating ~10 nm of Au or Ti (a native oxide formed at the Ti surface, $TiO_x$) using a Denton Vacuum Desk III (Moorestown, N.J.). The surface composition of each cantilever was confirmed by time-of-flight secondary ion mass spectrometry (ToF-SIMS), using a PHI-TRIFT III ($Ga^+$, 15 keV, Physical Electronics, Eden Prairie, Minn.). Cantilevers were treated by oxygen plasma (100 W, 150 mTorr) for 3 min before use. Force measurements were conducted either in deionized water or ambient (air) conditions at a cantilever pulling speed of 2 μm/sec. In wet experiments, optical microscopic examination of the contact region indicated the absence of air bubbles trapped between nanopillars and on the nanopillar surface (not shown). Tapping mode AFM images were obtained using a multimode Veeco Digital Instrument (San Diego, Calif.) with a Si cantilever (resonance frequency of 230-280 kHz). Contact area was imaged by an inverted optical microscope using a 40× objective illuminated by a fiber-optic white light source perpendicular to the objective.

Example 18

Coating and Characterization of DHPp-Coated Surfaces

Test materials were coated by immersion in an aqueous solution containing a DHPp and incubated overnight at a temperature near the respective cloud-point (LCST) of the polymer to maximize surface coverage.[26, 79] After coating, the samples were rinsed with water and dried under $N_2$. The advancing contact angle of a droplet of water was measured on both clean and coated surfaces using a fixed-stage goniometer (Ramé-Hart) equipped with an automatic drop dispensing system, CCD camera, and data analysis software.

Example 19

Resistance to 3T3 Cell Adhesion

To determine the fundamental ability of these coatings to resist biological fouling, mammalian cell attachment was assayed on coated and uncoated test materials. Triplicate samples of test materials were placed individually in 12-well tissue culture plates and covered with 1 mL of Dulbecco's Modified Eagle Medium (DMEM) containing 5% calf bovine serum for 30 min. 3T3 fibroblasts (ATCC, #CCL-92) were then seeded on the surfaces at $1.5 \times 10^4$ cells/cm$^2$ and the plates were incubated for 4 h at 37° C. Following incubation, the samples were rinsed three times with PBS, stained with calcein AM, and imaged using an epifluorescence microscope at 5× magnification. The total cellular area was determined by digital threshold image analysis. The percent reduction in cell attached area compared to the control surface was then reported.

Example 20

Resistance to Bacterial Adhesion—Continuous Flow Experiment

Figure 21:
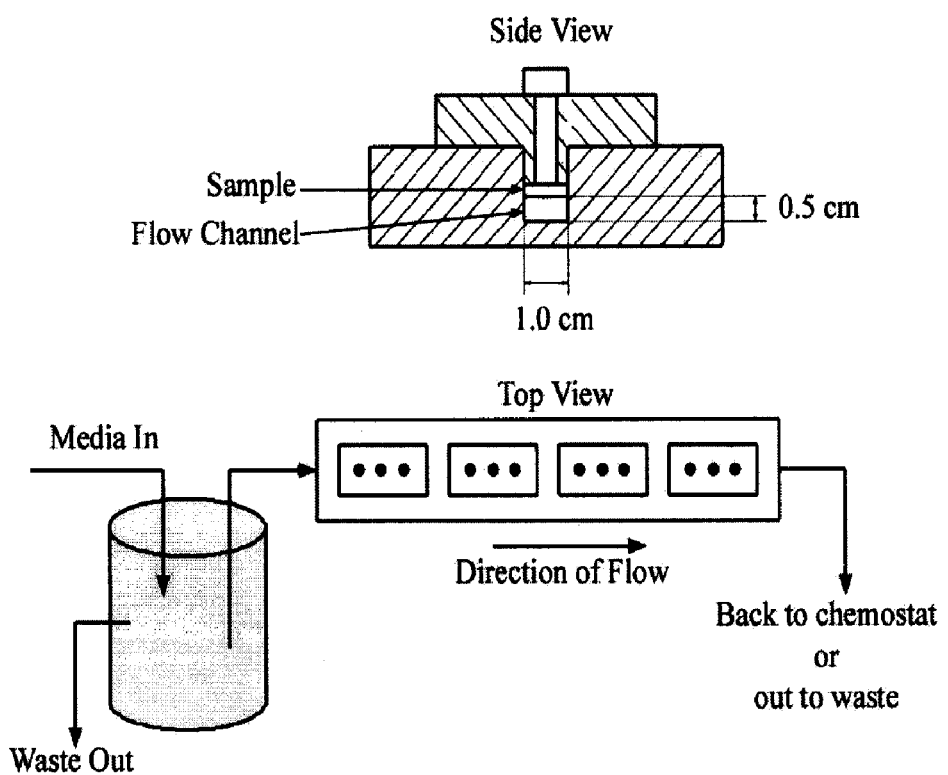
FIG. 21: Schematic of a modified Robbins device for assaying bacterial attachment and biofilm formation.

*Staphylococcus aureus* and *Pseudomonas aeruginosa* were grown overnight in a chemostat at a dilution rate of 0.07 h⁻¹ in tryptic soy broth. Test surfaces (1 cm×1 cm, UV sterilized) were mounted in a modified Robbins device (MRD; FIG. 21) to assay bacterial attachment under conditions of flow. The bacterial suspension was pumped through the MRD at a rate of 40 mL/min (shear rate=37.5 s⁻¹) across the surfaces of four coated and uncoated samples. After 4 h of exposure, the samples were removed from the MRD, fluorescently stained, and imaged using an epifluorescence microscope (Leica Microsystems GmbH, Wetzlar, Germany) at 40×. Nine random images were acquired from each surface. The total projected area of adherent cells was determined by threshold digital image analysis. The percent reduction in cell attached area compared to the control surface was then reported.

Example 21

Resistance to Bacterial Adhesion—Static Experiment

*Staphylococcus aureus* and *Pseudomonas aeruginosa* were grown overnight in a batch culture at 37° C. After incubation, the bacteria were resuspended in PBS and diluted to ~1×10⁸ CFU/mL. Coated and uncoated surfaces were placed in 12-well plates and 1 mL of bacterial suspension was added to each well. The plates were incubated at 37° C. for 4 h. The samples were then rinsed twice with 1 mL PBS and stained for microscopy. Nine random images were acquired from each surface. The total cellular coverage was determined by digital threshold image analysis. The percent reduction in cell attached area compared to the control surface was then reported.

REFERENCES (All references are incorporated by reference herein.)
1. Waite, J. H., *Nature's underwater adhesive specialist*. Int. J. Adhes. Adhes., 1987. 7(1): p. 9-14.
2. Yamamoto, H., *Marine adhesive proteins and some biotechnological applications*. Biotechnology and Genetic Engineering Reviews, 1996. 13: p. 133-65.
3. Yu, M., J. Hwang, and T. J. Deming, *Role of L-3,4-dihydroxyphenylanine in mussel adhesive proteins*. Journal of American Chemical Society, 1999. 121(24): p. 5825-5826.
4. Deming, T. J., M. Yu, and J. Hwang, *Mechanical studies of adhesion and crosslinking in marine adhesive protein analogs*. Polymeric Materials: Science and Engineering, 1999. 80: p. 471-472.
5. Waite, J. H., *Mussel beards: A coming of Age*. Chemistry and Industry, 1991. 2 Sep.: p. 607-611.
6. Waite, J. H. and S. O. Andersen, 3,4-*Dihydroxyphenylalanine in an insoluble shell protein of Mytilus edulis*. Biochimica et Biophysica Acta, 1978. 541(1): p. 107-14.
7. Pardo, J., et al., *Purification of adhesive proteins from mussels*. Protein Expr Purif, 1990. 1(2): p. 147-50.
8. Papov, V. V., et al., *Hydroxyarginine-containing polyphenolic proteins in the adhesive plaques of the marine mussel Mytilus edulis*. Journal of Biological Chemistry, 1995. 270 (34): p. 20183-92.
9. Maugh, K. J., et al., *Recombinant bioadhesive proteins of marine animals and their use in adhesive compositions*, in Genex Corp. 1988: USA. p. 124.
10. Strausberg, R. L., et al., *Development of a microbial system for production of mussel adhesive protein*, in *Adhesives from Renewable Resources*. 1989. p. 453-464.
11. Filpula, D. R., et al., *Structural and functional repetition in a marine mussel adhesive protein*. Biotechnol. Prog., 1990. 6(3): p. 171-7.
12. Yu, M. and T. J. Deming, *Synthetic polypeptide mimics of marine adhesives*. Macromolecules, 1998. 31(15): p. 4739-45.
13. Yamamoto, H., *Adhesive studies of synthetic polypeptides: a model for marine adhesive proteins*. J. Adhes. Sci. Technol., 1987. 1(2): p. 177-83.
14. Yamamoto, H., et al., *Insolubilizing and adhesive studies of water-soluble synthetic model proteins*. Int. J. Biol. Macromol., 1990. 12(5): p. 305-10.
15. Tatehata, H., et al., *Model polypeptide of mussel adhesive protein. I. Synthesis and adhesive studies of sequential polypeptides (X-Tyr-Lys)n and (Y-Lys)n*. Journal of Applied Polymer Science, 2000. 76(6): p. 929-937.
16. Strausberg, R. L. and R. P. Link, *Protein-based medical adhesives*. Trends in Biotechnology, 1990. 8(2): p. 53-7.
17. Young, G. A. and D. J. Crisp, *Marine Animals and Adhesion*, in *Adhesion 6*. Barking, K. W. Allen, Editor. 1982, Applied Science Publishers, Ltd.: England.
18. Ninan, L., et al., *Adhesive strength of marine mussel extracts on porcine skin*. Biomaterials, 2003. 24(22): p. 4091-9.
19. Schnurrer, J. and C.-M. Lehr, *Mucoadhesive properties of the mussel adhesive protein*. International Journal of Pharmaceutics, 1996. 141(1,2): p. 251-256.
20. Lee, B. P., et al., *Synthesis of 3,4-Dihydroxyphenylalanine (DOPA) Containing Monomers and Their Copolymerization with PEG-Diacrylate to from Hydrogels*. Journal of Biomaterials Science, Polymer Edition, 2004. 15: p. 449-464.
21. Lee, B. P., J. L. Dalsin, and P. B. Messersmith, *Synthesis and Gelation of DOPA-Modified Poly(ethylene glycol) Hydrogels*. Biomacromolecules, 2002. 3(5): p. 1038-47.
22. Lee, B. P., et al., *Rapid Photocurable of Amphiphilic Block Copolymers Hydrogels with High DOPA Contents*. Maclomolecules, 2006. 39: p. 1740-48.
23. Huang, K., et al., *Synthesis and Characterization of Self-Assembling Block Copolymers Containing Bioadhesive End Groups*. Biomacromolecules, 2002. 3(2): p. 397-406.
24. Dalsin, J. L., et al., *Mussel Adhesive Protein Mimetic Polymers for the Preparation of Nonfouling Surfaces*. Journal of American Chemical Society, 2003. 125: p. 4253-4258.
25. Dalsin, J. L., L. Lin, and P. B. Messersmith, *Antifouling performance of poly(ethylene glycol) anchored onto surfaces by mussel adhesive protein mimetic peptides*. Polymeric Materials Science and Engineering, 2004. 90: p. 247-248.
26. Dalsin, J. L., et al., *Protein Resistance of Titanium Oxide Surfaces Modified by Biologically Inspired mPEG-DOPA*. Langmuir, 2005. 21(2): p. 640-646.
27. Statz, A. R., et al., *New Peptidomimetic Polymers for Antifouling Surfaces*. Journal of the American Chemical Society, 2005. 127(22): p. 7972-7973.
28. Fan, X., L. Lin, and P. B. Messersmith, *Surface-initiated polymerization from TiO₂ nanoparticle surfaces through a biomimetic initiator: A new route toward polymer-matrix nanocomposites*. Composites Science and Technology, 2006. 66: p. 1195-1201.
29. Dossot, M., et al., *Role of phenolic derivatives in photopolymerization of an acrylate coating*. Journal of Applied Polymer Science, 2000. 78(12): p. 2061-2074.
30. Khudyakov, I. V., et al., *Kinetics of Photopolymerization of Acrylates with Functionality of 1-6*. Ind. Eng. Chem. Res., 1999. 38: p. 3353-3359.

31. Sichel, G., et al., *Relationship between melanin content and superoxide dismutase (SOD) activity in the liver of various species of animals*. Cell Biochem. Funct, 1987. 5(2): p. 123-8.
32. Waite, J. H. and X. Qin, *Polyphosphoprotein from the Adhesive Pads of Mytilus edulis*. Biochemistry, 2001. 40(9): p. 2887-93.
33. Long, J. R., et al., *A peptide that inhibits hydroxyapatite growth is in an extended conformation on the crystal surface*. Proceedings of the National Academy of Sciences of the United States of America, 1998. 95(21): p. 12083-12087.
34. Meisel, H. and C. Olieman, *Estimation of calcium-binding constants of casein phosphopeptides by capillary zone electrophoresis*. Anal. Chim. Acta, 1998. 372(1-2): p. 291-297.
35. Lu, G., D. Wu, and R. Fu, *Studies on the synthesis and antibacterial activities of polymeric quaternary ammonium salts from dimethylaminoethyl methacrylate*. Reactive & Functional Polymers, 2007. 67(4): p. 355-366.
36. Li, Z., et al., *Two-Level Antibacterial Coating with Both Release-Killing and Contact-Killing Capabilities*. Langmuir 2006. 22(24): p. 9820-9823.
37. Sun, Q., et al., *Improved antifouling property of zwitterionic ultrafiltration membrane composed of acrylonitrile and sulfobetaine copolymer*. Journal of Membrane Science, 2006. 285(1+2): p. 299-305.
38. Kitano, H., et al., *Resistance of zwitterionic telomers accumulated on metal surfaces against nonspecific adsorption of proteins*. Journal of Colloid and Interface Science, 2005. 282(2): p. 340-348.
39. Hajjaji, N., et al., *Effect of N-alkylbetaines on the corrosion of iron in 1 M hydrochloric acid solution*. Corrosion, 1993. 49(4): p. 326-34.
40. Morgan, D. M. L., V. L. Larvin, and J. D. Pearson, *Biochemical characterization of polycation-induced cytotoxicity to human vascular endothelial cells*. Journal of Cell Science, 1989. 94(3): p. 553-9.
41. Fischer, D., et al., *In vitro cytotoxicity testing of polycations: influence of polymer structure on cell viability and hemolysis*. Biomaterials 2003. 24(7): p. 1121-1131.
42. Zekorn, T. D., et al., *Biocompatibility and immunology in the encapsulation of islets of Langerhans (bioartificial pancreas)*. Int J Artif Organs, 1996. 19(4): p. 251-7.
43. Ishihara, M., et al., *Photocrosslinkable chitosan as a dressing for wound occlusion and accelerator in healing process*. Biomaterials, 2002. 23(3): p. 833-40.
44. Huin-Amargier, C., et al., *New physically and chemically crosslinked hyaluronate (HA)-based hydrogels for cartilage repair*. Journal of Biomedical Materials Research, Part A, 2006. 76A(2): p. 416-424.
45. Stevens, P. V., Food Australia, 1992. 44(7): p. 320-324.
46. Ikada, Y., *Tissue adhesives, in Wound Closure Biomaterials and Devices*, C. C. Chu, J. A. von Fraunhofer, and H. P. Greisler, Editors. 1997, CRC Press, Inc.: Boca Raton, Fla. p. 317-346.
47. Sierra, D. and R. Saltz, *Surgical Adhesives and Sealants: Current Technology and Applications*. 1996, Lancaster, Pa.: Technomic Publishing Company, Inc.
48. Donkerwolcke, M., F. Burny, and D. Muster, *Tissues and bone adhesives-historical aspects*. Biomaterials 1998. 19 p. 1461-1466.
49. Rzepecki, L. M., K. M. Hansen, and J. H. Waite, *Bioadhesives: dopa and phenolic proteins as component of organic composite materials*, in *Principles of Cell Adhesion*. 1995, CRC Press. p. 107-142.
50. Spotnitz, W. D., *History of tissue adhesive, in Surgical Adhesives and Sealants: Current Technology and Applications*, D. H. Sierra and R. Saltz, Editors. 1996, Technomic Publishing Co. Inc.: Lancaster, Pa. p. 3-11.
51. ASTM-F2392, *Standard Test Method for Burst Strength of Surgical Sealants* 2004.
52. Lee, B. P., J. L. Dalsin, and P. B. Messersmith, *Synthetic Polymer Mimics Of Mussel Adhesive Proteins for Medical Applications*, in *Biological Adheisves*, A. M. Smith and J. A. Callow, Editors. 2006, Springer-Verlag. p. 257-278.
53. Benedek, I., *End-Uses of Pressure Sensitive Products*, in *Developments In Pressure-Sensitive Products*, I. Benedek, Editor. 2006, CRC Press: Boca Raton, Fla. p. 539-596.
54. Creton, C., *Pressure-sensitive adhesives: an introductory course*. MRS Bulletin, 2003. 28(6): p. 434-439.
55. Lucast, D. H., *Adhesive considerations for developing stick-to-skin products*. Adhesives Age 2000. 43(10): p. 38-39.
56. Venkatraman, S. and R. Gale, *Skin adhesives and skin adhesion. 1. Transdermal drug delivery systems*. Biomaterials, 1998. 19(13): p. 1119-36.
57. Feldstein, M. M., N. A. Plate, and G. W. Cleary, *Molecular design of hydrophilic pressure-sensitive adhesives for medical applications*, in *Developments In Pressure-Sensitive Products*, I. Benedek, Editor. 2006, CRC Press: Boca Raton, Fla. p. 473-503.
58. Skelhorne, G. and H. Munro, *Hydrogel Adhesive for Wound-Care Applications*. Medical Device Technology, 2002: p. 19-23.
59. Chalykh, A. A., et al., *Pressure-Sensitive Adhesion in the Blends of Poly(N-Vinyl Pyrrolidone) and Poly(Ethylene Glycol) of Disparate Chain Lengths*. The Journal of Adhesion, 2002 78(8): p. 667-694.
60. Ruibal, R. and V. Ernst, *The structure of the digital setae of lizards*. J. Morphology, 1965. 117: p. 271-293.
61. Geim, A. K., et al., *Microfabricated adhesive mimicking gecko foot-hair*. Nat. Materials, 2003. 2: p. 461-463.
62. Northen, M. T. and K. L. Turner, *A batch fabricated biomimetic dry adhesive*. Nanotechnology 2005. 16: p. 1159-1166.
63. Sitti, M. and R. Fearing, *Synthetic gecko foot-hair micro/nano-structures as dry adhesives*. J. Adhes. Sci. Technol., 2003. 17: p. 1055-1073.
64. Yurdumakan, B., et al., *Synthetic gecko foot-hairs from multiwalled carbon nanotubes*. Chem. Commun., 2005. 30: p. 3799-3801.
65. Peressadko, A. and S. N. Gorb, *When less is more: Experimental evidence for tenacity enhancement by division of contact area*. J. Adhesion, 2004. 80: p. 1-5.
66. Crosby, A. J., M. Hageman, and A. Duncan, *Controlling polymer adhesion with "Pancakes"*. Langmuir 2005. 21: p. 11738-11743.
67. Northen, M. T. and K. L. Turner, *Meso-scale adhesion testing of integrated micro-and nano-scale structures*. Sensors and Actuators A, 2006. 130-131: p. 583-587.
68. Huber, G., et al., *Evidence for capillary contributions to gecko adhesion from single spatula nanomechanical measurements*. Proc. Nat. Acad. Sci. USA, 2005. 102: p. 16293-16296.
69. Sun, W., et al., *The nature of the gecko lizard adhesive force*. Biophys. J., 2005. 89: p. L14-16.
70. Wisniewski, N. and M. Reichert, *Methods for reducing biosensor membrane biofouling*. Colloids Surf B Biointerfaces, 2000 18(3-4): p. 197-219.
71. Gu, J. D., et al., *The role of microbial biofilms in deterioration of space station candidate materials*. Int. Biodeterior Biodegradaton, 1998. 41(1): p. 25-33.

72. Harris, J. M., *Introduction to biotechnical and biomedical applications of poly(ethylene glycol)*, in *Poly(ethylene glycol) chemistry: biotechnical and biomedical applications*, J. M. Harris, Editor. 1992, Plenum Press: New York. p. 1-14.
73. Ryu, D. Y., et al., *A Generalized Approach to the Modification of Solid Surfaces* Science 2005. 308(5719): p. 236-239.
74. Ratner, B. D., *Titanium in Medicine: Material Science, Surface Science, Engineering, Biological Responses and Medical Applications*, ed. D. M. Brunette, et al. 2000, Heidelberg: Springer-Verlag.
75. Leonard, E. F., V. T. Turitto, and L. Vroman, *Blood in contact with natural and artificial surfaces*. New York Academy of Sciences, 1987. 516: p. 688.
76. Mukkamala, R., A. M. Kushner, and C. R. Bertozzi, *Hydrogel polymers from alkylthio acrylates for biomedical applications*. Polymer Gels: Fundamentals and Applications, 2003. 833: p. 163-174.
77. Bruinsma, G. M., H. C. van der Mei, and H. J. Busscher, *Bacterial adhesion to surface hydrophilic and hydrophobic contact lenses*. Biomaterials 2001. 22(24): p. 3217-3224.
78. Zawada, J., *A-dec, Inc.* 2005.
79. Kingshott, P., H. Thissen, and H. J. Griesser, *Effects of cloud-point grafting, chain length, and density of PEG layers on competitive adsorption of ocular proteins*. Biomaterials, 2002. 23(9): p. 2043-2056.

TABLE 1A

List of PEG-based monomers used in this patent application

| Monomer | Abbreviation | $R_{10}$ | $R_{12}$ |
|---|---|---|---|
| Poly(ethylene glycol) methyl ether methacrylate (Mn~300) | EG4ME | 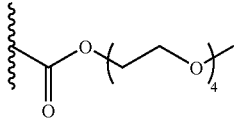 | —$CH_3$ |
| Poly(ethylene glycol) methyl ether methacrylate (Mn~475) | EG9ME | 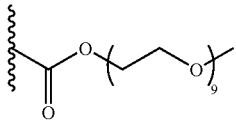 | —$CH_3$ |
| Poly(ethylene glycol) methyl ether acrylamide (Mn~680) | EG12AA | 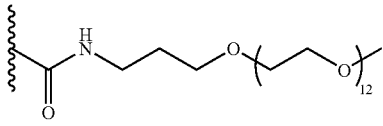 | —H |
| Poly(ethylene glycol) methyl ether methacrylamide (Mn~1085) | EG22MA | 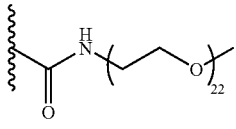 | —$CH_3$ |

TABLE 1B

List of neutral hydrophilic monomers used in this patent application

| Monomer | Abbreviation | $R_{10}$ | $R_{12}$ |
|---|---|---|---|
| Acrylamide | AAm | 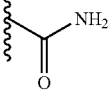 | —H |
| N-Acryloylmorpholine | NAM | 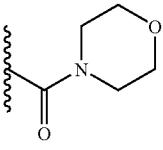 | —H |
| 2-Hydroxyethyl methacrylate | HEMA | 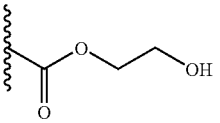 | —$CH_3$ |

TABLE 1B-continued

List of neutral hydrophilic monomers used in this patent application

| Monomer | Abbreviation | $R_{10}$ | $R_{12}$ |
|---|---|---|---|
| N-Isopropylacrylamide | NIPAM | (structure: acrylamide with isopropyl group) | —H |
| 2-Methoxyethyl acrylate | MEA | (structure: acrylate with methoxyethyl group) | —H |
| [3-(Methacryloylamino)propyl]dimethyl(3-sulfopropyl)ammonium hydroxide | SBMA | (structure: methacrylamide-propyl-dimethylammonium-propylsulfonate) | —CH$_3$ |
| 1-Vinyl-2-pyrrolidone | VP | (structure: vinyl pyrrolidone) | —H |

TABLE 1C

List of basic monomers used in this patent application

| Monomer | Abbreviation | $R_{10}$ | $R_{12}$ |
|---|---|---|---|
| (3-Acrylamidopropyl)trimethylammonium | APTA | (structure: acrylamide-propyl-trimethylammonium) | —H |
| Allylamine | AA | (structure: CH$_2$—NH$_2$) | —H |
| 1,4-Diaminobutane methacrylamide | DABMA | (structure: methacrylamide-butyl-NH$_2$) | —CH$_3$ |

TABLE 1D

List of acidic monomers used in this patent application

| Monomer | Abbreviation | $R_{10}$ | $R_{12}$ |
|---|---|---|---|
| 2-Acrylamido-2-methyl-1-propanesulfonic acid | AMPS | (structure: acrylamide-C(CH$_3$)$_2$-CH$_2$-SO$_3^-$) | —H |

TABLE 1D-continued

List of acidic monomers used in this patent application

| Monomer | Abbreviation | $R_{10}$ | $R_{12}$ |
|---|---|---|---|
| Ethylene glycol methacrylate phosphate | EGMP | 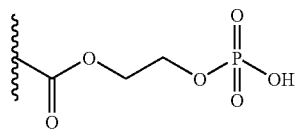 | —$CH_3$ |

TABLE 1E

Hydrophobic monomer used in this patent application

| Monomer | Abbreviation | $R_{10}$ | $R_{12}$ |
|---|---|---|---|
| 2,2,2-Trifluoroethyl methacrylate | TFEM | 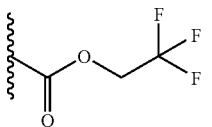 | —$CH_3$ |

TABLE 2A

List of PEG-based polymers prepared from AIBN-initiated polymerization

| Polymer | Reaction Solvent | Monomer Feed Molar Ratio | Monomer:AIBN Feed Molar Ratio | Reaction Time (Hrs) | $M_w$ | PD | DMA wt % |
|---|---|---|---|---|---|---|---|
| PDMA-1 | DMF | 1:1 DMA1:EG9ME | 50:1 | 5 | 430,000 | 1.8 | 24 |
| PDMA-2 | DMF | 1:9 DMA1:EG9ME | 98:1 | 18 | >$10^6$ | — | 4.1 |
| PDMA-3 | DMF | 1:1 DMA1:EG4ME | 50:1 | 17 | 790,000 | 4.1 | 32 |
| PDMA-4 | DMF | 1:3 DMA1:EG12AA | 50:1 | 16 | 9,500 | 1.7 | 12 |
| PDMA-5 | DMF | 1:1 DMA3:EG9ME | 40:1 | 18 | — | — | 26 |

TABLE 2B

List of water soluble polymers prepared from AIBN-initiated polymerization

| Polymer | Reaction Solvent | Monomer Feed Molar Ratio | Monomer:AIBN Feed Molar Ratio | Reaction Time (Hrs) | $M_w$ | PD | DMA wt % |
|---|---|---|---|---|---|---|---|
| PDMA-6 | 0.5M NaCl | 1:8 DMA1:SBMA | 77:1 | 18 | 220,000 | 1.2 | 8.6 |
| PDMA-7 | DMF | 1:20 DMA1:NAM | 250:1 | 16 | 250,000 | 3.5 | 4.5 |
| PDMA-8 | DMF | 1:20 DMA2:NAM | 250:1 | 16 | — | — | 8.5 |
| PDMA-9 | DMF | 1:10 DMA1:Am | 250:1 | 16 | — | — | 18 |
| PDMA-10 | Water/ Methanol | 1:10 DMA1:Am | 250:1 | 16 | — | — | 23 |

TABLE 2C

List of water insoluble, hydrophilic polymers prepared from AIBN-initiated polymerization

| Polymer | Reaction Solvent | Monomer Feed Molar Ratio | Monomer:AIBN Feed Molar Ratio | Reaction Time (Hrs) | $M_w$ | PD | DMA wt % |
|---|---|---|---|---|---|---|---|
| PDMA-11 | DMF | 1:3 DMA1:HEMA | 100:1 | 18 | — | — | 27 |
| PDMA-12 | DMF | 1:8 DMA1:MEA | 100:1 | 18 | 250,000 | 1.7 | 21 |

TABLE 2D

Hydrophobic polymer prepared from AIBN-initiated polymerization

| Polymer | Reaction Solvent | Monomer Feed Molar Ratio | Monomer:AIBN Feed Molar Ratio | Reaction Time (Hrs) | $M_w$ | PD | DMA wt % |
|---|---|---|---|---|---|---|---|
| DMA-13 | DMF | 1:25 DMA1:TFME | 105:1 | 17 | — | — | 2.8 |

TABLE 2E

List of 3-component polymers prepared from AIBN-initiated polymerization

| Polymer | Reaction Solvent | Monomer Feed Molar Ratio | Monomer:AIBN Feed Molar Ratio | Reaction Time (Hrs) | $M_w$ | PD | DMA wt % |
|---|---|---|---|---|---|---|---|
| PDMA-14 | DMF | 1:1:1 DMA1:DABMA:EG9ME | 75:1 | 17 | 108 | 1.2 | 13 |
| PDMA-15 | DMF | 1:2:4 DMA:AA:EG9ME | 70:1 | 4 | 132,000 (67 wt %) 61,000 (33 wt %)* | 1.2 1.3 | 7.0 |
| PDMA-16 | DMF | 1:1:1 DMA1:APTA:EG9ME | 75:1 | 16 | 78,000 | 1.0 | 18 |
| PDMA-17 | DMF | 1:1:25 DMA1:APTA:NAM | 84:1 | 16 | — | — | 6.8 |
| PDMA-18 | DMF | 2:1:4 DMA1:AMPS:EG4ME | 35:1 | 4 | 82,000 | 1.9 | 14 |
| PDMA-19 | DMF | 1:1:1 DMA1:AMPS:EG9ME | 75:1 | 16 | 97,000 | 2.0 | 17 |
| PDMA-20 | Water/Methanol | 2:1:20 DMA1:AMPS:Am | 245:1 | 3 | — | — | 19 |
| PDMA-21 | DMF | 1:1:8 DMA1:EGMP:EG9ME | 67:1 | 16 | 81,000 | 1.2 | 3.9 |

*Bimodal molecular weight distribution

TABLE 2F

List of polymers prepared using CA as the chain transfer agent

| Polymer | Reaction Solvent | Monomer Feed Molar Ratio | Monomer:AIBN Feed Molar Ratio | Reaction Time (Hrs) | $M_w$ | PD | DMA wt % |
|---|---|---|---|---|---|---|---|
| PDMA-22 | DMF | 1:20 DMA1:NIPAM | 125:2:1 Monomer:CA:AIBN | 18 | 81,000 | 1.1 | 11 |
| PDMA-23 | DMF | 1:3 DMA1:NAM | 95:12:1 Monomer:CA:AIBN | 18 | 5,700 | 2.1 | 31 |
| PDMA-24 | DMF | 1:1 DMA1:EG22MA | 27:1.3:1 Monomer:CA:AIBN | 18 | 106,000 (58 wt %) 7,600 (42 wt %)* | 1.7 1.6 | 5.0 |

*Bimodal molecular weight distribution

TABLE 3A

Hydrophilic prepolymers used in chain extension reaction

| Prepolymer | Abbreviation | Chemical Structure — In Poly(Ether Urethane)/Poly(Ether Ester Urethane) | In Poly(Ether Ester) |
|---|---|---|---|
| Polyethylene glycol 600 MW | EG600 | [structure with subscript 13] | [structure with subscript 13] |
| Polyethylene glycol 1000 MW | EG1k | [structure with subscript 22] | [structure with subscript 22] |
| Polyethylene glycol 8000 MW | EG8k | [structure with subscript 181] | [structure with subscript 181] |
| Branched, 4-Armed Polyethylene glycol 8000 MW | EG10kb | — | [4-armed structure with subscript 56, outer subscript 4] |

TABLE 3B

Hydrophobic prepolymers used in chain extension reaction

| Prepolymer | Abbreviation | Chemical Structure |
|---|---|---|
| Polycaprolactone 2000 MW | CL2k | [structure] |
| Polycaprolactone Bis-Glycine 1000 MW | CL1kG | [structure] |
| Polycaprolactone Bis-Glycine 2000 MW | CL2kG | [structure] |

TABLE 3C

Amphiphilic prepolymers used in chain extension reaction

| Prepolymer | Abbreviation | Chemical Structure |
|---|---|---|
| PEG-PPG-PEG 1900 MW | F2k | $\{-O-(CH_2CH_2O)_{10}-(CH(CH_3)CH_2O)_{16}-(CH_2CH_2O)_{10}-O-\}$ |
| PEG-PPG-PEG 8350 MW | F68 | $\{-O-(CH_2CH_2O)_{77}-(CH(CH_3)CH_2O)_{30}-(CH_2CH_2O)_{77}-O-\}$ |
| PPG-PEG-PPG 1900 MW | ED2k | $\{-NH-CH(CH_3)CH_2-(OCH(CH_3)CH_2)_2-(OCH_2CH_2)_{36}-(OCH_2CH(CH_3))_3-NH-\}$ |

TABLE 3D

Chain extension used in chain extension reaction

| Prepolymer | Abbreviation | Chemical Structure |
|---|---|---|
| Lysine | Lys | Lysine structure with $R_{15}$ |
| Aspartic Acid | Asp | Aspartic acid structure with $R_{15}$ |
| 2,2-Bis(Hydroxymethyl) Propionic Acid | HMPA | HMPA structure with $R_{15}$ |
| Fumarate coupled with 3-Mercaptopropionic Acid | fMPA | fMPA structure with $R_{15}$ |
| Fumarate coupled with Cysteamine | fCA | $R_{15}-NH-$ fCA structure |

TABLE 3D-continued

Chain extension used in chain extension reaction

| Prepolymer | Abbreviation | Chemical Structure |
|---|---|---|
| Succinic Acid | SA | (structure) |

$R_{15}$ = DHPD or $R_{15}$ = H for lysine with free —$NH_2$ where specified.

TABLE 4A

Poly(Ether Urethane)

| Polymer | Backbone Composition | DHPD Type | Weight % DHPD | Synthesis Method | $M_w$ | PD | Note |
|---|---|---|---|---|---|---|---|
| PEU-1 | 89 wt % EG1k; 11 wt % Lys | Dopamine | 13 | FIG. 8 | 200,000 | 2.0 | |
| PEU-2 | 89 wt % EG1k; 11 wt % Lys | Dopamine | 8.2 | FIG. 8 | 140,000 | 1.2 | Additional Lysine with free —$NH_2$ |
| PEU-3 | 94 wt % F2k; 6 wt % Lys | Dopamine | 4.8 | FIG. 8 | — | — | |
| PEU-4 | 29 wt % EG1k; 65 wt % EG8k; 6 wt % Lys | Dopamine | 6.4 | FIG. 8 | — | — | |

TABLE 4B

Poly(Ether Ester)

| Polymer | Backbone Composition | DHPD Type | Weight % DHPD | Synthesis Method | $M_w$ | PD | Note |
|---|---|---|---|---|---|---|---|
| PEE-1 | 91 wt % EG1k; 9 wt % Asp | DOPA | 7.7 | FIG. 9 | 34,000 | 1.3 | |
| PEE-2 | 86 wt % EG600; 14 wt % Asp | DOHA | 21 | FIG. 9 | 18,000 | 4.2 | |
| PEE-3 | 91 wt % EG1k; 9 wt % Asp | DOHA | 13 | FIG. 9 | 11,000 | 2.9 | |
| PEE-4 | 85 wt % EG1k; 15 wt % fMPA | Dopamine | 9.4 | FIG. 10 | 21,000 | 2.0 | |
| PEE-5 | 71 wt % EG1k; 16 wt % F68; 13 wt % fMPA | Dopamine | 6.8 | FIG. 10 | 77% 17,000*<br>23% 250,000 | 2.7<br>1.2 | |
| PEE-6 | 92 wt % F2k; 8 wt % fMPA | Dopamine | 3.0 | FIG. 10 | 79% 27,000*<br>23% 340,000 | 1.8<br>1.4 | |
| PEE-7 | 64 wt % EG1k; 24 wt % F68; 12 wt % fCA | DOHA | 6.1 | FIG. 10 | 63,000 | 1.7 | |
| PEE-8 | 68 wt % EG600; 19 wt % HMPA; 13 wt % SA; | Dopamine | 16 | FIG. 11 | 15,000 | 4.8 | |

*Bimodal molecular weight distribution.

TABLE 4C

Poly(Ether Amide)

| Polymer | Backbone Composition | DHPD Type | Weight % DHPD | Synthesis Method | $M_w$ | PD | Note |
|---|---|---|---|---|---|---|---|
| PEA-1 | 93 wt % ED2k; 7 wt % fCA | DOHA | 5.9 | FIG. 10 | — | — | |
| PEA-2 | 80 wt % ED2k; 12 wt % Lys; 4 wt % DOPA; 4 wt % SA | DOPA | 2.9 | FIG. 12 | 16,000 | 1.4 | Lysine with free —$NH_2$ |

TABLE 4D

Poly(Ether Ester Urethane)

| Polymer | Backbone Composition | DHPD Type | Weight % DHPD | Synthesis Method | $M_w$ | PD | Note |
|---|---|---|---|---|---|---|---|
| PEEU-1 | 66 wt % EG1k; 26 wt % CL1kG; 8 wt % Lys | Dopamine | 6.0 | FIG. 8 | — | — | |
| PEEU-2 | 63 wt % EG1k; 18 wt % CL1k; 10 wt % F68; 9 wt % Lys | Dopamine | 10 | FIG. 8 | — | — | |
| PEEU-3 | 64 wt % EG600; 21 wt % CL2k; 5 wt % EG1k; 10 wt % Lys | Dopamine | 12 | FIG. 8 | — | — | Additional Lysine with free —NH$_2$ |

TABLE 5

Gelatin-based DHPp

| Polymer | DHPD Type | Synthesis Method | Weight % DHPD | DHPD per DHPp | Note |
|---|---|---|---|---|---|
| GEL-1 | DOHA | FIG. 13 | 5.9 | 8.4 | |
| GEL-2 | Dopamine | FIG. 13 | 5.9 | 8.4 | |
| GEL-3 | DOPA | FIG. 13 | 8.0 | 11 | |
| GEL-4 | DMA1 | FIG. 14 | 54 | 128 | 11 p(DMA1) chains with 12 DMA1 per chain |
| GEL-5 | DMA1 | FIG. 14 | 17 | 21 | |

TABLE 6

Curing and adhesive properties of DHPp

| Polymer | DHPp wt % | Curing Time (sec) | Burst Strength (mmHg/mm) | In Vitro Degradation after 2-week incubation |
|---|---|---|---|---|
| PEE-5 | 15 | 60 | — | Completely degraded |
| PEU-1 | 15 | 30 | 55 ± 7 | Showed signs of degradation |
| PEU-2 | 15 | 70 | 129 ± 21 | — |
| PEU-2 | 30 | 70 | 228 ± 57 | — |
| PEU-3 | 15 | 7 min | 121 ± 33 | No signs of degradation |
| PEU-4 | 15 | 2.5 min | 89 ± 13 | — |
| PEEU-3 | 15 | 3 min | 46 ± 8 | — |
| GEL-1 | 15 | 120 | 5 ± 2 | — |
| GEL-2 | 15 | 21 | — | — |
| GEL-3 | 15 | 40 | 5 ± 3 | — |

TABLE 7

Burst strength of mixed polymers

| Polymer Mixture | Total DHPp wt % | Curing Time (min) | Burst Strength (mmHg/mm) | % Increase Over Single DHPp |
|---|---|---|---|---|
| PEU-1 (50%) PEU-3 (50%) | 15 | 5 | 81 ± 13 | 47% increase over PEU-1 |
| PEU-2 (50%) PEU-3 (50%) | 15 | 5 | 157 ± 31 | 22% increase over PEU-2<br>30% increase over PEU-3 |

TABLE 8

Contact angle and resistance of DHPp-coated surfaces to fibroblast and bacterial adhesion

| Polymer | Contact Angle | Fibroblast Adhesion (% reduction) | Bacterial Adhesion (% reduction) |
|---|---|---|---|
| PDMA-1 | 58.9 | 94.6 | — |
| PDMA-2 | 64.4 | 96.6 | 98.0 |
| PDMA-4 | — | — | 15.2 |
| PDMA-5 | 54.4 | 97.0 | — |
| PDMA-6 | — | — | 59.4 |
| PDMA-7 | — | 98.7 | 29.4 |
| PDMA-15 | — | — | 69.7 |
| PDMA-19 | 64.1 | — | — |
| PDMA-18 | — | — | 28.9 |
| PDMA-21 | — | — | 97.9 |
| PDMA-24 | 51.3 | 99.7 | — |
| PEA-1 | — | 98.3 | 68.7 |
| PEU-2 15 wt % Gel | — | — | 98.1 |

TABLE 9

Advancing water contact angle on control and coated surface materials.

| | Acetal | Brass | Poly Propylene | Poly Urethane |
|---|---|---|---|---|
| Control (Uncoated) | 85 ± 1.3 | 48 ± 11 | 110 ± 3.1 | 95 ± 5.0 |
| PDMA-1 | 60 ± 1.7 | 48 ± 6.7 | 58 ± 1.5 | 77 ± 2.4 |
| PDMA-2 | 67 ± 2.6 | 32 ± 5.2 | 88 ± 5.0 | 85 ± 3.4 |
| PDMA-5 | — | 49 ± 1.9 | 89 ± 2.1 | 81 ± 5.1 |
| PDMA-24 | 58 ± 4.0 | 33 ± 1.0 | 76 ± 5.5 | 81 ± 2.2 |

TABLE 10

Percent reduction in 3t3 fibroblast attachment to various surfaces after treatment with various polymeric coatings.

| | Acetal | Brass | Poly Propylene | Poly Urethane |
|---|---|---|---|---|
| PDMA-1 | 98.0 | 83.0 | 97.6 | 98.6 |
| PDMA-2 | 94.2 | 95.6 | 99.0 | 94.2 |
| PDMA-5 | — | 99.2 | 99.7 | 91.9 |
| PDMA-24 | — | 96.9 | 99.0 | 95.5 |

TABLE 11

Percent reduction in bacterial attachment to various surfaces after treatment with PDMA-2.

|  |  | Acetal | Brass | Poly Propylene | Poly Urethane | Polyvinyl Chloride |
|---|---|---|---|---|---|---|
| P. Aeruginosa | Flow | 98.1 | 99.6 | 99.5 | 89.7 | 99.1 |
|  | Static | 99.7 | 45.7 | 95.0 | 96.2 | 99.2 |
| S. Aureus | Flow | 94.4 | 77.1 | 92.7 | 92.2 | 98.0 |
|  | Static | 99.5 | 87.5 | 94.9 | 94.1 | 99.3 |

What is claimed is as follows:

1. A DHPD-modified linear polymer (DHPp) according to Formula (I):

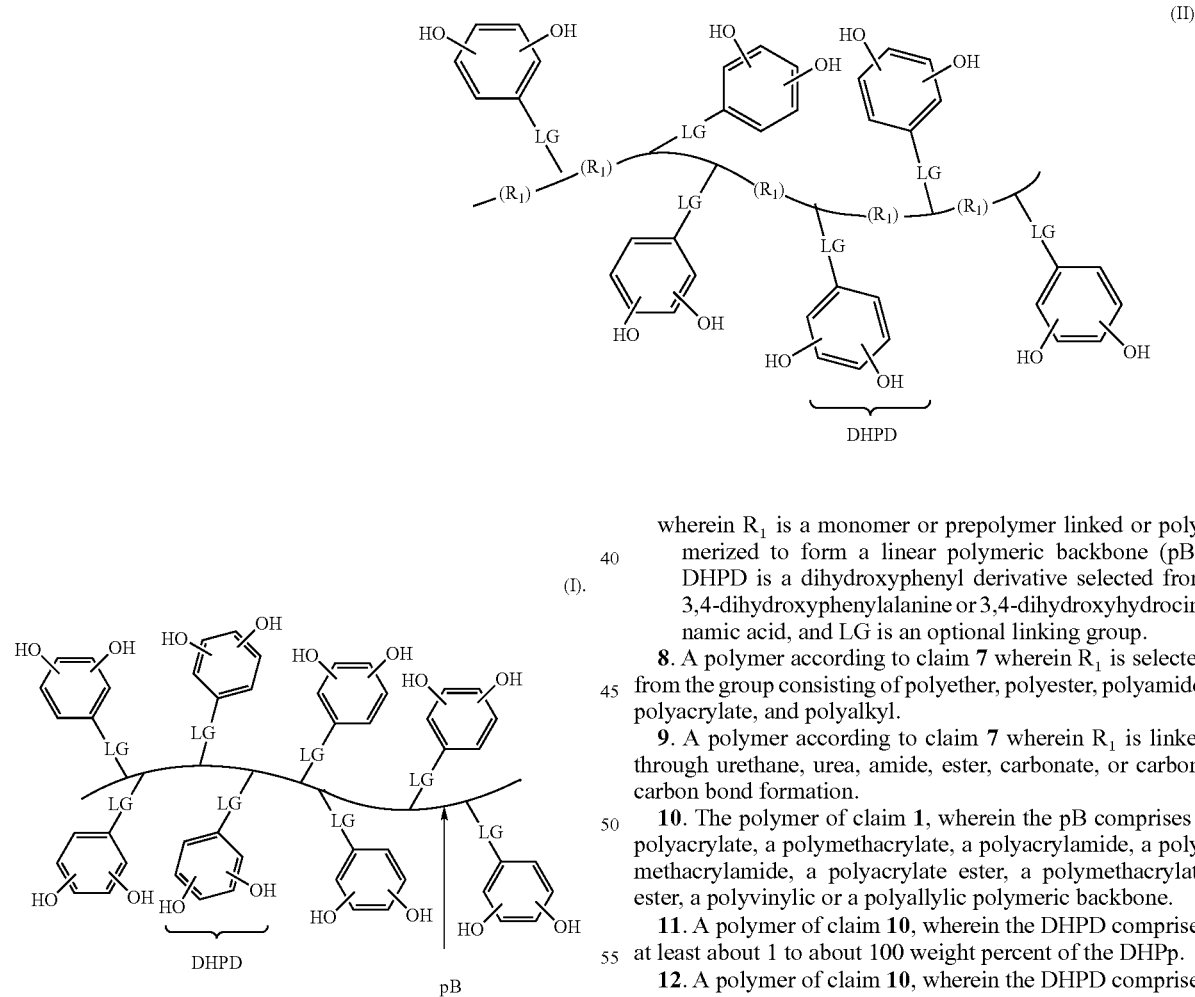

wherein LG is an optional linking group, DHPD is a dihydroxyphenyl derivative selected from 3,4-dihydroxyphenylalanine or 3,4-dihydroxyhydrocinnamic acid, and pB is a linear polymeric back bone.

2. A polymer of claim 1 wherein the DHPD comprises at least about 1 to about 100 weight percent of the DHPp.

3. A polymer of claim 1 wherein the DHPD comprises at least about 2 to about 65 weight percent of DHPp.

4. A polymer of claim 1 wherein DHPD comprises about 3 to about 55 weight percent of DHPp.

5. A polymer of claim 1 wherein the pB consists essentially of polyalkylene oxide.

6. A polymer according to claim 1 wherein pB is substantially a homopolymer.

7. A DHPD-modified linear polymer DHPp according to Formula (II):

wherein $R_1$ is a monomer or prepolymer linked or polymerized to form a linear polymeric backbone (pB), DHPD is a dihydroxyphenyl derivative selected from 3,4-dihydroxyphenylalanine or 3,4-dihydroxyhydrocinnamic acid, and LG is an optional linking group.

8. A polymer according to claim 7 wherein $R_1$ is selected from the group consisting of polyether, polyester, polyamide, polyacrylate, and polyalkyl.

9. A polymer according to claim 7 wherein $R_1$ is linked through urethane, urea, amide, ester, carbonate, or carbon-carbon bond formation.

10. The polymer of claim 1, wherein the pB comprises a polyacrylate, a polymethacrylate, a polyacrylamide, a polymethacrylamide, a polyacrylate ester, a polymethacrylate ester, a polyvinylic or a polyallylic polymeric backbone.

11. A polymer of claim 10, wherein the DHPD comprises at least about 1 to about 100 weight percent of the DHPp.

12. A polymer of claim 10, wherein the DHPD comprises at least about 2 to about 65 weight percent of DHPp.

13. A polymer of claim 10, wherein DHPD comprises about 3 to about 55 weight percent of DHPp.

14. The polymer of claim 10, wherein the polyacrylate, polymethacrylate, polyacrylamide, polymethacrylamide, polyacrylate ester, polymethacrylate ester, polyvinylic or polyallylic polymeric backbone is selected from poly(ethylene glycol) methyl ether methacrylate, poly(ethylene glycol) methyl ether acrylate, poly(ethylene glycol) methyl ether methacrylamide, acrylamide, N-acryloylmorpholine, 2-hydroxymethacrylate, N-isopropylacrylamide, 2-methoxyethyl acrylate, 3-methacryloylaminopropyldimethyl(3-sulfopropyl)ammonium hydroxide, vinylpyrrolidone, 3-acrylamidopropyl trimethylammonium, allylamine, 1,4-diaminobutane methacrylamide, 2-acrylamido-2-methyl-1-propanesulfonic acid, ethylene glycolmethacrylate phosphate and 2,2,2-trifluoroethyl methacrylate.

15. A polymer of claim 14, wherein the DHPD comprises at least about 1 to about 100 weight percent of the DHPp.

16. A polymer of claim 14, wherein the DHPD comprises at least about 2 to about 65 weight percent of DHPp.

17. A polymer of claim 14, wherein DHPD comprises about 3 to about 55 weight percent of DHPp.

* * * * *